United States Patent
Eichenberger et al.

(10) Patent No.: US 8,225,896 B2
(45) Date of Patent: Jul. 24, 2012

(54) SNOWMOBILE AND AN OIL CONTAINER THEREFOR

(75) Inventors: Jason A Eichenberger, Warroad, MN (US); Richard A Fredrickson, Roseau, MN (US); Martin E Sampson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 13/027,124

(22) Filed: Feb. 14, 2011

(65) Prior Publication Data

US 2011/0139529 A1 Jun. 16, 2011

Related U.S. Application Data

(63) Continuation of application No. 12/736,073, filed as application No. PCT/US2009/036315 on Mar. 6, 2009, now abandoned.

(60) Provisional application No. 61/104,436, filed on Oct. 10, 2008.

(51) Int. Cl.
*B62M 27/02* (2006.01)
*B62D 25/04* (2006.01)

(52) U.S. Cl. ...................... 180/190; 220/501

(58) Field of Classification Search ................ 180/190; 220/501; 184/106; 280/833, 834, 835
See application file for complete search history.

(56) References Cited

U.S. PATENT DOCUMENTS

| | | |
|---|---|---|
| 2,938,601 A | 5/1960 | Brafford |
| 3,767,223 A | 10/1973 | Bottenberg |
| 4,561,670 A | 12/1985 | Takada |
| 5,038,582 A | 8/1991 | Takamatsu |
| 5,667,031 A | 9/1997 | Karpik |
| 5,745,241 A | 4/1998 | Hashimoto |
| 5,857,385 A | 1/1999 | Takeuchi |
| 5,862,662 A | 1/1999 | Fukuda |
| 5,944,133 A | 8/1999 | Eto |
| 5,957,230 A | 9/1999 | Harano |
| 5,992,552 A | 11/1999 | Eto |
| 6,390,869 B2 | 5/2002 | Korenjak |
| 6,415,759 B2 | 7/2002 | Ohrnberger |
| 6,491,125 B2 | 12/2002 | Girouard et al. |
| 6,544,086 B2 | 4/2003 | Tscherne |
| 6,568,376 B2 | 5/2003 | Sonnleitner |
| 6,591,819 B2 | 7/2003 | Tscherne |

(Continued)

FOREIGN PATENT DOCUMENTS

CA    2 168 905    11/2003

(Continued)

OTHER PUBLICATIONS

European Patent Office, International Search Report for PCT/US2009/036315, Jul. 31, 2009, 6 pages.

(Continued)

*Primary Examiner* — Tony Winner
(74) *Attorney, Agent, or Firm* — Faegre Baker Daniels LLP

(57) ABSTRACT

A vehicle is shown such as a snowmobile, where a frame includes a tunnel and a front frame portion comprised of cast halves. A suspension system is comprised of upper and lower control arms connected to the front frame portion. Some of the frame components are adhesively fixed together. A powertrain is supported by the frame, and is comprised of an engine and a clutch. The clutch includes a clutch guard supporting an oil container. The engine has an exhaust system which extends through the front frame portion. The snowmobile also has a rear snow deflector.

20 Claims, 58 Drawing Sheets

U.S. PATENT DOCUMENTS

| | | |
|---|---|---|
| 6,601,528 B2 | 8/2003 | Bilek |
| D479,813 S | 9/2003 | Cadotte et al. |
| 6,626,140 B2 | 9/2003 | Aichinger |
| D495,973 S | 9/2004 | Cadotte et al. |
| 6,823,957 B2 | 11/2004 | Girouard et al. |
| D505,889 S | 6/2005 | Girouard et al. |
| 6,942,050 B1 | 9/2005 | Honkala |
| 7,014,004 B2 | 3/2006 | Etou |
| 7,055,454 B1 | 6/2006 | Whiting et al. |
| 7,213,669 B2 | 5/2007 | Fecteau et al. |
| D576,522 S | 9/2008 | Longpre et al. |
| 7,523,951 B2 | 4/2009 | Kinouchi et al. |
| 7,533,749 B1 | 5/2009 | Sampson et al. |
| 7,854,285 B1 | 12/2010 | Giese |
| 2002/0112909 A1 | 8/2002 | Nishijima |
| 2003/0029659 A1 | 2/2003 | Etou |
| 2003/0047368 A1 | 3/2003 | Morin et al. |
| 2003/0070854 A1 | 4/2003 | Bergman |
| 2003/0150658 A1 | 8/2003 | Nakano et al. |
| 2003/0183436 A1 | 10/2003 | Karpik |
| 2004/0016583 A1 | 1/2004 | Pyykonen |
| 2004/0021286 A1 | 2/2004 | Bombardier et al. |
| 2004/0188159 A1 | 9/2004 | Yatagai et al. |
| 2004/0211608 A1 | 10/2004 | Morin et al. |
| 2005/0115754 A1 | 6/2005 | Watson et al. |
| 2005/0205320 A1 | 9/2005 | Girouard |
| 2006/0060174 A1 | 3/2006 | Ashida |
| 2006/0191728 A1 | 8/2006 | Aoshima |
| 2007/0034435 A1 | 2/2007 | Berg et al. |
| 2007/0062751 A1 | 3/2007 | Rasidescu et al. |
| 2007/0199753 A1 | 8/2007 | Giese et al. |
| 2007/0221424 A1 | 9/2007 | Giese |
| 2007/0246283 A1 | 10/2007 | Giese et al. |
| 2008/0041335 A1 | 2/2008 | Buchwitz et al. |
| 2009/0302590 A1 | 12/2009 | Van Bronkhorst et al. |

FOREIGN PATENT DOCUMENTS

| | | |
|---|---|---|
| EP | 0 323 543 | 7/1989 |
| FR | 2 549 795 | 2/1985 |
| GB | 2 387 155 | 10/2003 |
| WO | WO 2008/060265 | 5/2008 |

OTHER PUBLICATIONS

European Patent Office, Written Opinion of the International Search Authority for PCT/US2009/036315, Jul. 31, 2009, 20 pages.

European Patent Office, International Preliminary Report on Patentability for PCT/US2009/036315, Jun. 22, 2010, 19 pages.

Photograph of the Polaris "Fusion." Undated.

Photograph of the Polaris "IQ 440." Undated.

LORD Product Catalog—LORD Engineered Adhesives: Structural Adhesive Solutions for Virtually Any Bonding Application, 15 pages, available at www.lord.com. Undated.

LORD Engineered Adhesives: Case Studies, Scelzi Reduces Labor and Materials Costs with Lord Adhesives, 3 pages; © 1998-2008 LORD Corporation; available at www.lord.com.

Kayler, Kimberly, "LORD Corp.'s adhesives allow marine closure to cut costs," Design Applications Nov./Dec. 2005, 2 pages.

Constructive Communication, "4-Start Trailers Reduces Labor and Increases Door Strength by Incorporating Specialty Adhesives From LORD Corporation," National Association of Trailer Manufacturers: NATM Member Feature, Feb./Mar. 2006, 2 pages.

LORD Engineered Adhesives, 406 Medium Set, Modified Acrylic Adhesive, Product Information, May 2007, 6 pages.

Tomblin, John (Wichita State University, Wichita, KS) and Kim, Hyonny (Purdue University, West Lafayette, IN), Adhesive Behavior in Aircraft Applications, 5 pages. Undated.

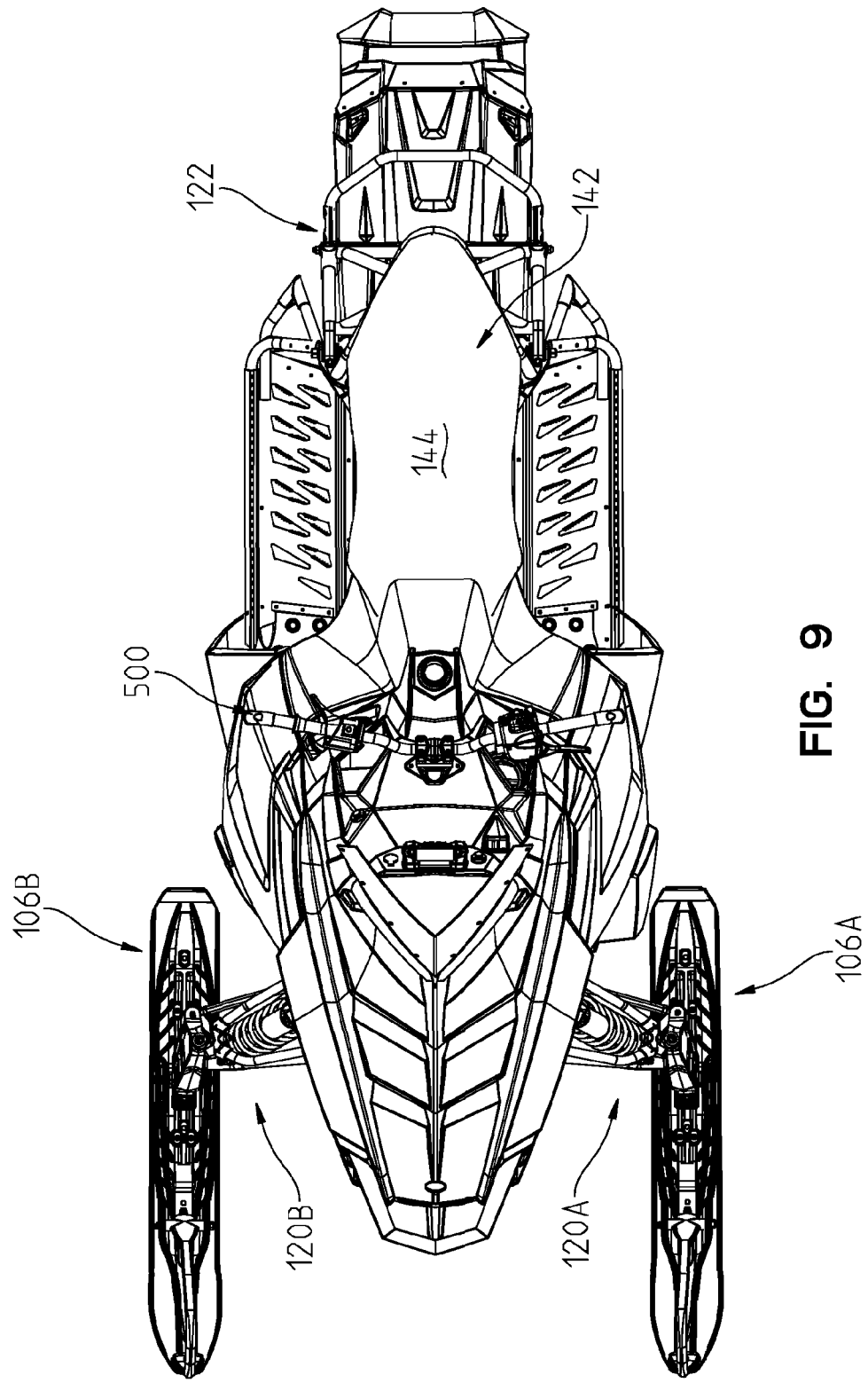

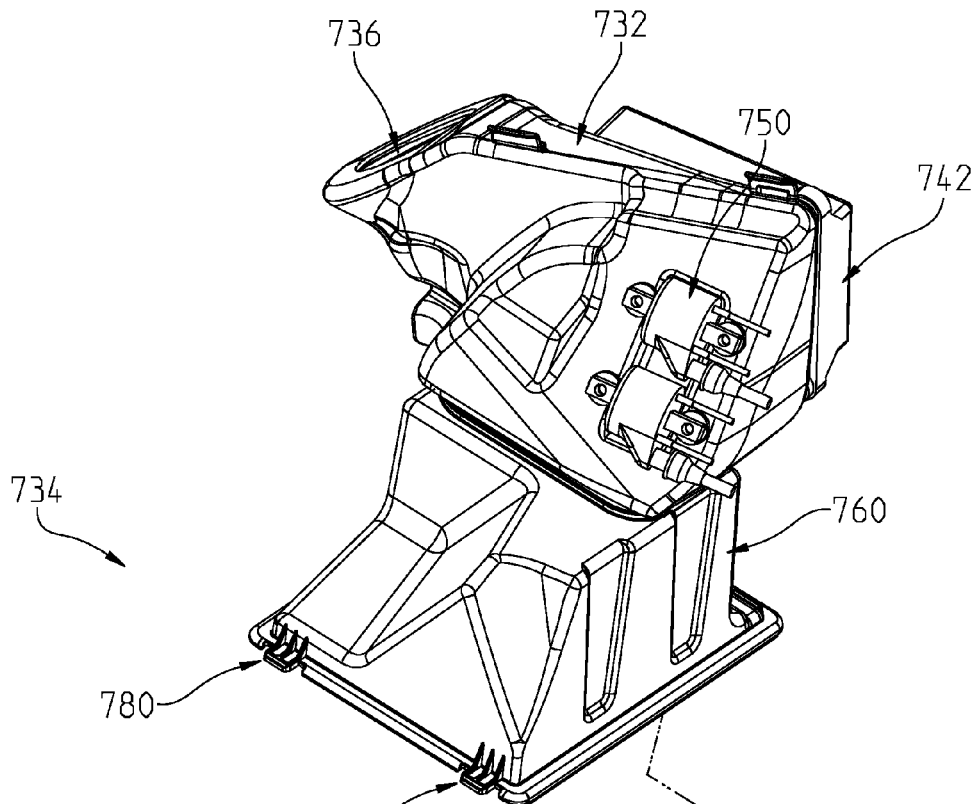
FIG. 36
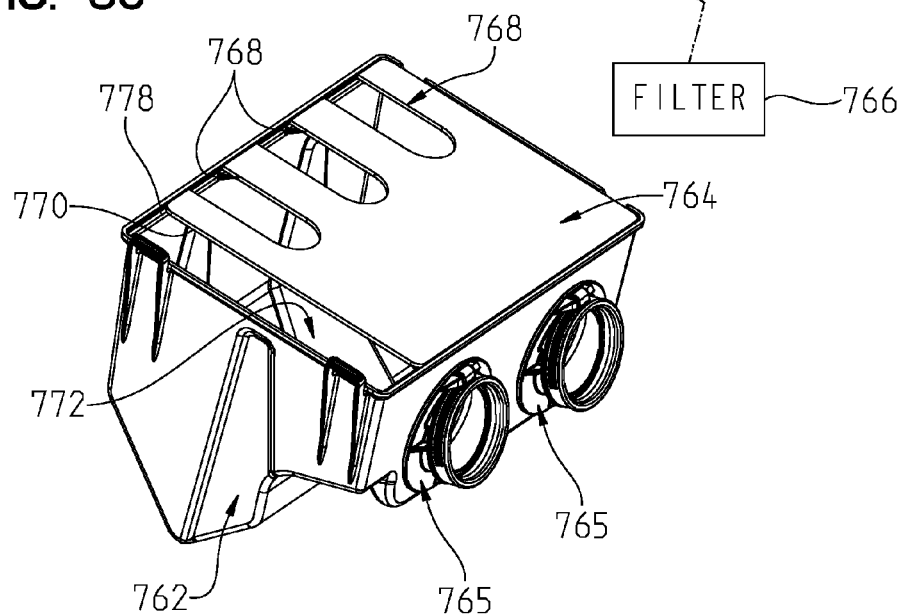

SNOWMOBILE AND AN OIL CONTAINER THEREFOR

This application is a continuation of U.S. patent application Ser. No. 12/736,073 filed Sep. 7, 2010; which is an application claiming priority under 35 USC §371 of PCT application number PCT/US2009/036315 filed Mar. 6, 2009, which in turn claimed priority from U.S. Patent Application Ser. Nos. 61/104,436 filed Oct. 10, 2008 and 29/301,572 filed Mar. 7, 2008, the subject matter of which are all incorporated herein by reference.

BACKGROUND

The present invention relates to various systems for snowmobiles.

Performance characteristics of snowmobiles, including the comfort of the ride, depend on a variety of systems and components, including the snowmobile suspension. Typically, a snowmobile suspension includes two systems, a front suspension system for a pair of skis and a rear suspension system for the track.

The rear suspension of a snowmobile supports an endless track driven by the snowmobile engine to propel the machine. The track is supported beneath a vehicle chassis by a suspension that is designed to provide a comfortable ride and to help absorb the shock of the snowmobile crossing uneven terrain. Most modern snowmobiles use a slide rail suspension which incorporates a pair of slide rails along with several idler wheels to support the track in its configuration. The slide rails are typically suspended beneath the chassis by a pair of suspension arms, with each arm being attached at its upper end to the chassis of the snowmobile, and at its lower end to the slide rails. The mechanical linkage of the slide rails to the suspension arms and to the snowmobile chassis typically is provided by springs and at least one element acting along a linear path, such as a shock absorber, damper, air shock, shock and spring combination.

The front suspension is typically provided by upper and control arms which pivot relative to the front portion of the frame at an inner end, and connect to the skis at an outer end.

SUMMARY

In another illustrative embodiment, a vehicle comprises a frame including a tunnel; a plurality of ground engaging members including a pair of front skis supporting a front portion of the frame and a rear endless track supporting a rear portion of the frame; an engine supported by the frame and operatively coupled to the rear endless track; a continuously variable transmission supported by the frame and operatively coupled to the engine and to the rear endless track; a clutch guard supported by the frame and positioned generally above the continuously variable transmission; and an oil container in fluid communication with the engine, where the oil container is supported by the clutch guard.

In another illustrative embodiment, an oil container for a two cycle engine comprising a housing having an interior volume, a first portion of the interior volume corresponding to a main reservoir and a second portion of the interior volume corresponding to a sump; and a divider separating the main reservoir and the sump, where the divider has a variable width opening permitting the fluid communication of oil from the main reservoir to the sump.

In another illustrative embodiment, an oil container for a two cycle engine is provided including a housing having an interior volume, a first portion of the interior volume corresponding to a main reservoir and a second portion of the interior volume corresponding to a sump; and a divider separating the main reservoir and the sump, where the divider is a portion of the housing.

BRIEF DESCRIPTION OF THE DRAWINGS

FIG. 9 illustrates a top view of the exemplary snowmobile of FIG. 1;

FIG. 36 illustrates the placement of a divider between an upper air box housing and a lower air box housing of the air intake system of FIG. 34;

Corresponding reference characters indicate corresponding parts throughout the several views. Unless stated otherwise the drawings are proportional with the exception of the flowcharts and block representations.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a snowmobile, it should be understood that the features disclosed herein may have application to other types of vehicles such as all-terrain vehicles, motorcycles, watercraft, utility vehicles, and golf carts.

Figure 1:
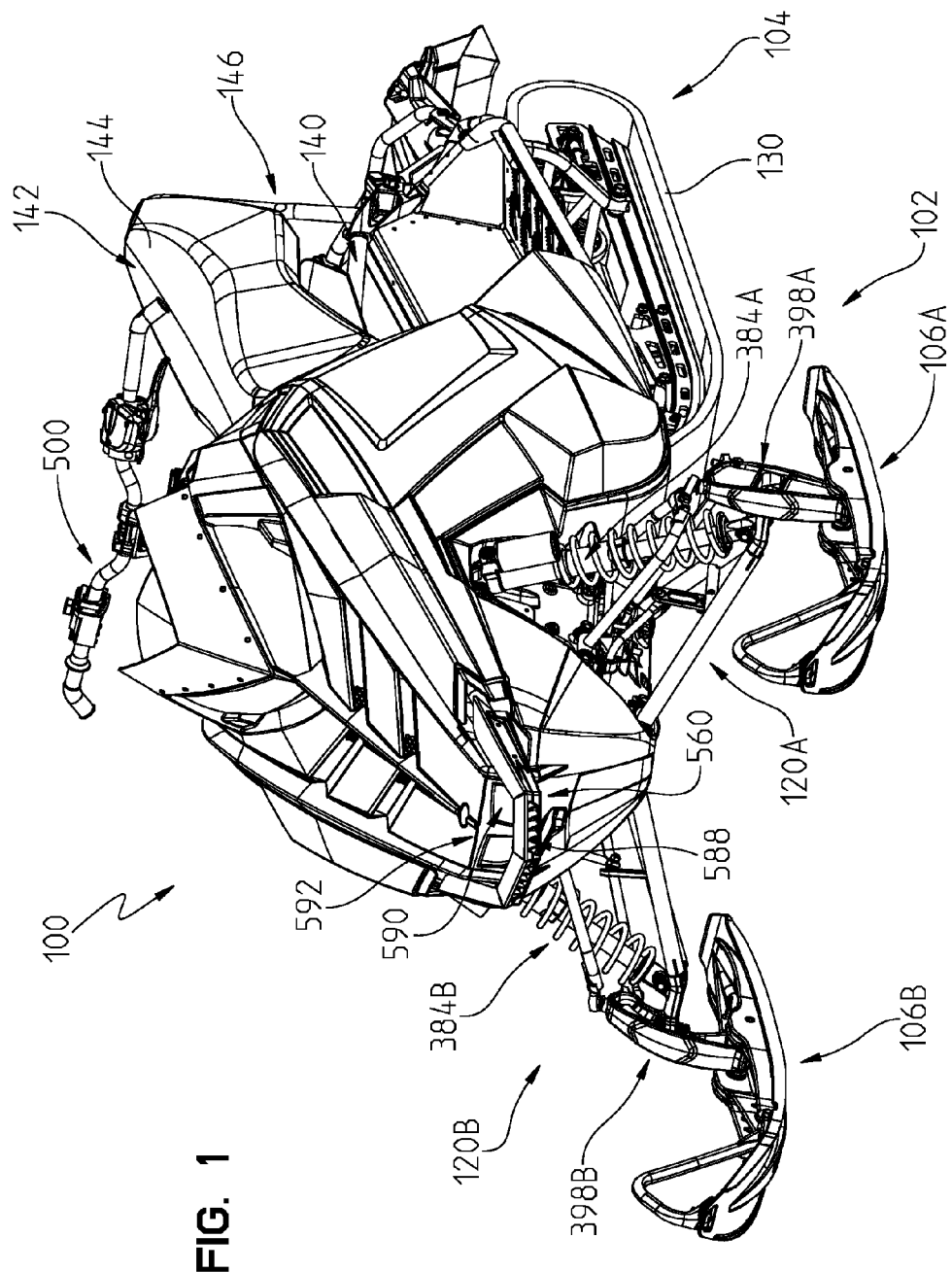
FIG. 1 illustrates a front, left, perspective view of an exemplary snowmobile.
Figure 2:
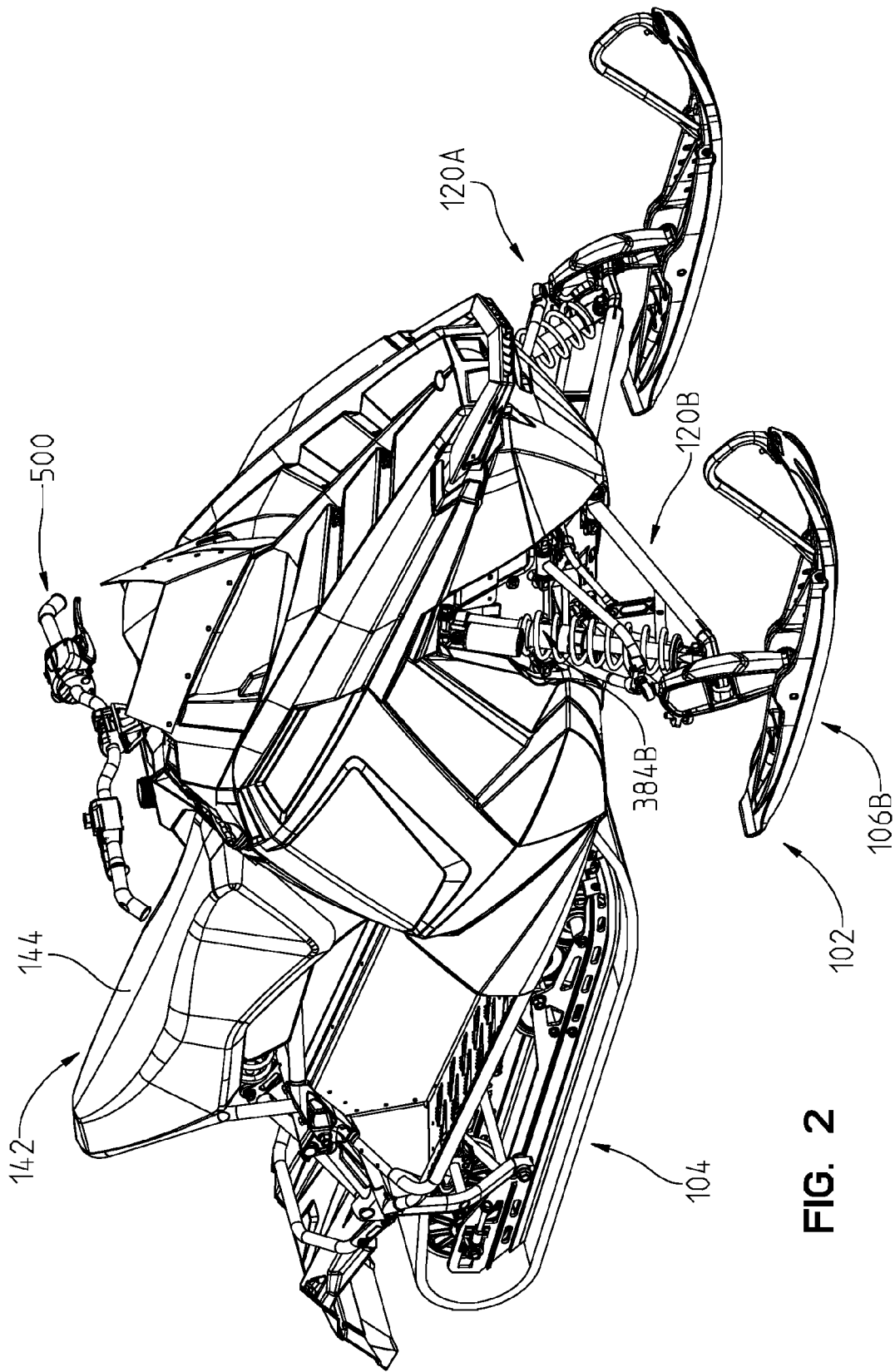
FIG. 2 illustrates a front, right, perspective view of the exemplary utility vehicle of FIG. 1.

Referring to FIG. 1, an illustrated embodiment of vehicle 100 is shown. The illustrated vehicle 100 is a snowmobile. However, the following disclosure is applicable to other types of vehicles such as all terrain vehicles, motorcycles, watercraft, utility vehicles, and golf carts. Vehicle 100 as illustrated includes a plurality of ground engaging members 102. Illustratively, ground engaging members 102 include an endless track assembly 104 and a pair of front skis 106a and 106b. Endless track assembly 104 supports a rear portion of vehicle 100 while skis 106 support a front portion of vehicle 100. Further, endless track assembly 104 is operatively coupled to an engine 108 (see FIG. 49).

Figure 10:
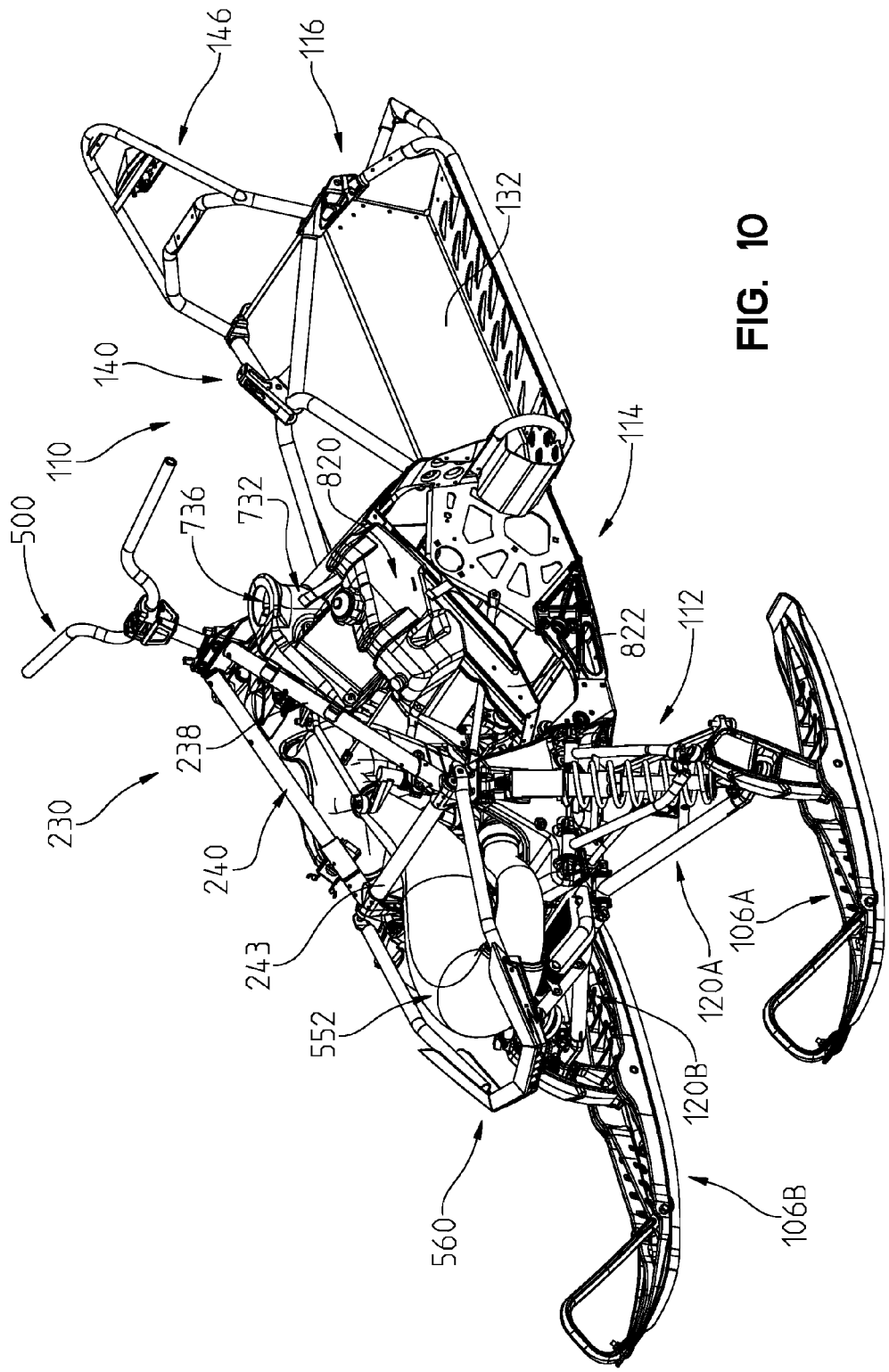
FIG. 10 illustrates a perspective view of a frame of the exemplary snowmobile of FIG. 1 along with several components supported by the frame.

Referring to FIG. 10, vehicle 100 includes a frame 110. Frame 110 includes a front frame portion 112 which is generally supported by skis 106. Frame 110 further includes a middle frame portion 114 which generally supports engine 108. Frame 110 further includes a rear portion 116 which is generally supported by endless track assembly 104. Front frame portion 112 is coupled to skis 106a and 106b through respective front suspensions 120a and 120b. Front suspensions 120a and 120b permits the relative movement of frame 110 relative to skis 106. In general, front suspension 120b is a mirror image of front suspension 120a.

Figure 3:
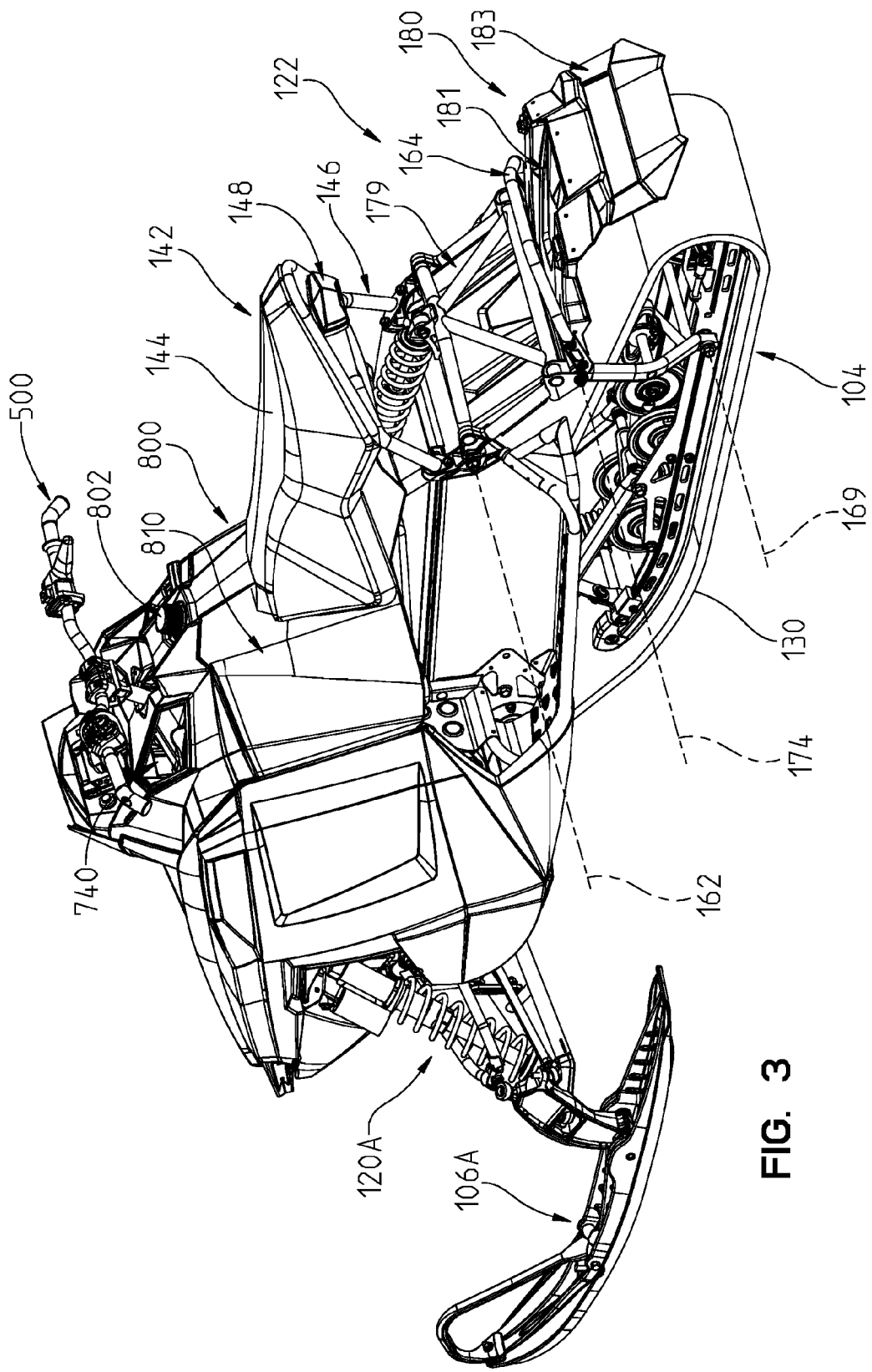
FIG. 3 illustrates a rear, left, perspective view of the exemplary snowmobile of FIG. 1.
Figure 4:
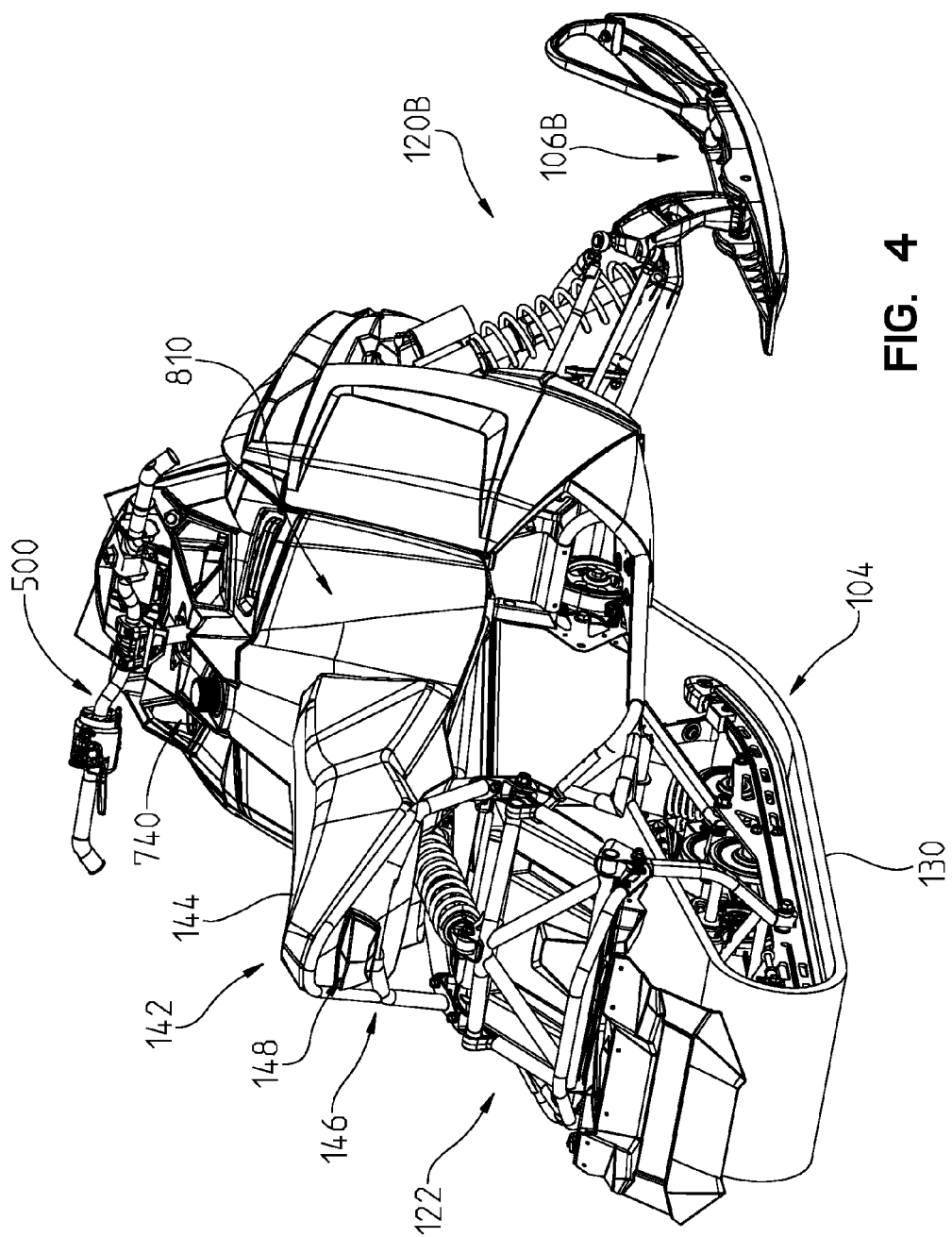
FIG. 4 illustrates a rear, right, perspective view of the exemplary snowmobile of FIG. 1.
Figure 8:
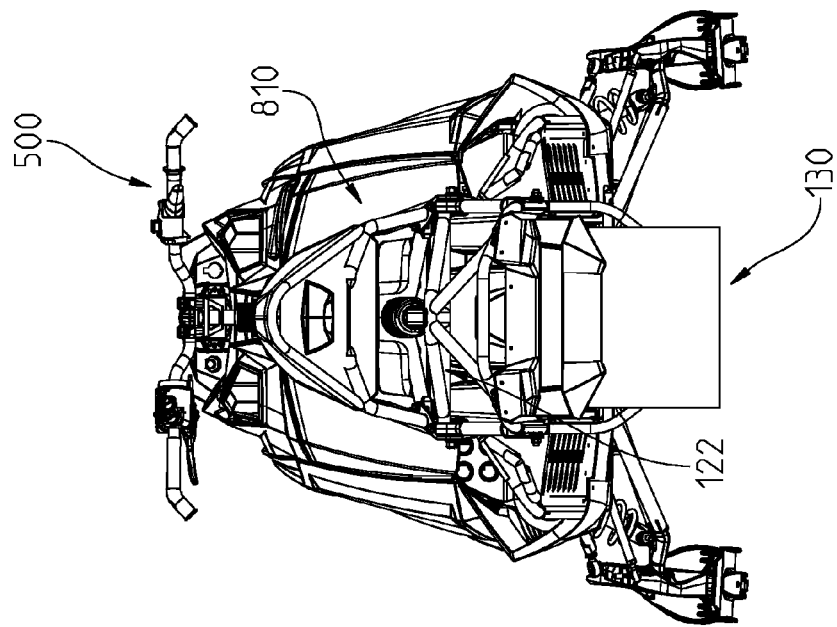
FIG. 8 illustrates a rear view of the exemplary snowmobile of FIG. 1.
Figure 5:
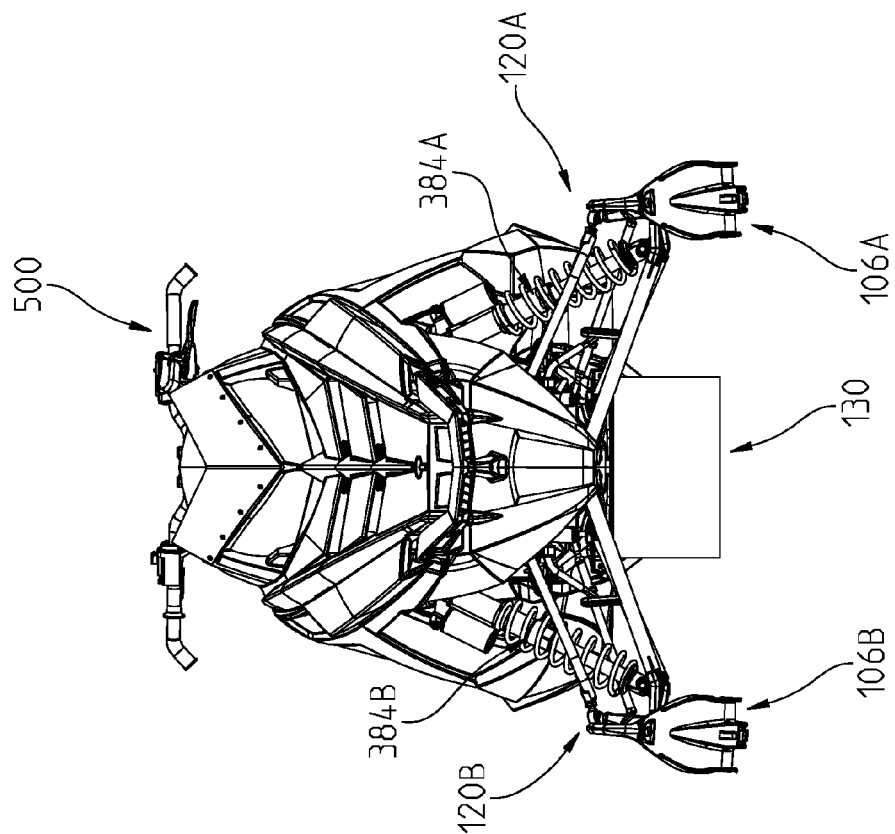
FIG. 5 illustrates a front view of the exemplary snowmobile of FIG. 1.
Figure 50:
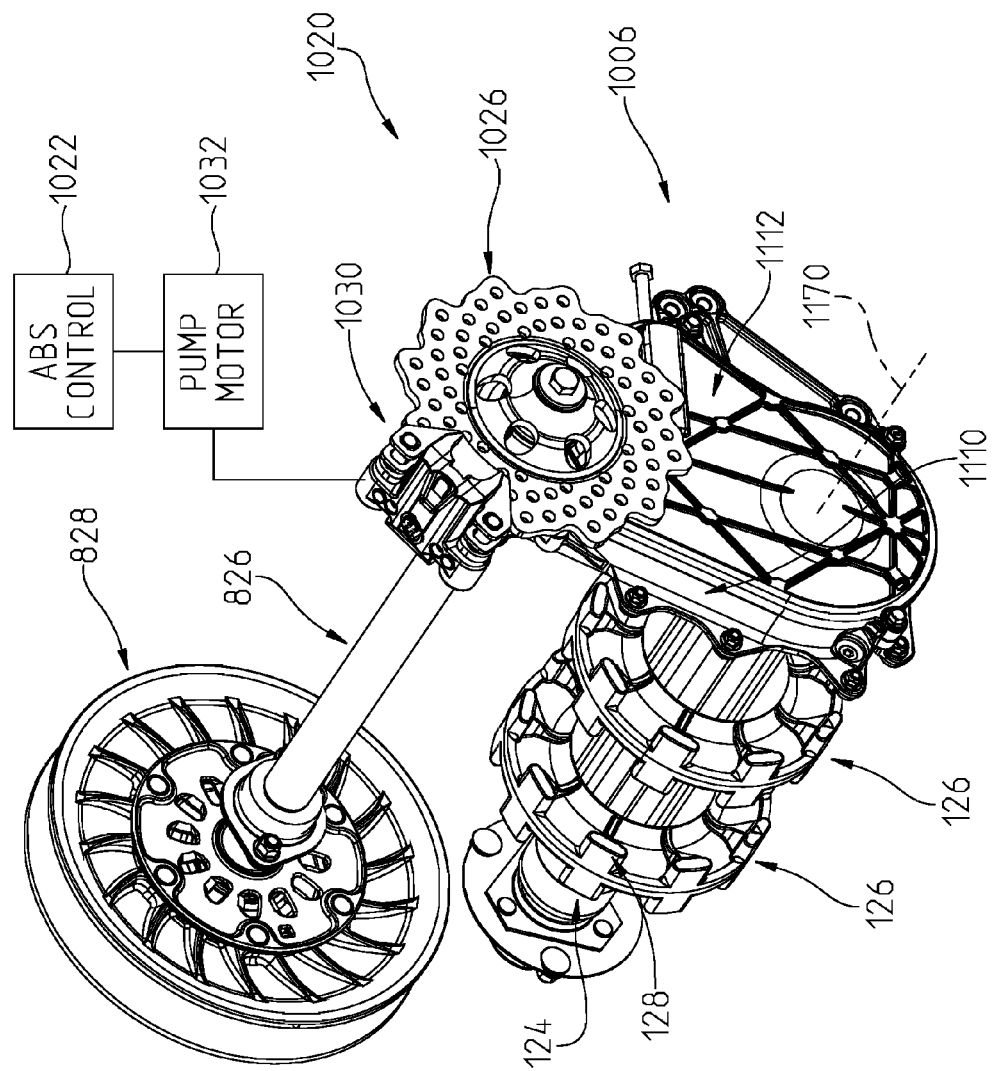
FIG. 50 illustrates a perspective view of a portion of the power train of FIG. 49.

Referring to FIG. 3, frame 110 is supported by endless track assembly 104 through a rear suspension 122 and a drive shaft 124 (see FIG. 50). Drive shaft 124 includes a pair of drive sprockets 126 which have a plurality of teeth 128 to engage and move endless track belt 130 of endless track assembly 104. Additional details regarding the structure and operation of rear suspension 122 and the connection between rear suspension 122 and frame 110 are provided in U.S. patent application Ser. No. 11/623,873, published under Publication No. 2007-0199753, filed Jan. 17, 2007, titled SNOWMOBILE FRAME ASSEMBLY; U.S. patent application Ser. No. 11/623,879, published under Publication No. 2007-0221424, filed Jan. 17, 2007, titled SNOWMOBILE REAR SUSPENSION; and U.S. patent application Ser. No. 11/710,177, published under Publication No. 2007-0246283, filed Feb. 23, 2007, titled SNOWMOBILE DRIVE ASSEMBLY, the disclosures of which are expressly incorporated by reference herein.

Figure 6:
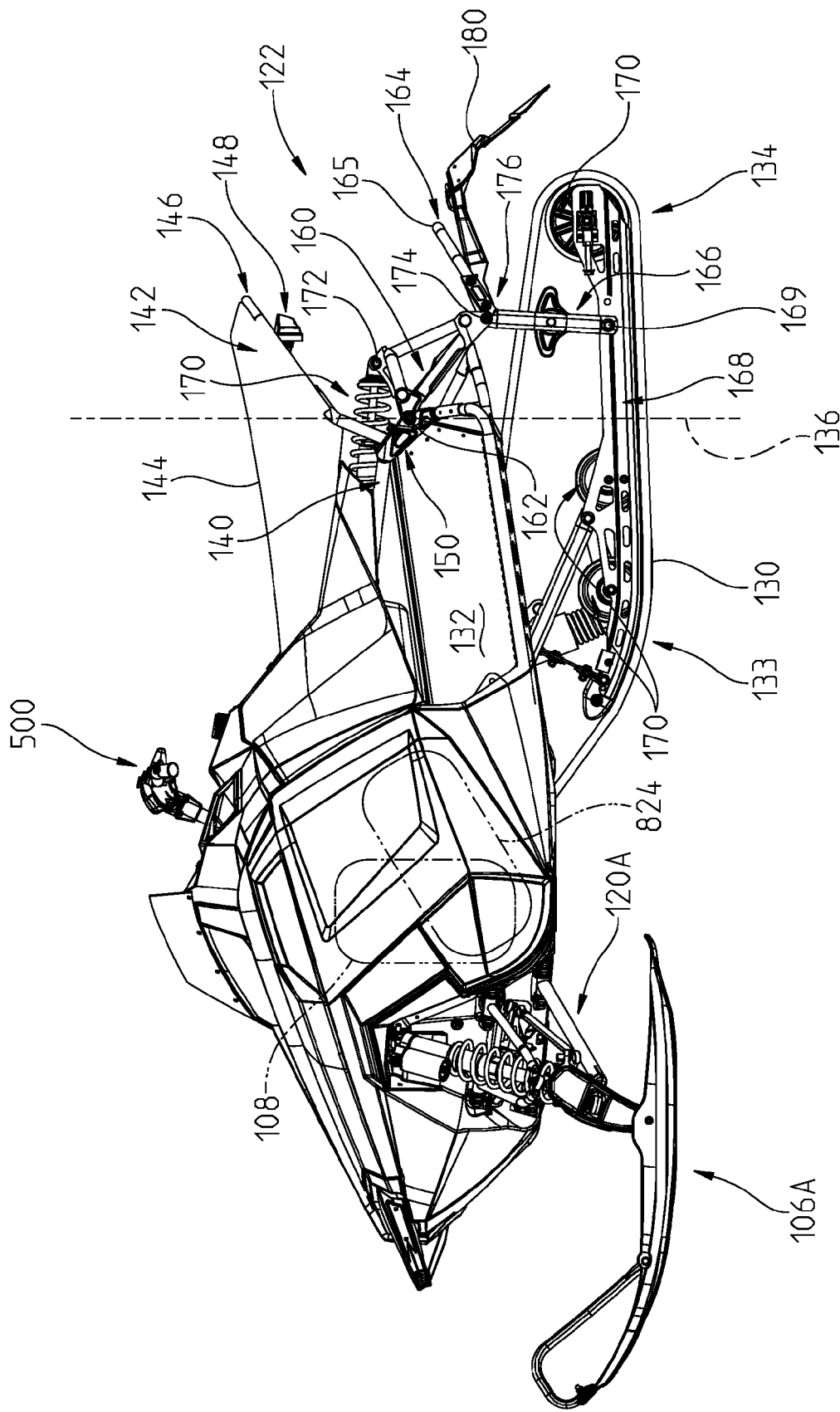
FIG. 6 illustrates a left side view of the exemplary snowmobile of FIG. 1.
Figure 7:
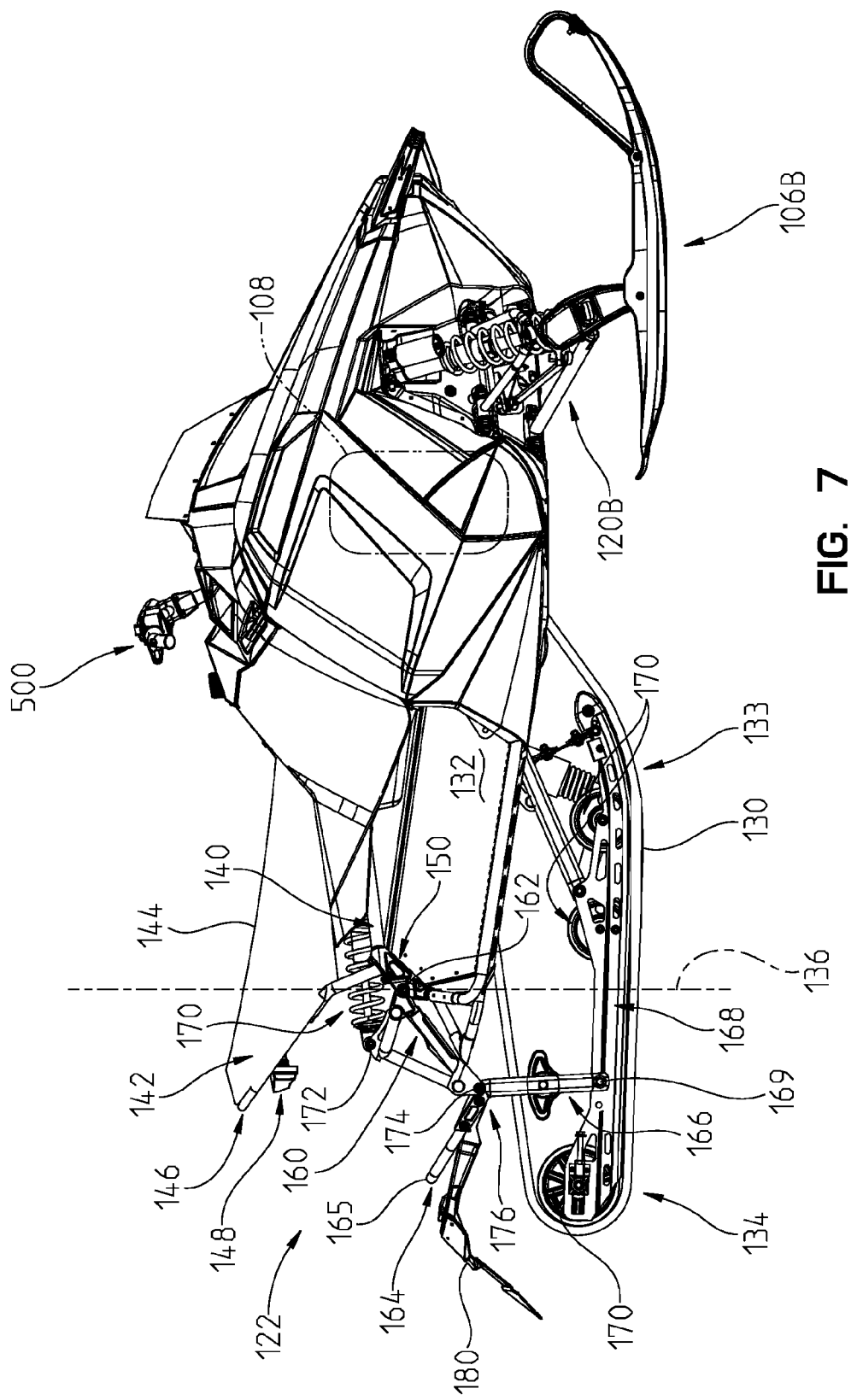
FIG. 7 illustrates a right side view of the exemplary snowmobile of FIG. 1.

As shown generally in FIGS. 3, 6, and 7, rear frame portion 116 includes a generally U-shaped tunnel 132 which covers a front portion 133 of endless track assembly 104. A rear portion 134 of endless track assembly 104 extends beyond the rear of tunnel 132. The rear of tunnel 132 is indicated in FIG. 6 by line 136.

Figure 12:
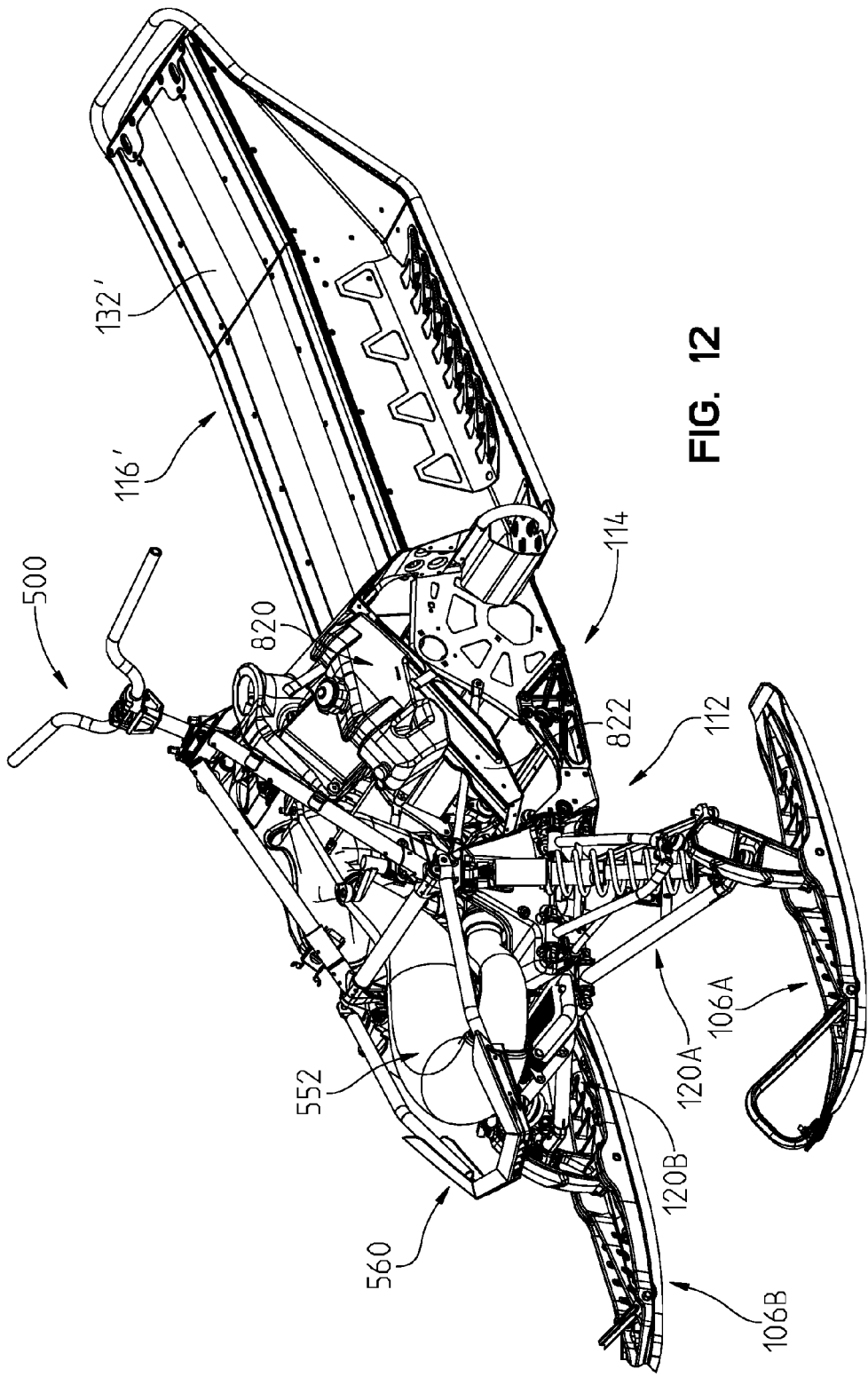
FIG. 12 illustrates a perspective view of another frame of the exemplary snowmobile of FIG. 1 along with several components supported by the frame.

Referring to FIG. 12, an alternative rear portion 116' of frame 110 is shown. Rear portion 116' includes an elongated tunnel 132' which generally covers an entire endless track assembly. Rear frame portion 116' is intended for use with a traditional rear snow mobile suspension, such as the Polaris Fusion rear suspension illustrated in FIG. 1 of U.S. patent application Ser. No. 11/623,879, published under Publication No. 2007-0221424, filed Jan. 17, 2007, titled SNOWMOBILE REAR SUSPENSION, the disclosure of which is incorporated by reference herein.

Returning to FIG. 10, rear portion 116 of frame 110 supports a sear bracket 140 which supports and couples a seat 142 shown in FIG. 1. In one embodiment, seat 142 is coupled to portion 147 of seat bracket 140 through couplers, such as screws, bolts, or other fasteners. Seat 142 includes a seating surface 144 upon which the operator of vehicle 100 is supported. A rear portion of seat 142 is supported by a rear seat support bracket 146. Referring to FIG. 6, rear seat support bracket 146 is coupled to rear frame portion 116 through a mounting bracket 150.

Mounting bracket 150 also couples seat bracket 140 to rear frame portion 116 as well as a portion of rear suspension 122 to rear frame portion 116. As shown in FIG. 6, rear seat support bracket 146 is coupled to mounting bracket 150 forward of the end of tunnel 132 is indicated by line 136. Further, rear seats support bracket 146 supports seat 142 beyond the end of tunnel 132 as indicated by line 136. In addition, rear seat support bracket 146 also provides a mounting location for tail light 148.

Figure 11B:
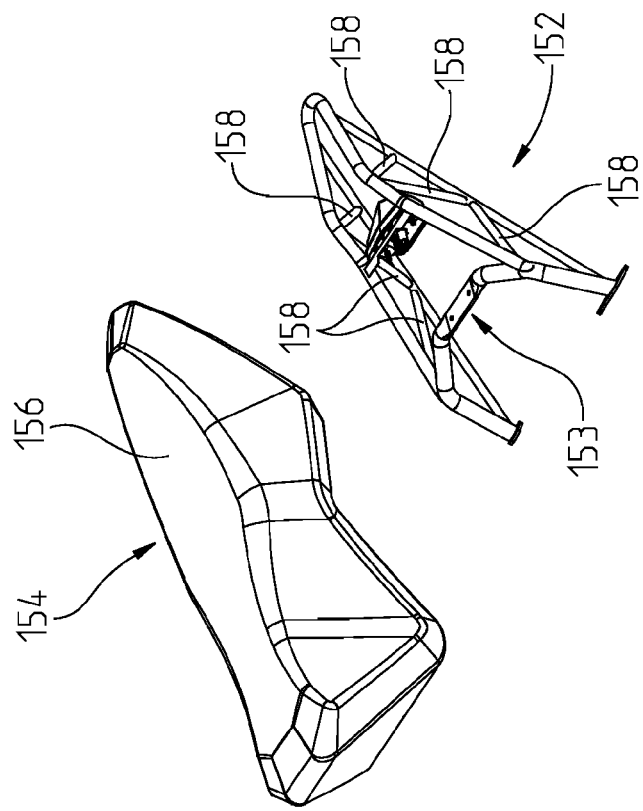
FIG. 11B illustrates another exemplary seat frame bracket and another exemplary seat cushion.
Figure 11A:
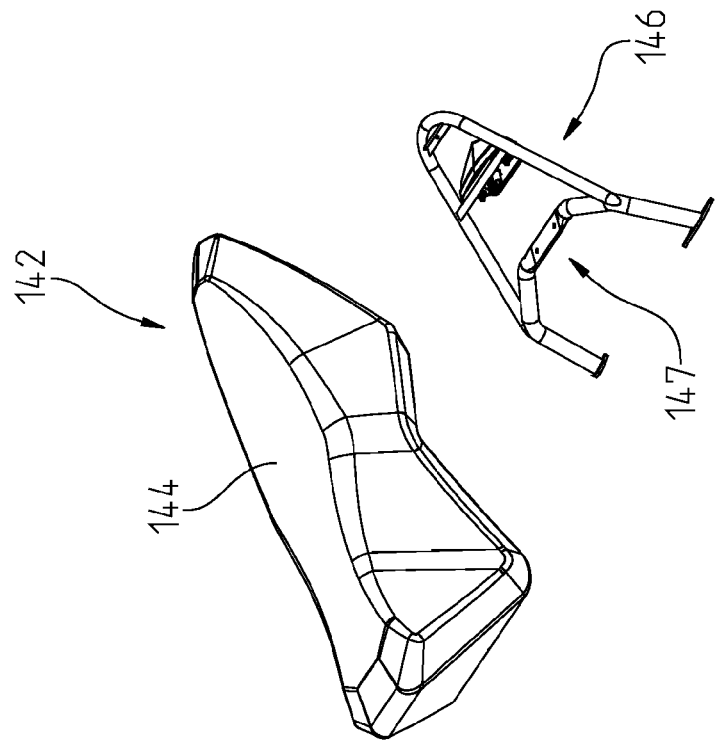
FIG. 11A illustrates an exemplary seat frame bracket and an exemplary seat cushion.

Referring to FIG. 11B, another rear seat support bracket 152 is shown which may be coupled to mounting bracket 150. Rear seat support bracket 152 is elongated relative to rear seat support bracket 146 which is shown FIG. 11a. The additional length of rear seat support bracket 152 accommodates an elongated seat 154 having a seating surface 156. Seat 154 is coupled to seat bracket 140 and portion 153 of rear seat support bracket 152. Rear seat support bracket 152 also includes a plurality of attachment bars 158 which permit the attachment of bungies or other cargo securing means to rear seat support bracket 152. In one embodiment, either rear seat support bracket 146 or rear seat support bracket 152 includes openings sized to cooperate with expansion retainers to couple cargo or cargo carrying devices to their respective rear seat support bracket 146 or rear seat support bracket 152. Additional details regarding expansion retainers and the openings to which they couple are provided in U.S. Pat. No. 7,055,454, to Whiting et al., filed Jul. 13, 2004, titled "Vehicle Expansion Retainers," the disclosure of which is expressly incorporated by reference herein.

Returning to FIG. 6, a rear bumper 164 is coupled to rear suspension 122. As shown in FIG. 6, rear suspension 122 includes an upper portion 160 which is rotatably coupled to mounting bracket 150 at a location 162. Location 162 corresponds to an axis of rotation extending out of the page of FIG. 6. Upper portion 160 is also rotatably coupled to a linear force element 170 at a location 172. Location 172 corresponds to an axis of rotation extending out of the page of FIG. 6. Rear suspension 122 further includes a lower portion 166 coupled to slide rails 168 at the location 169. Location 169 corresponds to an axis of rotation extending out of the page of FIG. 6. As known in the art slide rails 168 and idler wheels 170 are provided inside endless belt 130 and generally maintain endless belt 130 in its proper configuration and tension relative to driveshaft 126. Upper portion 160 of rear suspension 122 is rotatably coupled to lower portion 166 of rear suspension 122 at a location 174. Location 174 corresponds to an axis of rotation extending out of the page of FIG. 6.

As stated herein, rear bumper 164 is coupled to rear suspension 122 and extends rearward from rear suspension 122. In the illustrated embodiment rear bumper 164 is coupled to lower portion 166 of rear suspension 122 at a location 176 which is generally between the rotatable axis 162 and the rotation axis 169. As best shown in FIG. 3, rear bumper 164 moves with lower portion 166 of rear suspension 122.

A flexible snow deflector 180 is shown in FIG. 6. Snow deflector 180 has a first portion 179 which extends from location 162 to location 174, a second portion 181 which extends from location 174 generally out past the end of rear bumper 164, and a third portion 183 which is angled down relative to second portion 181. In one embodiment, first portion 179, second portion 181, and third portion 183 are a single component. In one embodiment, one or more of first portion 179, second portion 181, and third portion 183 are separate from the remainder of first portion 179, second portion 181, and third portion 183.

Snow deflector 180 may be coupled to locations 162 and 174 in any suitable manner. In one example, ties may be provided to couple snow deflector 180 to cross members extending over endless track belt 130. In another example, snow guard 180 includes clips or passageways which receive a portion of the cross members extending over endless track belt 130. Second portion 181 of snow deflector 180 may be coupled to rear bumper 164 through ties to keep snow deflector 180 spaced apart from endless belt 130.

Flexible snow deflector 180 is generally coupled to frame 110 at the rear of tunnel 132 and is coupled to upper portion 165 of rear bumper 164. In one embodiment, snow deflector 180 is a flexible snow flap. Snow deflector 180 moves with rear bumper 164 as rear suspension 122 is compressed or extended during the operation of vehicle 100.

Figure 14:
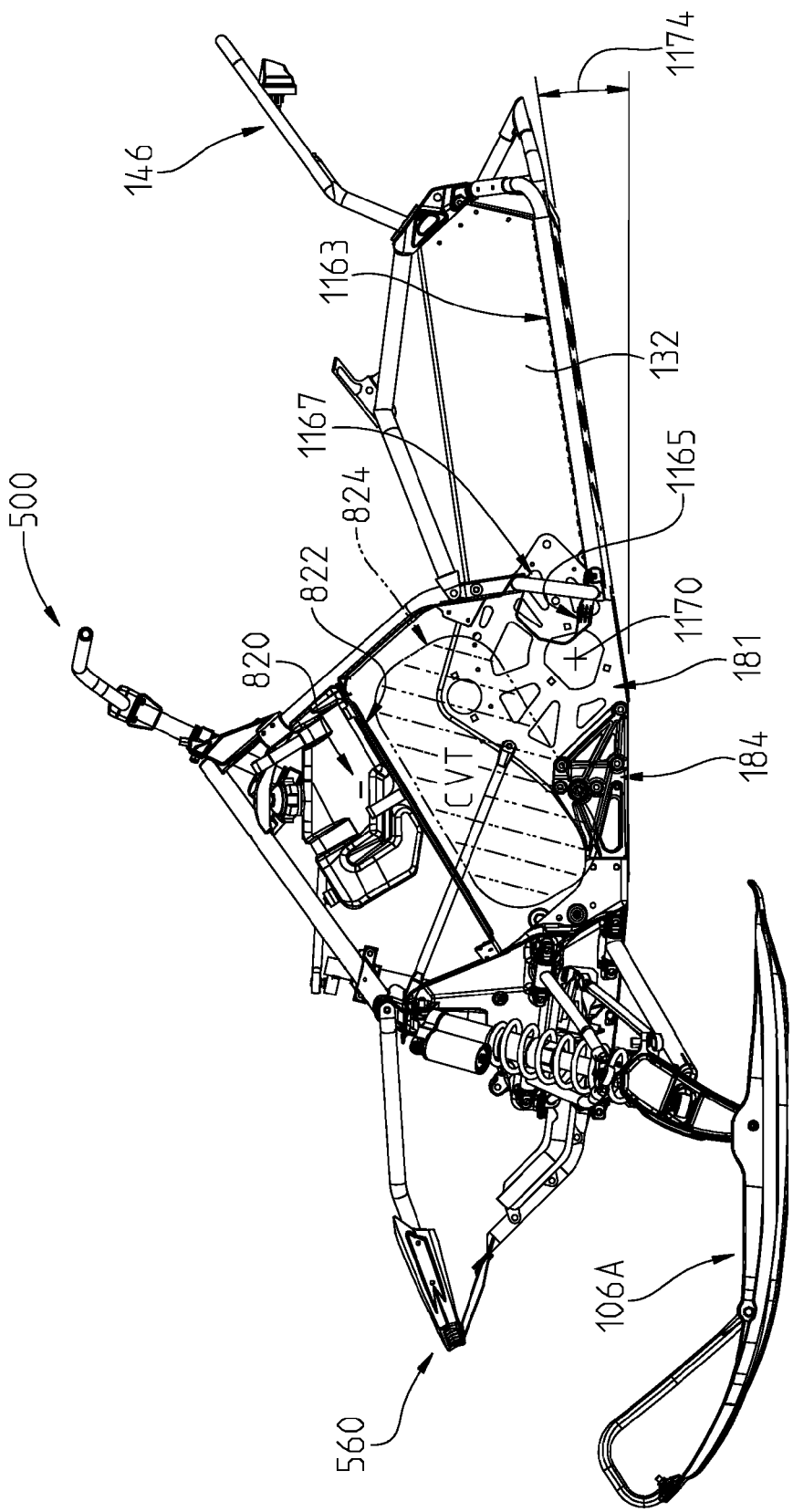
FIG. 14 illustrates a side view of a portion of the assembly of FIG. 10.
Figure 15:
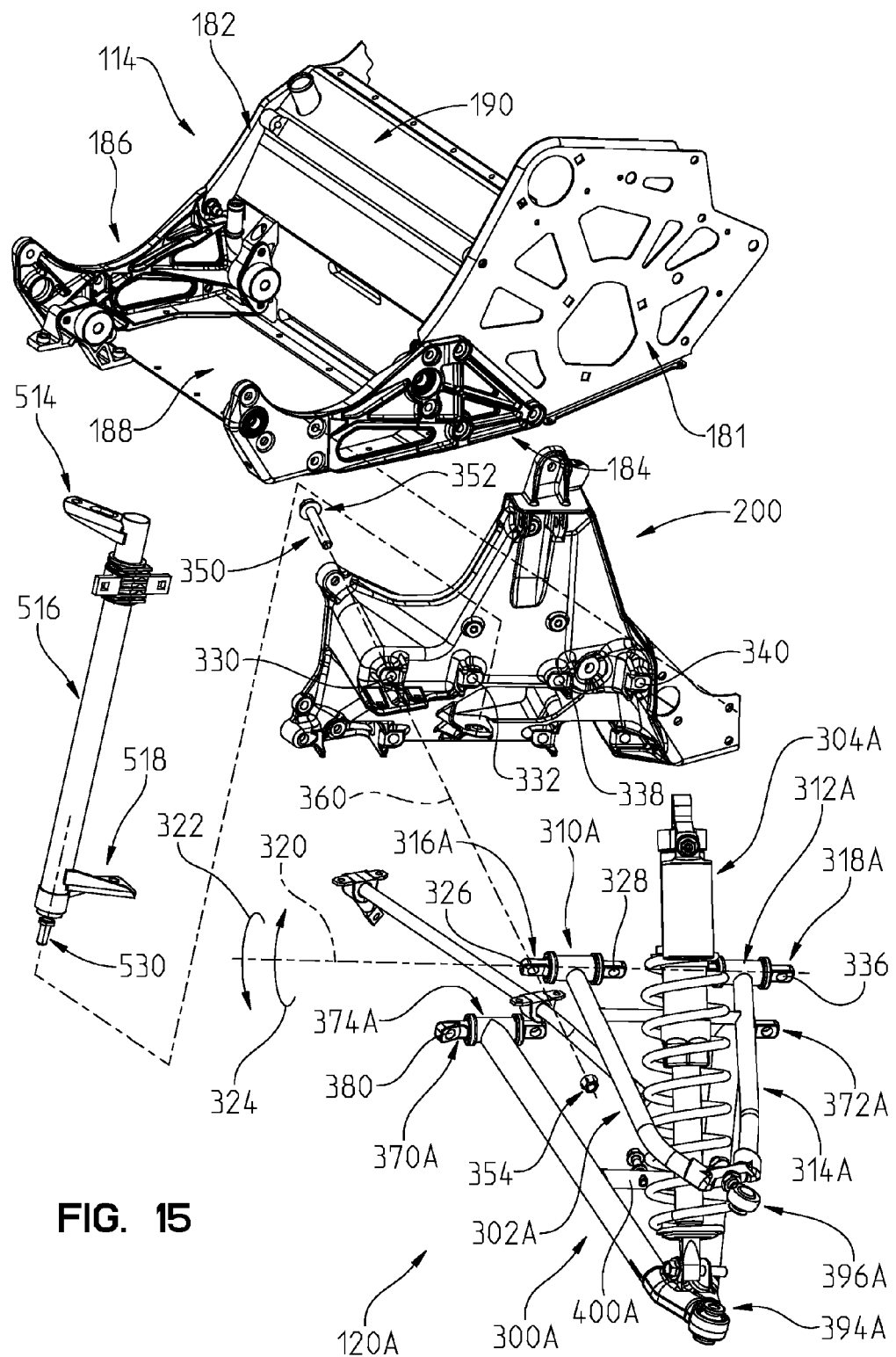
FIG. 15 illustrates a portion of the frame of FIG. 10 including a left front clip casting, a left side casting, a right side casting, a floor portion extending therebetween, a left side bulkhead, and a right side bulkhead, and a tunnel front member which also provides a cooler unit for the cooling system of the exemplary snowmobile of FIG. 1.
Figure 33:
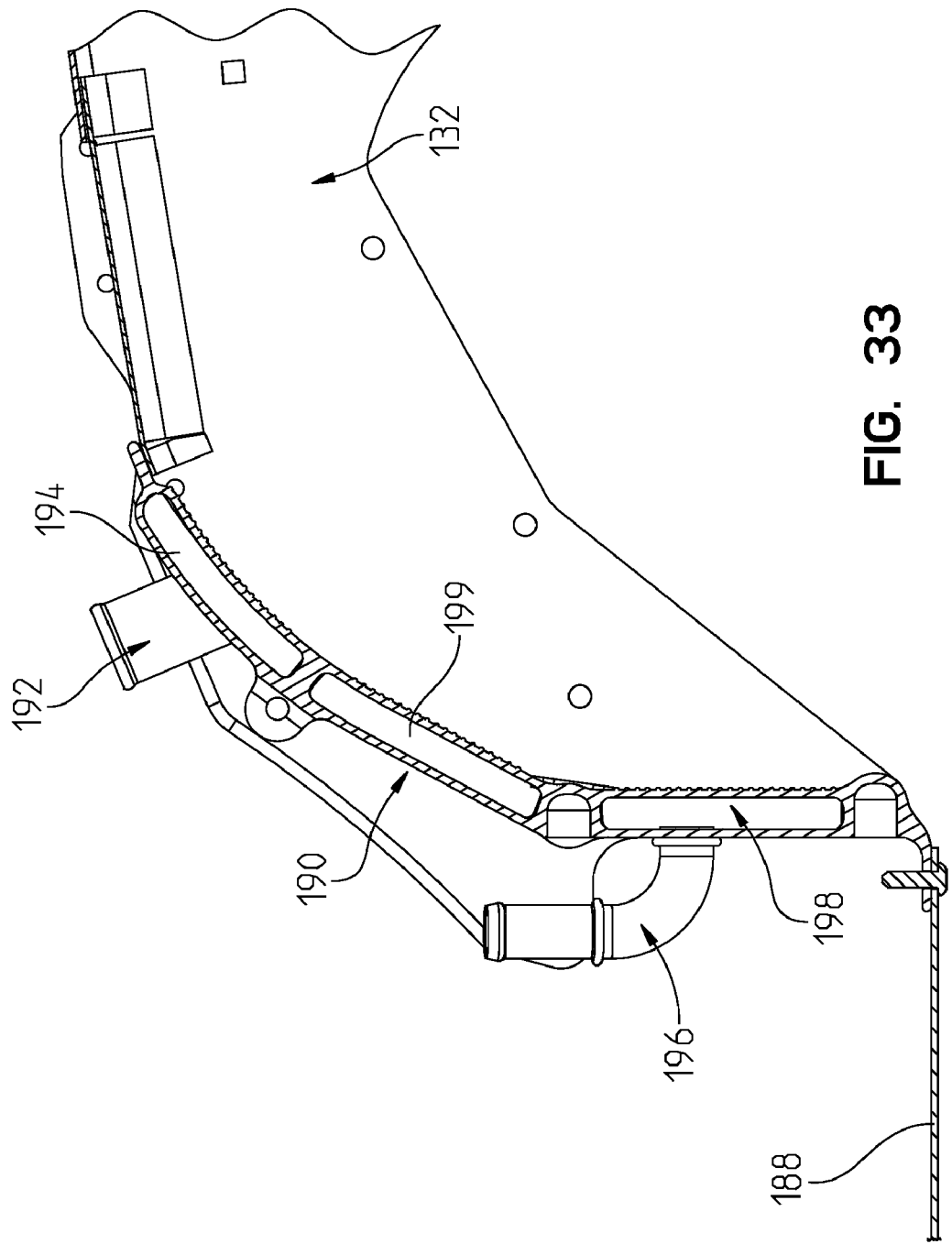
FIG. 33 illustrates a sectional view of a center cooler of the cooling system of FIG. 32.

Referring to FIG. 14, mid-frame portion 114 of frame 110 includes a bulkhead member 181 and a bulkhead head member 182 (See FIG. 52) which are coupled to tunnel 132 on the left side and the right side of vehicle 100, respectively. Middle frame portion 114 further includes a left side bulkhead member 184 and right side bulkhead member 186 (See FIG. 15). Bulkhead members 184 and 186 are coupled to respective bulkhead members 181 and 182. In one embodiment, bulkhead members 184 and 186 are cast components. As explained herein, these cast components include mounting locations for other frame members and components of vehicle 100. Referring to FIG. 15, mid-frame portion 114 of frame 110 further includes a floor member 188 which is coupled to and extends between cast members 184 and 186. Floor member 188 is coupled along its rearward edge to a front cooler unit 190 as shown in FIG. 33.

Front cooler unit 190 serves as a structural component of frame 110. Referring to FIG. 33 front cooler 190 provides a front portion of tunnel 132. Front cooler 190 includes a first fluid conduit 192 which is in fluid communication with a fluid conduit 194 internal to front cooler 190. Front cooler 190 further includes a second fluid conduit 196 which is in fluid communication with a second internal fluid conduit 198 of front cooler 190. Front cooler 190 further includes a third internal fluid conduit 199. Fluid flows through front cooler 190 from one of first fluid conduit 192 and second fluid conduit 196 to the other of first fluid conduit 192 and second fluid conduit 196 by way of fluid conduits 194, 198, and 199.

Figure 32:
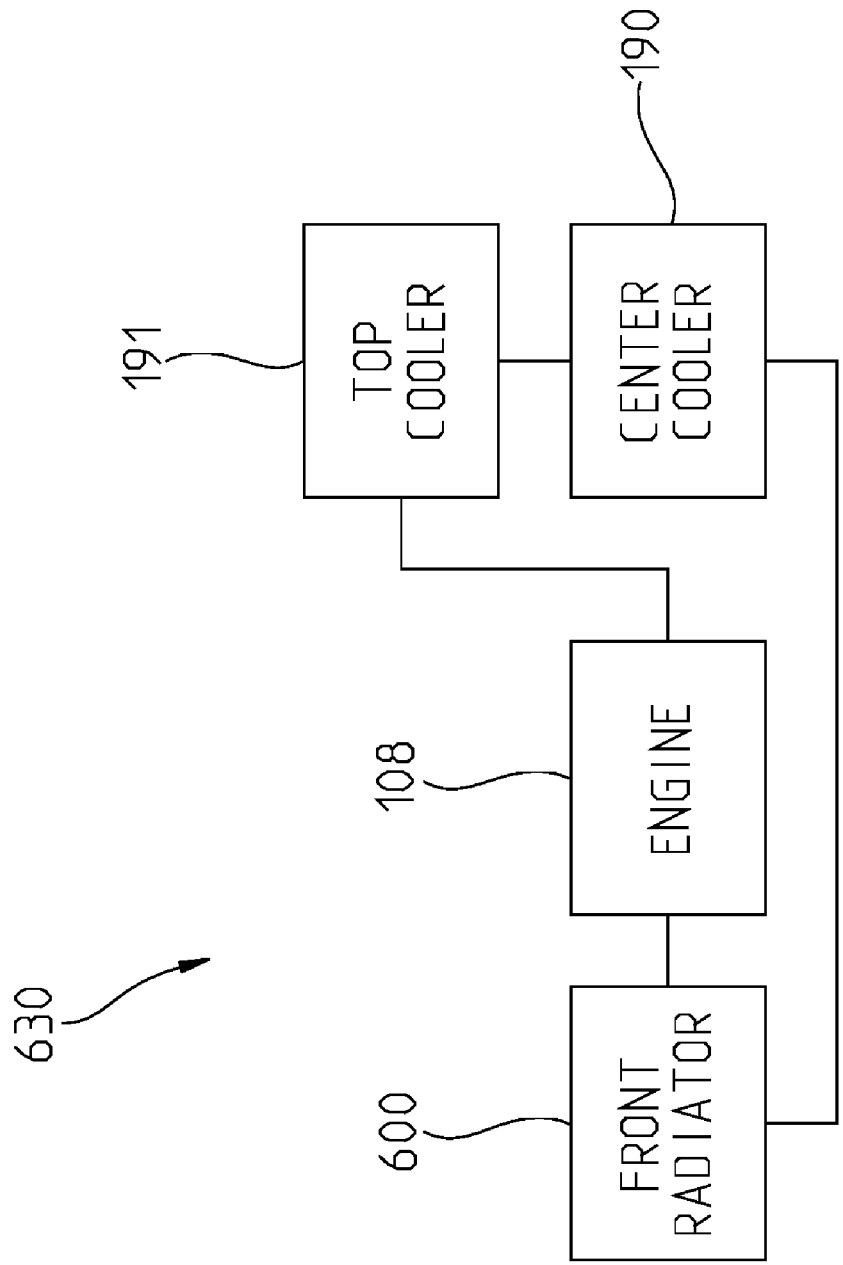
FIG. 32 illustrates a representation of a cooling system for the power source of the exemplary snowmobile of FIG. 1.

In one embodiment, front cooler 190 is a part of a cooling system 630 of vehicle 100, represented in FIG. 32. Referring to FIG. 32, cooling system 630 includes a front radiator 600, front tunnel cooler 190, and a top tunnel cooler 191. Warmed cooling fluid from engine 108 is circulated through front radiator 600, front tunnel cooler 190, and a top tunnel cooler 191 to be cooled and then is provided back to engine 108. Front tunnel cooler 190 and top tunnel cooler 191 mainly cool the fluid due to snow present in tunnel 132 during operation. However, sometimes the amount of snow brought into contact with front cooler 190 and top cooler 191 is not sufficient to cool the fluid. Front radiator 600 cools the fluid due to air passing therethrough. As such, front radiator 600 and the coolers 190 and 191 combine to cool the fluid in most riding environments. Exemplary front radiators are discussed herein.

Figure 18:
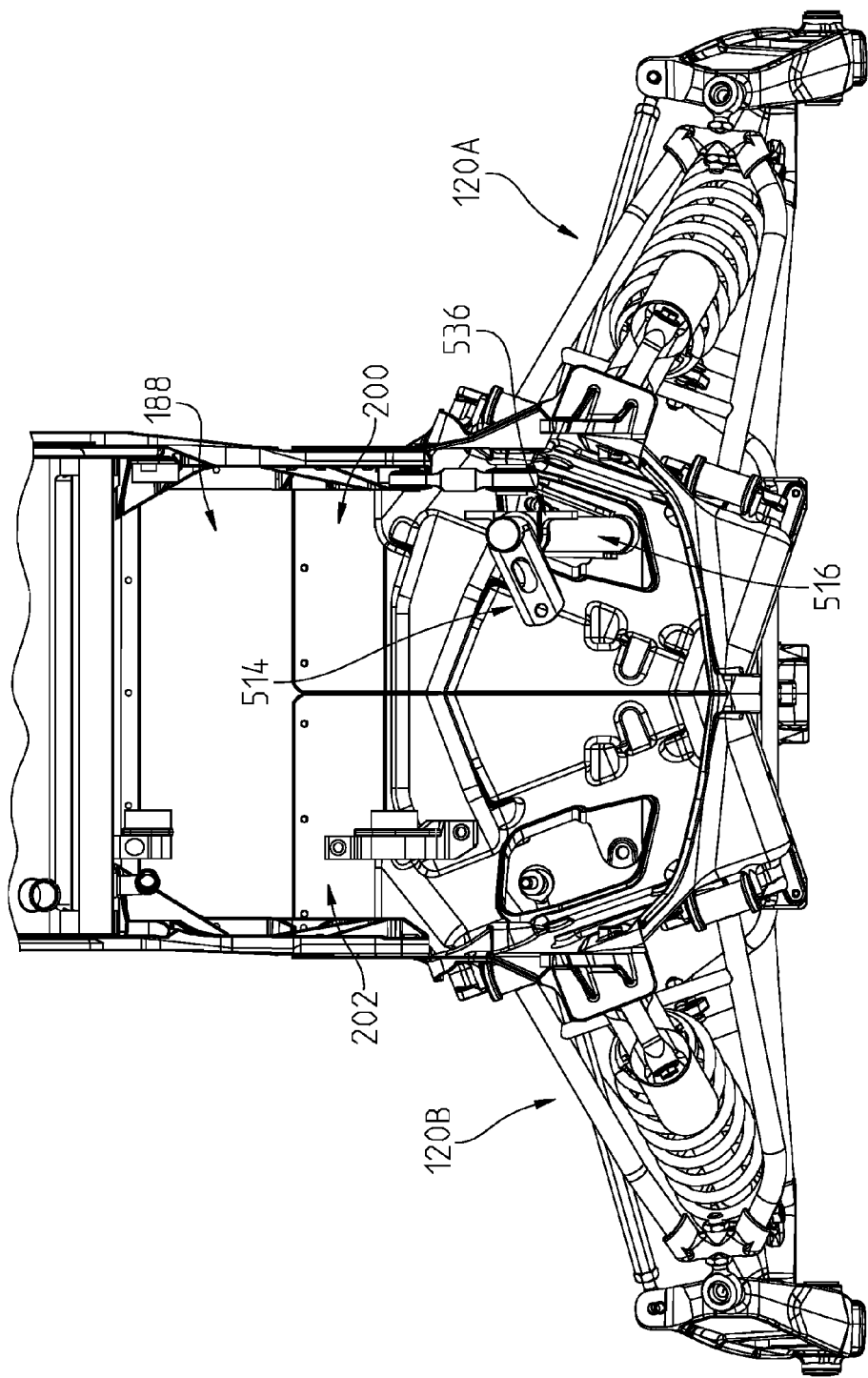
FIG. 18 illustrates a top view of the assembly of FIG. 16.

Returning to the frame 110 and FIG. 18, floor member 188 is further coupled along its front portion to a left side cast clip member 200 of front frame portion 112 and a right side clip member 202 of front frame portion 112. Referring to FIG. 15, left side cast clip member 200 is further coupled to left bulkhead member 184 through a plurality of couplers (not shown), such as bolts. In a similar manner, right side cast clip member 202 is coupled to right bulkhead member 186.

Figure 16:
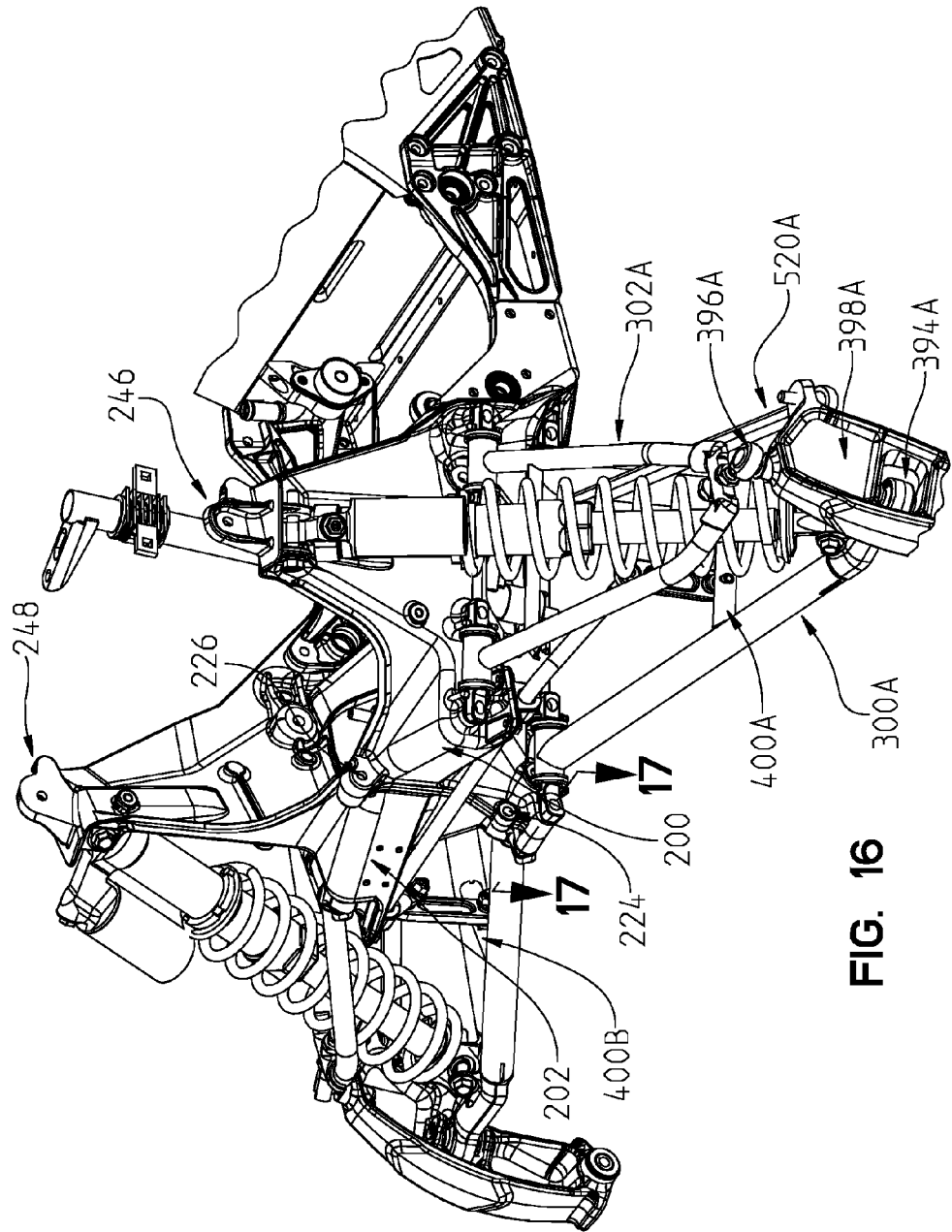
FIG. 16 illustrates an independent front suspension assembled to a portion of the frame of FIG. 10 including a left front clip casting, a right front clip casting.
Figure 19:
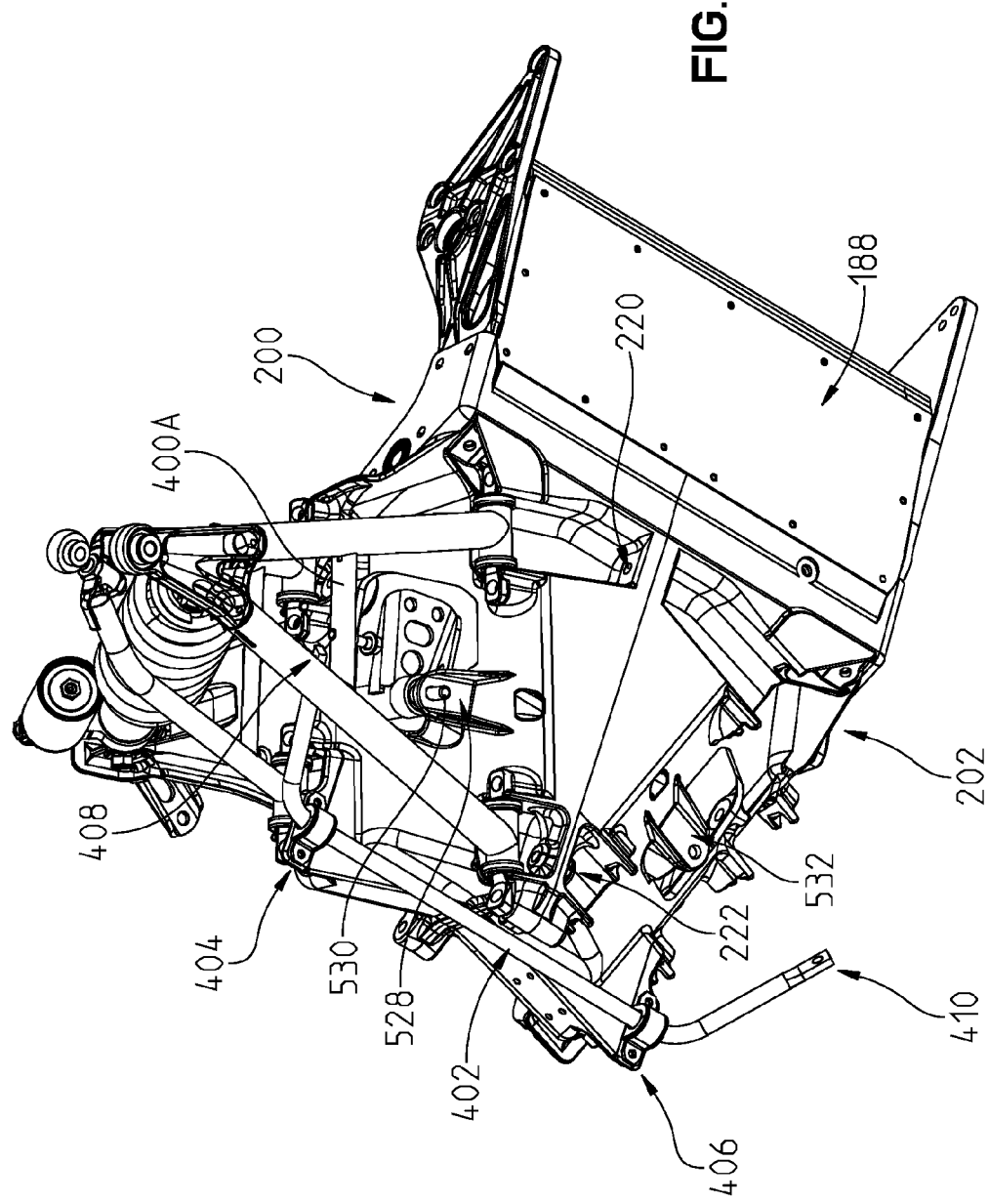
FIG. 19 illustrates a lower, left, perspective view of the assembly of FIG. 16.

Referring to FIG. 19, left side cast clip member 200 is coupled to right side cast clip member 202 at first lower location 220 and a second lower location 222 by respective couplers (not shown), such as bolts. Referring to FIG. 16, left side cast clip member 200 and right side cast clip member 202 are further coupled together at locations 224 and 226 through respective couplers (not shown), such as bolts. As discussed herein in relation to FIG. 17, left side cast clip member 200 and right side cast clip member 202 are further coupled together through a connection that also couples a portion of left side front suspension 120A and right side front suspension 120B to the respective left side cast clip member 200 and right side cast clip member 202.

Figure 23:
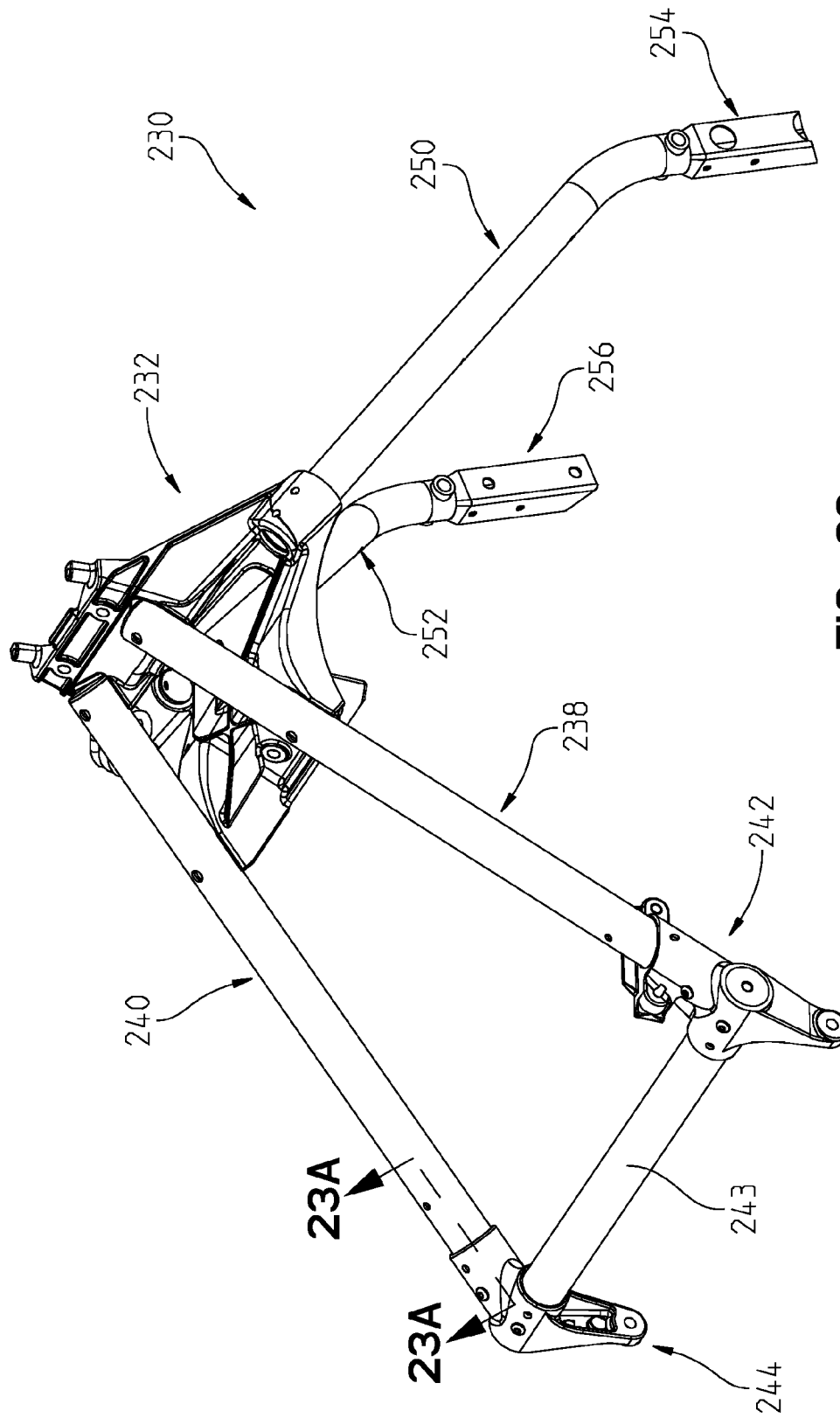
FIG. 23 illustrates a front, perspective view of an over structure of the frame.
Figure 24:
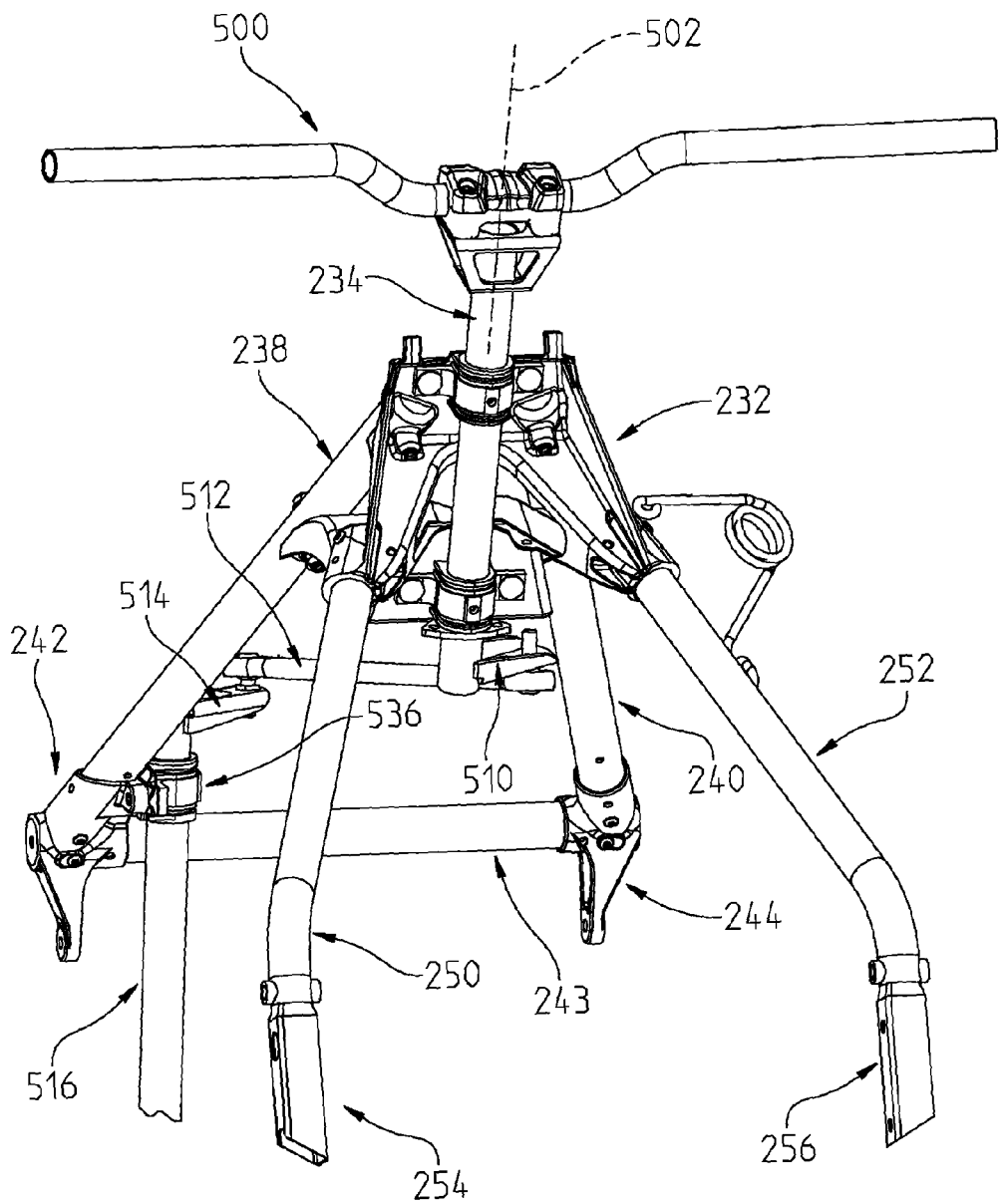
FIG. 24 illustrates a rear, perspective view of the over structure of FIG. 23.

Referring to FIG. 23 an overstructure 230 is shown which is coupled to frame 110 as shown in FIG. 10. Overstructure 230 includes a upper mount member 232 which as shown in FIG. 24 provides mounting for an upper steering post 234 of a steering assembly 236 (see FIG. 21) of vehicle 100. Coupled to a front side of upper mounting member 232 are two tubular components 238 and 240. Tubular components 238 and 240 are mounted to mounting lugs 242 and 244, respectively. Mounting lugs 242 and 244 are further coupled to left side cast clip member 200 at location 246 (see FIG. 16) and right side cast clip member 202 at location 248 (see FIG. 16), respectively. Two tubular members 250 and 252 are coupled to upper mounting member 232 on the rear side of mounting member 232 as shown in FIG. 24. Tubular components 250 and 252 are further coupled to mounting components 254 and 256 which are coupled to rear frame portion 116 of frame 110 as shown in FIG. 14.

The various connections between frame members may be made by traditional mechanical couplings such as bolts, welds and screws and other types of fasteners. In one embodiment, at least a portion of the connections between the various frame members are made at least in part with a structural adhesive. In the illustrated embodiment the connection between mounting lug 244 and tubular component 240 is made at least in part with a structural adhesive.

Figure 23A:
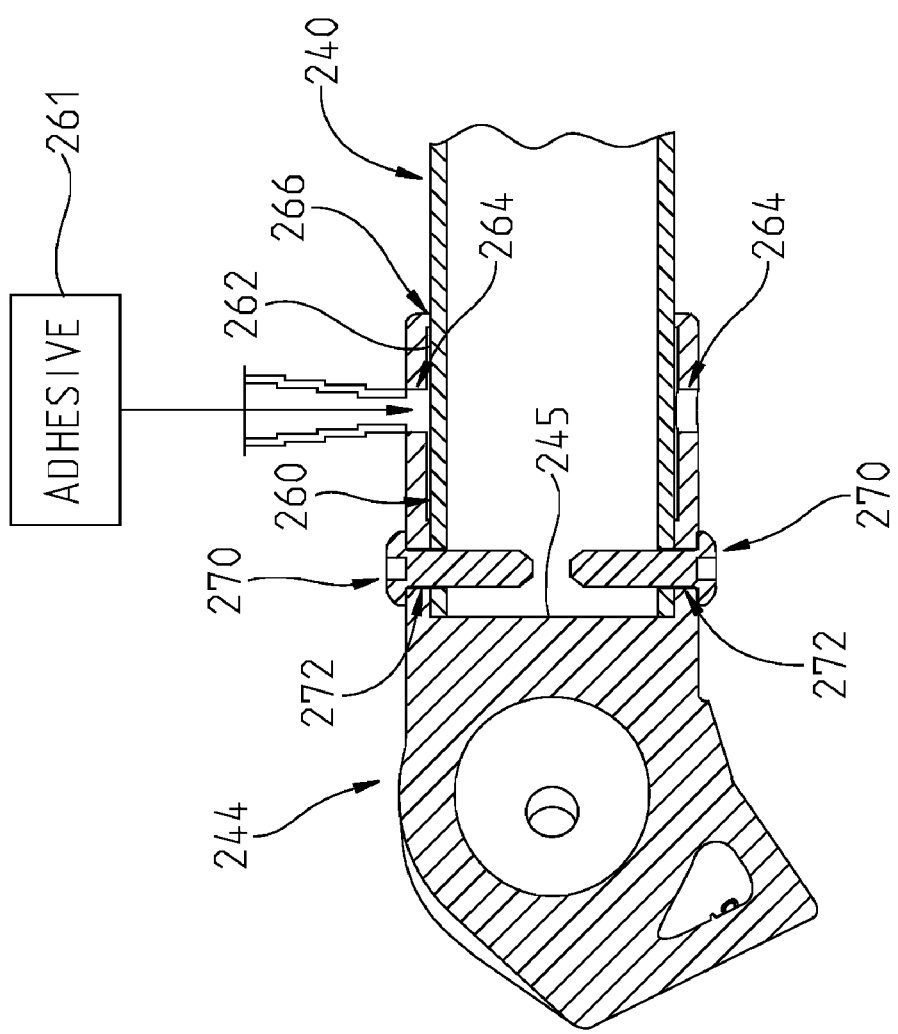
FIG. 23A illustrates an adhesive joint provided between two components of the over structure of FIG. 23.

Referring to FIG. 23A, the joint between mounting lug 244 and tubular component 240 is shown. Mounting lug 244 includes a recess 260. In one embodiment, recess 260 is a part of component 240 as opposed to mounting lug 244. Regardless component 240 and mounting lug 244 cooperate to define an adhesive cavity 262 into which an adhesive 261 may be introduced through a port 264 in mounting lug 244. The adhesive cavity 262 is bounded on the one end by a lip 266 which shuts off the axial end of adhesive cavity 262. Component 240 and mounting lug 244 are secured together through the use of mechanical fasteners 270 which are received in openings 272 in mounting lug 244. In one embodiment, fasteners 270 are self piercing rivets which pierce through component 240 and secure the location of component 240 relative to mounting lug 244. In the illustrated embodiment, adhesive cavity 262 circumscribes component 240. As illustrated, adhesive cavity 262 includes two ports 264 into which the adhesive may be introduced. The use of two ports provides for more uniform filling of adhesive cavity 262 with the adhesive 261. In one embodiment, a single adhesive port 264 is provided. In another embodiment three or more adhesive ports 264 are provided.

By having adhesive cavity 262 circumscribe component 240 a width of the joint formed by adhesive component 262 is maximized. In general, increasing a width of the joint formed by an adhesive 261 provides a greater increase in joint strength than increasing a length of the joint provided by adhesive 261. In one embodiment, tubular component 240 is an extruded tube. In one embodiment, tubular component 240 is a drawn tube. In general, the joint strength when component 240 is a drawn tube has been found to be about 10 percent stronger than the joint strength when component 240 is an extruded tube. In addition the thickness of adhesive cavity 262 relates to the strength of the joint formed by adhesive 261. If the thickness is too thin the resulting joint may be too weak. If the thickness is too great the resulting joint may not properly transfer the load from component 240 and mounting lug 244 to the other of component 240 and mounting lug 244. In one embodiment, the thickness of adhesive cavity 262 is in the range of about 0.25 millimeters (mm) up to about 0.76 mm. In one embodiment, the surface of tubular component 240 should be prepped prior to assembly to mounting lug 244. Exemplary surface preparations include a dry rag wipe, a solvent degrease, a vapor degrease, a mechanical abrasion of the surface, plasma treatment, chemical etching, and anodizing.

Through the use of adhesive 261 component 240 and mounting lug 244 may be joined regardless of whether component 240 and mounting lug 244 are made of similar materials or dissimilar materials.

The ability to combine different materials or dissimilar materials together allows the use of materials which are best suited for the operation of each of mounting lug 240 and 244. Further, the use of an adhesive distributes the load of a joint over an area rather than concentrating it at a point or a line as is the case with rivets and welds. Stress spikes from drilled holes are reduced and the structural changes to the materials caused by welding which affect material fatigue strength are eliminated and the components are not distorted dimensionally from the welding process. In one embodiment, the adhesive also forms a seal as well as a bond resulting in eliminating the need for the sealing of the joint between mounting lug 240 and 244. Further, the amount of transferred noise and vibration is reduced due to the elimination or reduction in metal on metal contact.

In one embodiment, the adhesive 261 is an acrylic adhesive. An exemplary acrylic adhesive is Lord 406 adhesive available from Lord corporation having offices located at 5101 E. 65$^{th}$ Street, Indianapolis, Ind. 46220. In one embodiment, the Lord 405 acrylic adhesive is combined with an accelerator to promote the curing of the 406 adhesive. An exemplary accelerator is Lord 19 also available from Lord Corporation. For joints not having a defined adhesive cavity such as adhesive 261, Lord 19 GB accelerator may be used in combination with the acrylic adhesive. The Lord 19 GB accelerator includes glass beads to promote uniform bond line thickness between substrates. In one embodiment, the glass beads are 0.01 inches (in.) in diameter. In one embodiment, the cure time of the adhesive joint formed by adhesive 261 is approximately 24 hours at room temperature.

The use of adhesive 261 may be used to join other components of frame 110 together. In one embodiment, floor component 188 is joined to left side cast clip 200 and right side cast clip member 202 through use of an acrylic adhesive and an accelerator having the spacer components to provide a generally uniform bond line. In one embodiment, the spacer components are the glass beads such as provided by Lord A19 GB accelerator. In other embodiments, one or both of floor member 188 and clip members 200 and 202 may include standoffs which define the thickness of the adhesive joint.

In addition, structural adhesives may be used to join together front cooler 190 and floor member 188, front cooler 190 and tunnel 132, bulkhead 181 and tunnel 132, bulkhead 182 and tunnel 132, bulkhead 184 and bulkhead 181, bulkhead 182 and bulkhead 186, mounting lugs 244 and tubular component 243, mounting lug 244 and tubular component 243, mounting component 242 and tubular component 238. Further, to the extent tunnel 132 or tunnel 132' includes side tunnel coolers, these side tunnel coolers may be secured to the tunnel through the use of structural adhesives. In any of these frame joints, mechanical fasteners, such as rivets, may be used to locate components while the adhesive forms the majority of the strength of the joint.

In one embodiment, tubular component 240 is joined to mounting lug 244 by inserting the end of tubular component 240 into the opening in mounting lug 244 as shown in FIG. 23A. Once tubular component 240 contacts an end wall 245 of mounting lug 244 mechanical fasteners 270 are passed through openings 272 in mounting lug 244 and are affixed to component 240. Mechanical fasteners 270 serve to locate component 240 relative to mounting lug 244. At this point, adhesive 261 is provided to adhesive cavity 262 through the one or more ports 264 provided in mounting lug 244. In one embodiment, the volume of adhesive cavity 262 is predetermined in such that a predetermined amount of adhesive 261 is injected into adhesive cavity 262. The predetermined amount of adhesive 261 generally corresponds to the volume of adhesive cavity 262. Once adhesive 261 has cured the strength of the joint between components 240 and 244 is largely governed by the strength of the adhesive joint between component 240 and mounting lug 244. In one embodiment, the curing of adhesive 261 may be accelerated by applying heat during the curing process.

In one embodiment, floor component 188 is coupled to cast components 200 and 202 by first applying the adhesive 261 to one or both of floor component 188 and cast components 200 and 202 and then positioning floor component 188 relative to cast components 200 and 202. The joint between floor member 188 and cast components 200 and 202 may be further reinforced through the use of mechanical fasteners.

In one embodiment, at least two frame members are assembled by attaching the members together with mechanical fasteners, such as rivets, for location of the members relative to each other and then use of a structural adhesive to complete joint between the members. The use of the mechanical fasteners replaces the need to clamp the members together until the adhesive sets.

Figure 25:
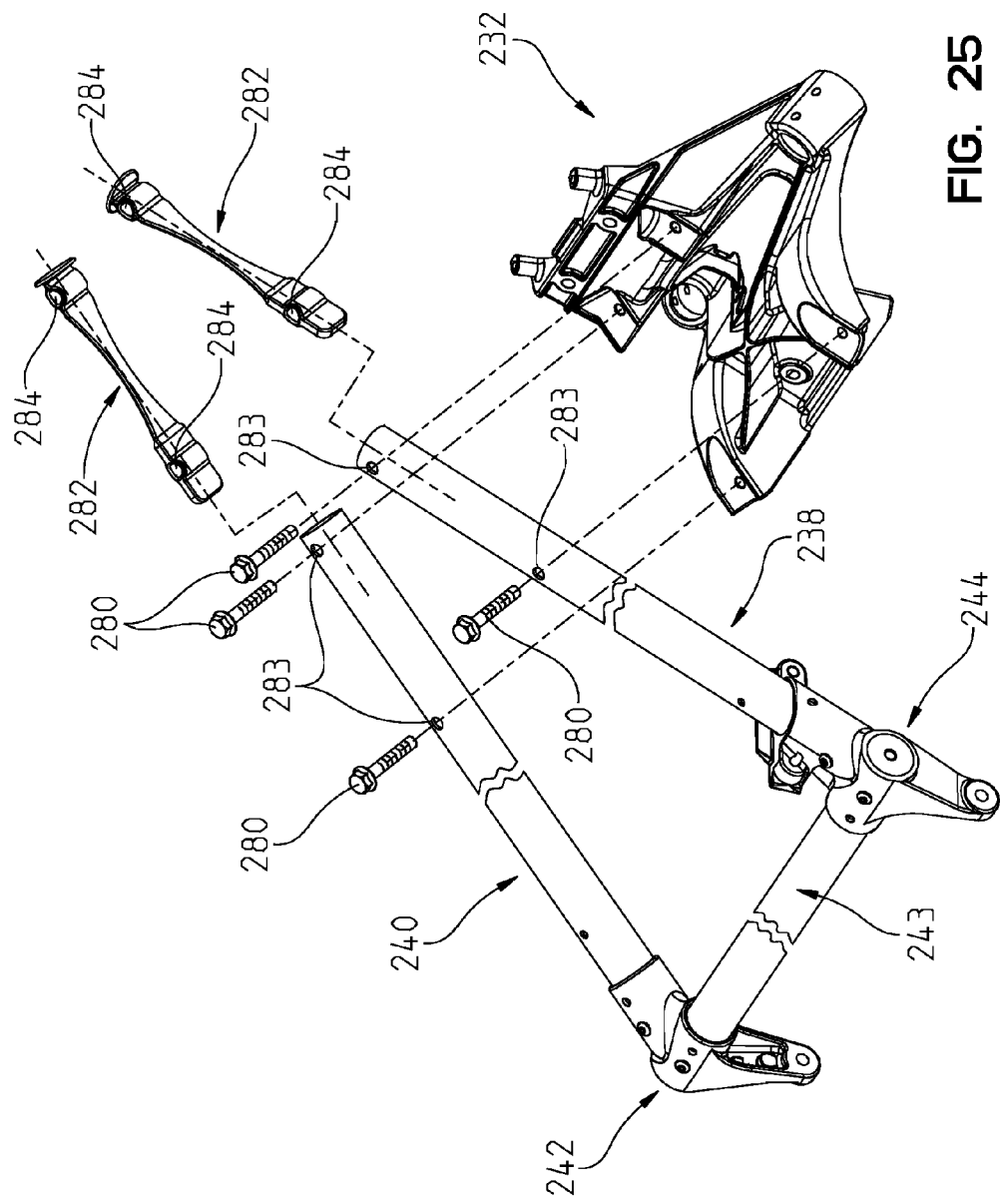
FIG. 25 illustrates the assembly of stiffener members into the over structure of FIG. 23.

Referring to FIG. 25 each of tubular members 238 and 240 are coupled to upper mounting member 232 through a plurality of mechanical fasteners, illustratively bolts 280. Bolts 280 are received through openings in tubular components 238 and 240 and thread into upper mounting member 232. In the illustrated embodiment, stiffening members 282 are provided which are received inside tubular components 238 and 240, respectively. Stiffening members 282 include openings 284 which align generally with openings 283 in tubular components 238 and 240. Further, the regions of stiffening member 282 surrounding openings 284 are generally equal to and follow the contour of the internal diameter of tubular components 238 and 240. As such, stiffening members 282 provide a generally solid structure for tubular components 238 and 240 in the regions corresponding to couplers 280.

Referring to FIG. 15, the connections between front suspension 120a and left side cast clip member 200 are illustrated. The mounting of right front suspension 120b generally mirrors the mounting of left front suspension 120a. Left front suspension 120a includes a lower control arm 300A, an upper control arm 302A, and a shock member 304A. Upper control arm 302A includes a first collar portion 310A and a second collar portion 312A which are each coupled to a generally U-shaped control arm member 314A. Each of collars 310A and 312A are rotatably coupled to mounting members 316A and 318A respectively. Mounting members 316A and 318A are rotatable relative to respective collar members 310a and 312a about axis 320 in directions 322 and 324. Mounting member 316A includes openings 326 and 328 which may be aligned with openings 330 and 332 in left side cast clip member 200. Similarly mounting bracket 318A includes openings (not shown) and 336 which align generally with openings 338 and 340 in left side cast clip member 200. Each of the openings of mounting brackets 316A and 318A are coupled to left side cast clip member 200 through a mechanical coupler. As illustrated for opening 326, a bolt 350 is introduced from an inside portion of left side cast clip member 200 through opening 330 such that a head 352 of bolt 350 rests against the inside of left side cast clip member 200. Bolt 350 is also passed through opening 326 in mounting member 316A. Finally, a nut 354 is threaded onto bolt 350 to secure mounting bracket 316A to left side cast clip member 200. In a similar manner, opening 328 in mounting bracket 316A and the openings of mounting bracket 318A receive bolts 350 to couple the respective mounting brackets to the left cast clip member 200. In one embodiment, the axis of bolt 350 generally illustrated as assembly line 360 is generally perpendicular to axis 320. Of course, an end portion of mounting bracket 316A or 318A may be angled relative to axis 320 such that axis 360 is not perpendicular to axis 320.

Lower control arm 300A is generally mounted to left side cast clip member 200 in the same manner as upper control arm 302A. In particular, lower control arm 300A includes mounting brackets 370A and 372A which are received in collars 374A and 376A, respectively. Each of the openings of mounting brackets 370A and 372A are secured to left side cast clip member 200 as described above for control arm 302A with the exception of opening 380.

Figure 17:
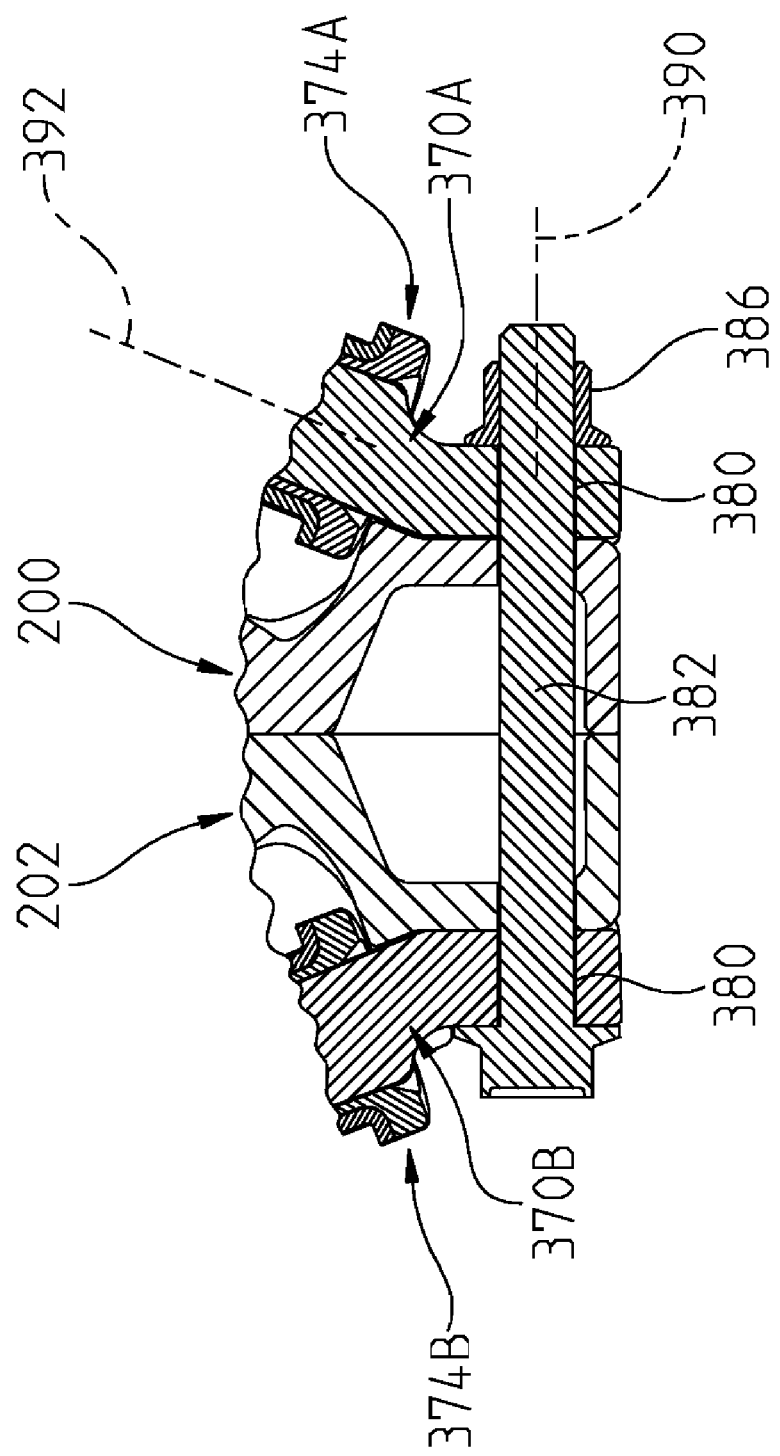
FIG. 17 illustrates a connection of a left lower control arm of the front suspension and a right lower control arm of the front suspension to the frame; along lines 17-17 in FIG. 16.

Referring to FIG. 17 a portion of left side cast clip member 200 and right side cast clip member 202 are shown along with mounting members 370A of left front suspension 120A and 370B of right front suspension 120B. Each of mounting members 370A and 370B include an opening 380. A mechanical coupler illustratively a bolt 382, passes through opening 380 in right mounting component 370B, through right side cast clip member 202, through left side cast clip member 200, and extends beyond left mounting member 370A. Bolt 382 is held in place through a nut 386 which is threadably secured to bolt 382. The connection illustrated in FIG. 17, in addition to mounting lower control arm 300A and 300B to frame 110, also provides another connection point between left side cast clip member 200 and right side cast clip member 202. Further, the same coupler 382 is used to secure both a portion of control arm 300A and 300B to frame 110.

As shown in FIG. 17, the direction of mounting 390 is not perpendicular to an axis of rotation 392 of lower control arm 300. In one embodiment, the mounting direction 390 and axis of rotation 392 form an angle of about 67 degrees. In one embodiment, the mounting direction of a control arm is relative to an axis of rotation of the control arm from about plus or minus about 68 degrees up to 90 degrees.

The mounting of the control arms in a direction angled relative to the direction of rotation, reduces the likelihood that cast clips 200 and 202 would be damaged in an accident. Rather, the control arms would break from the respective cast clip 200 and 202 prior to the respective cast clip 200 and 202 being damaged.

Returning to FIG. 15, each of control arms 300A and 302A include a ball joint component 394A and 396A, respectively. As shown in FIG. 16 ball joint components 394A and 396A are coupled to a spindle 398A which is further coupled to ski 106A. Spindle 398A is permitted to rotate relative to control arms 300A and 302A as well as to rotate relative to ski 106a. In one embodiment, the axis of rotation 320 of upper control arm 302A and the axis of rotation 392 (which includes both collar 37A and collar 376A) of lower control arm 300A are generally parallel. In another embodiment the axis of rotation 320 of upper control arm 302A is angled to relative to the axis of rotation 392 of lower control arm 300A. In one embodiment, lower control arm 300A and upper control arm 302A are angled as suggested in U.S. Pat. No. 6,942,050, the disclosure of which is expressly incorporated herein by reference. In one embodiment, the lower control arm 300A and upper control arm 302A are angled as suggested in U.S. patent application Ser. No. 12/135,107, filed Jun. 6, 2008, titled VEHICLE, the disclosure of which is expressly incorporated by reference herein.

Figure 26:
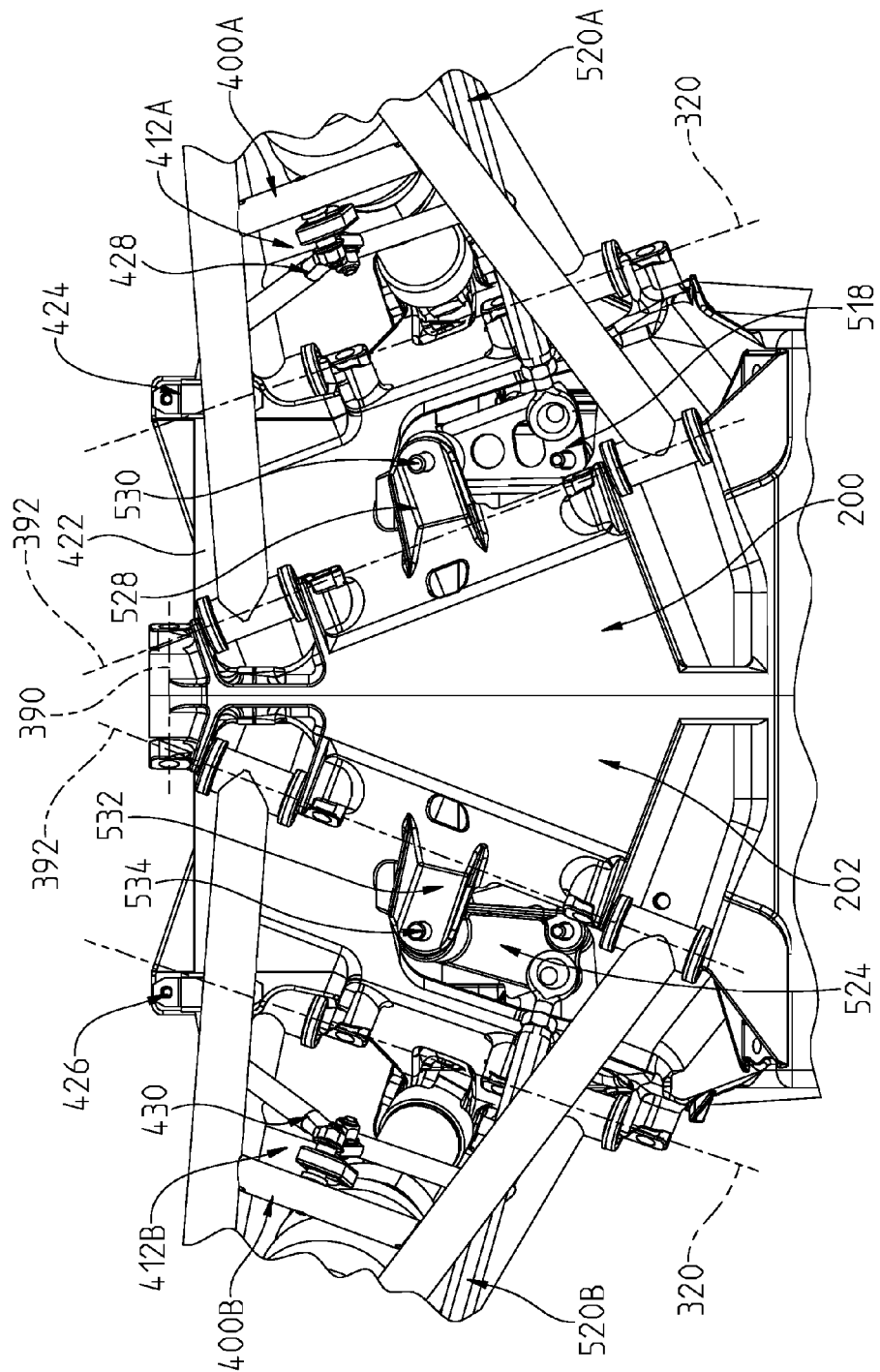
FIG. 26 illustrates the positioning of a lower portion of the steering assembly and the front suspension relative to the front clip of the exemplary snowmobile of FIG. 1.
Figure 27:
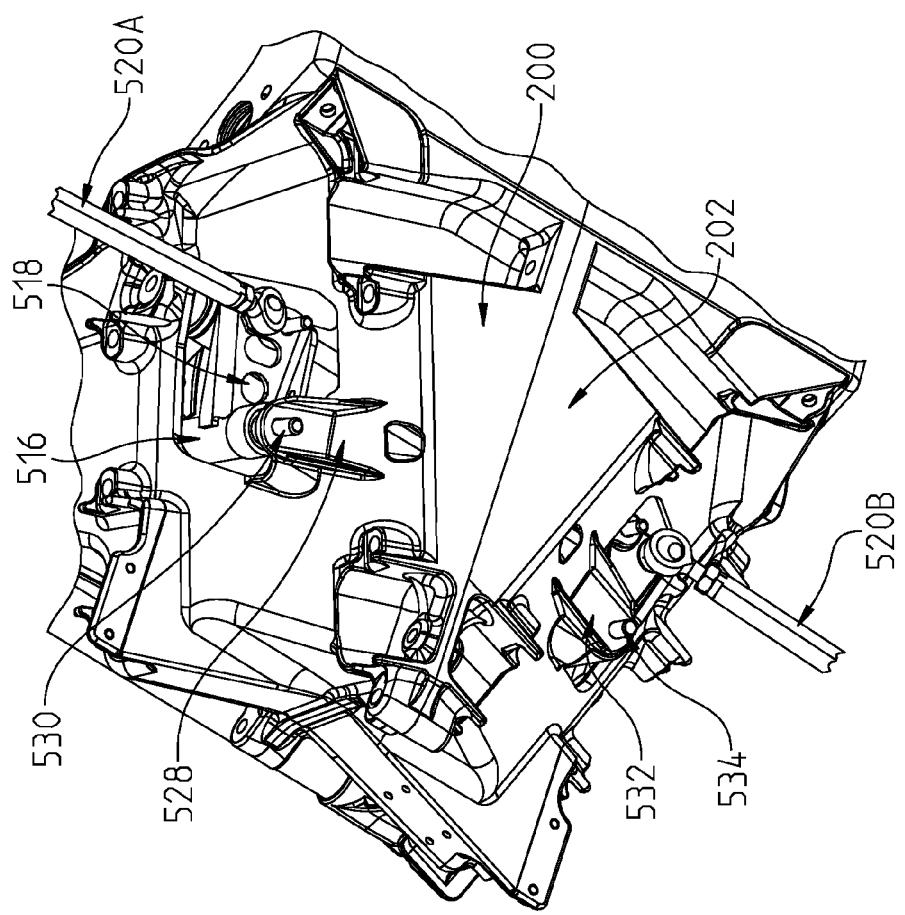
FIG. 27 illustrates a perspective view of the positioning of the steering assembly relative to the front clip of the exemplary snowmobile of FIG. 1.

Each of lower control arm 300A and 300B include a cross member 400A and 400B, respectively. Referring to FIG. 19, a sway bar 402 is rotatably coupled to left side cast clip member 200 at location 404 and to right cast clip member 202 at location 406. Sway bar 402 is rearward facing and includes ends 408 and 410 which are coupled to brackets 412A and 412B which are in turn coupled to cross members 400A and 400B of lower control arms 300A and 300B, as shown in FIG. 26.

Control arms 300A and 302A are biased in a downward direction by a shock member 384A. Any type of suitable shock may be used. In one embodiment, shock member 384A is a Model No. 7043206 shock available from Walker Evans Racing located at 2304 Fleetwood Drive Riverside Calif. 92509.

Figure 20:
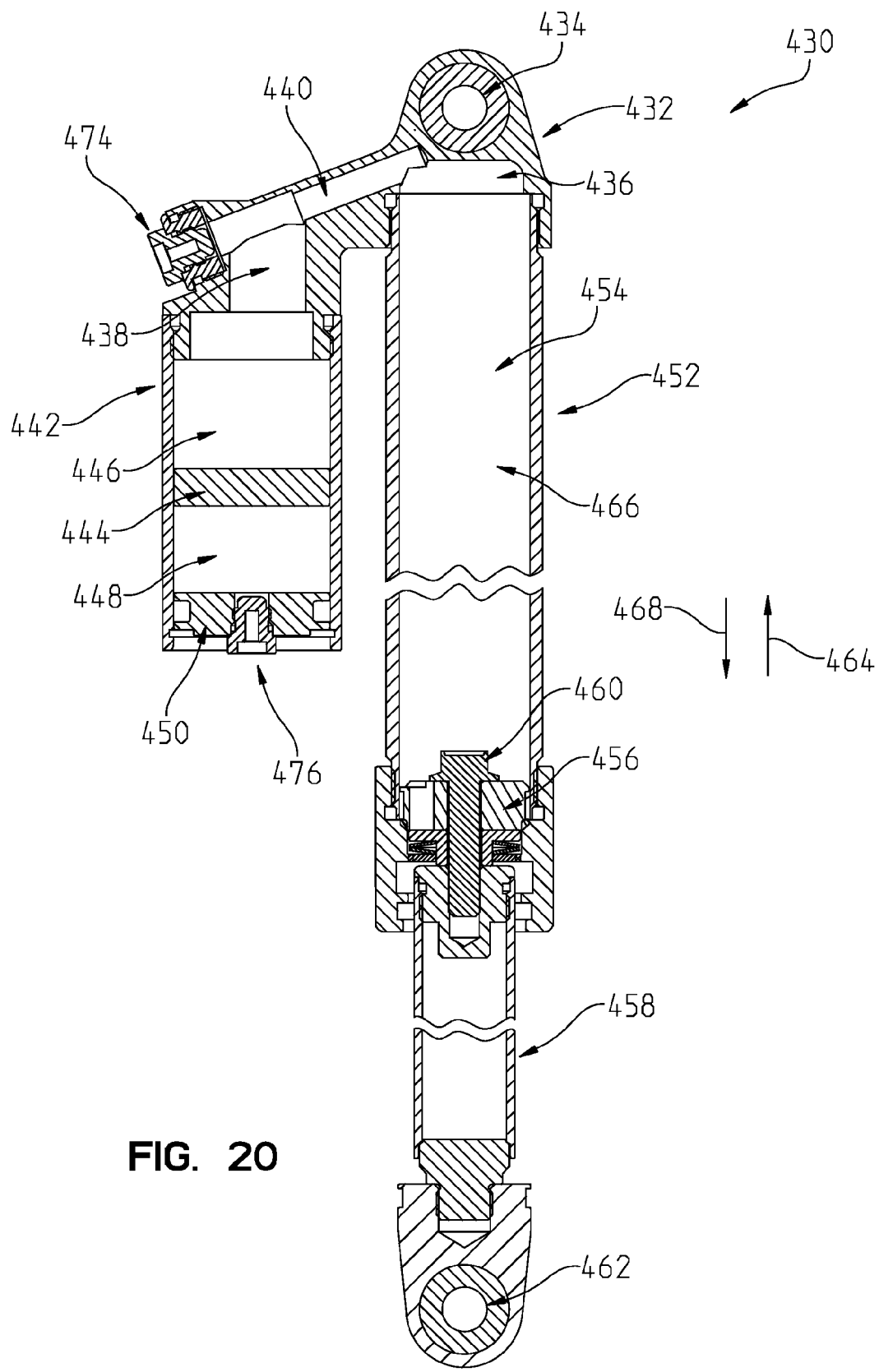
FIG. 20 illustrates a cross-section of an exemplary shock of the front suspension of FIG. 16.

Referring to FIG. 20 another exemplary shock 430 is shown. Shock 430 includes a first body member 432 having a mounting location 434 for rotatably coupling to one of left side cast clip member 200 and right side clip member 202. First body member 432 further includes a first fluid chamber 436 and a second fluid chamber 438. First fluid chamber 436 and second fluid chamber 438 are in fluid communication through a third fluid chamber 440.

Coupled to first body member 432 proximate to second fluid chamber 438 is a cylindrical body member 442 having a floating piston 444 disposed therein. Floating piston 444 divides an interior of cylindrical body member 442 into a first fluid chamber 446 and a second fluid chamber 448. First fluid chamber 446 is in fluid communication with second fluid chamber 438. An end cap 450 seals second fluid chamber 448.

Coupled to first body member 432 proximate to first fluid chamber 436 is a cylindrical body member 452. An interior of cylindrical body member 452 includes a fluid chamber 454. Fluid chamber 454 is in fluid communication with first fluid chamber 436. A piston 456 is disposed in the interior of cylindrical body member 452 and forms the end of fluid chamber 454. Piston 456 is coupled to a support assembly 458 through a coupler 460. Support assembly 458 includes a mounting location 462 for rotatably coupling to one of control arms 300.

In operation, as control arm 300 wants to move upward, support assembly 458 pushes piston 456 in direction 464. It should by noted that fluid chamber 454, first fluid chamber 436, second fluid chamber 438, third fluid chamber 440, and first fluid chamber 446 act as a single fluid chamber 466. This movement of support assembly 458 in direction 464 is resisted by fluid chamber 466 because the fluid within fluid chamber 466 generally cannot escape from fluid chamber 466. As such, the fluid pressure in fluid chamber 466 increases as piston 456 is moved in direction 464 absent a change in the volume of fluid chamber 466. The volume of fluid chamber 466 may be increased by floating piston 444 moving in direction 468, thereby increasing the volume of first fluid chamber 446 and decreasing the volume of second fluid chamber 448.

The amount of resistance to the movement of piston 456 in direction 464 is dependent on many factors including the pressure in fluid chamber 466, the pressure in second fluid chamber 448, and the volume of second fluid chamber 448. The pressure in fluid chamber 466 may be adjusted by adding air to fluid chamber 466 through nipple 474 or removing air from fluid chamber 466 through nipple 474. In a similar fashion, the pressure in second fluid chamber 448 may be adjusted by adding air to second fluid chamber 448 through nipple 476 or removing air from second fluid chamber 448 through nipple 476. In one embodiment, fluid chamber 466 includes an oil and gas mixture which is emulsified due to the movement of piston 456 in fluid chamber 466 and second fluid chamber 448 includes a gas. In one example, the gas in fluid chamber 466 and second fluid chamber 448 is nitrogen gas. The volume of second fluid chamber 448 may be adjusted by introducing oil into second fluid chamber 448. The movement of floating piston 444 does not result in the emulsification of the oil and gas in second fluid chamber 448 and hence the volume of second fluid chamber 448 is effectively reduced through the addition of oil to second fluid chamber 448.

Figure 21:
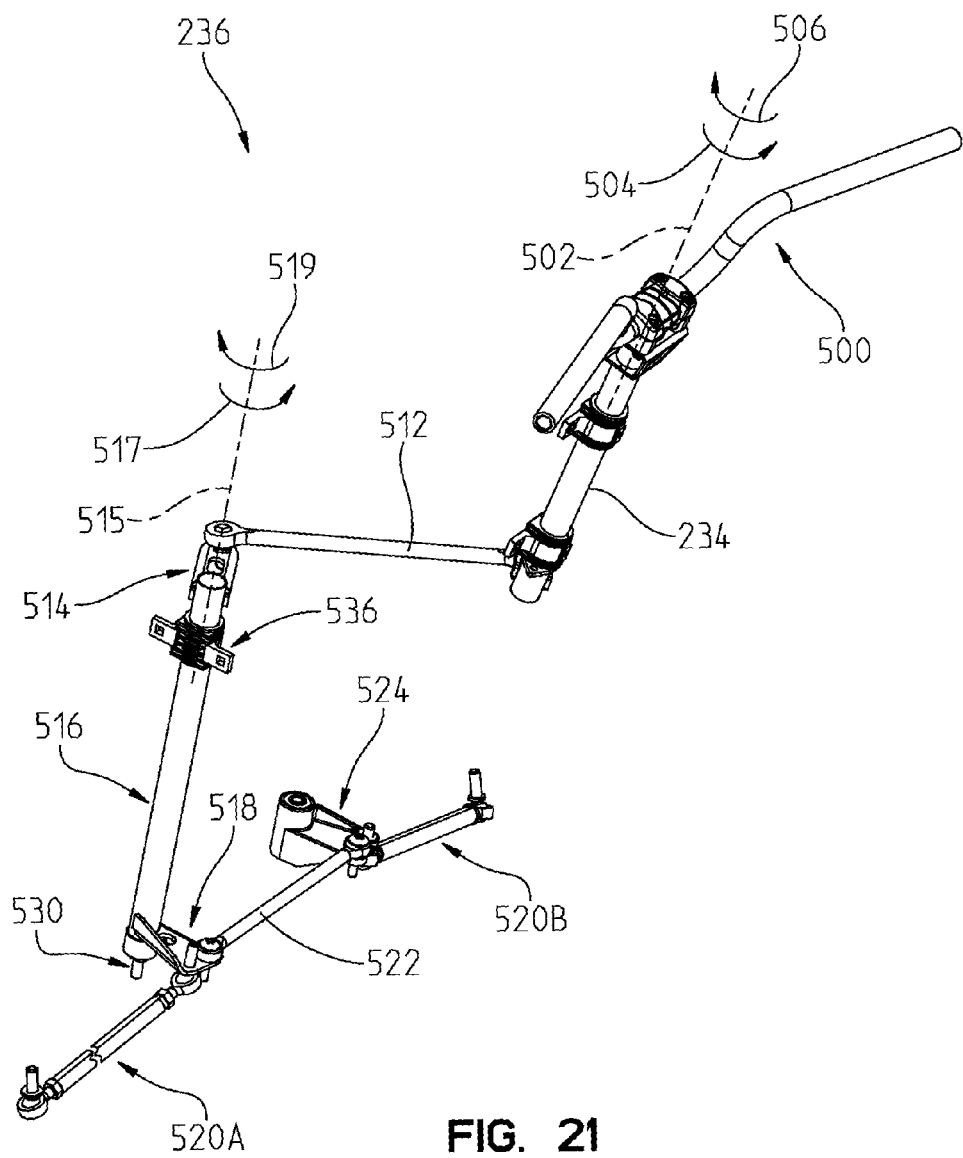
FIG. 21 illustrates a perspective view of a steering assembly of the exemplary snowmobile of FIG. 1.

A steering assembly 236 controls the orientation of skis 106 to control the direction of travel of vehicle 100. Referring to FIG. 21, steering assembly 236 includes an upper steering post 234 which is coupled to handle bars 500. As is known, an operator through rotating handle bars 500 rotates upper steering post 234 about axis 502 and directions 504 and 506. A lower portion of upper steering post 234 is coupled to a bracket 510 (See FIG. 24) which turns with upper steering post 234 about axis 502. Bracket 510 is rotatably coupled to a link 512 which is in turn rotatably coupled to a bracket 514. Bracket 514 is coupled to a lower steering post 516 which rotates along with bracket 514. Lower steering post 516 is rotatable about axis 515 in directions 517 and 519. In one embodiment, axis 515 is parallel to axis 502. In one embodiment, axis 515 is non-parallel to axis 502. At its lower end, lower steering post 516 is coupled to a bracket 518 which rotates with lower steering post 516. Bracket 518 is coupled to a steering arm 520A which is coupled to a ski spindle 398A as shown in FIG. 16. Bracket 518 is further rotatably coupled to a connecting link 522 which is further rotatably coupled to a bracket 524. Bracket 524 communicates movement of connecting link 522 to a right side steering arm 520B. Steering arm 520B is coupled to ski spindle 398B in a similar fashion as steering arm 520A is coupled to ski spindle 398A.

Figure 22:
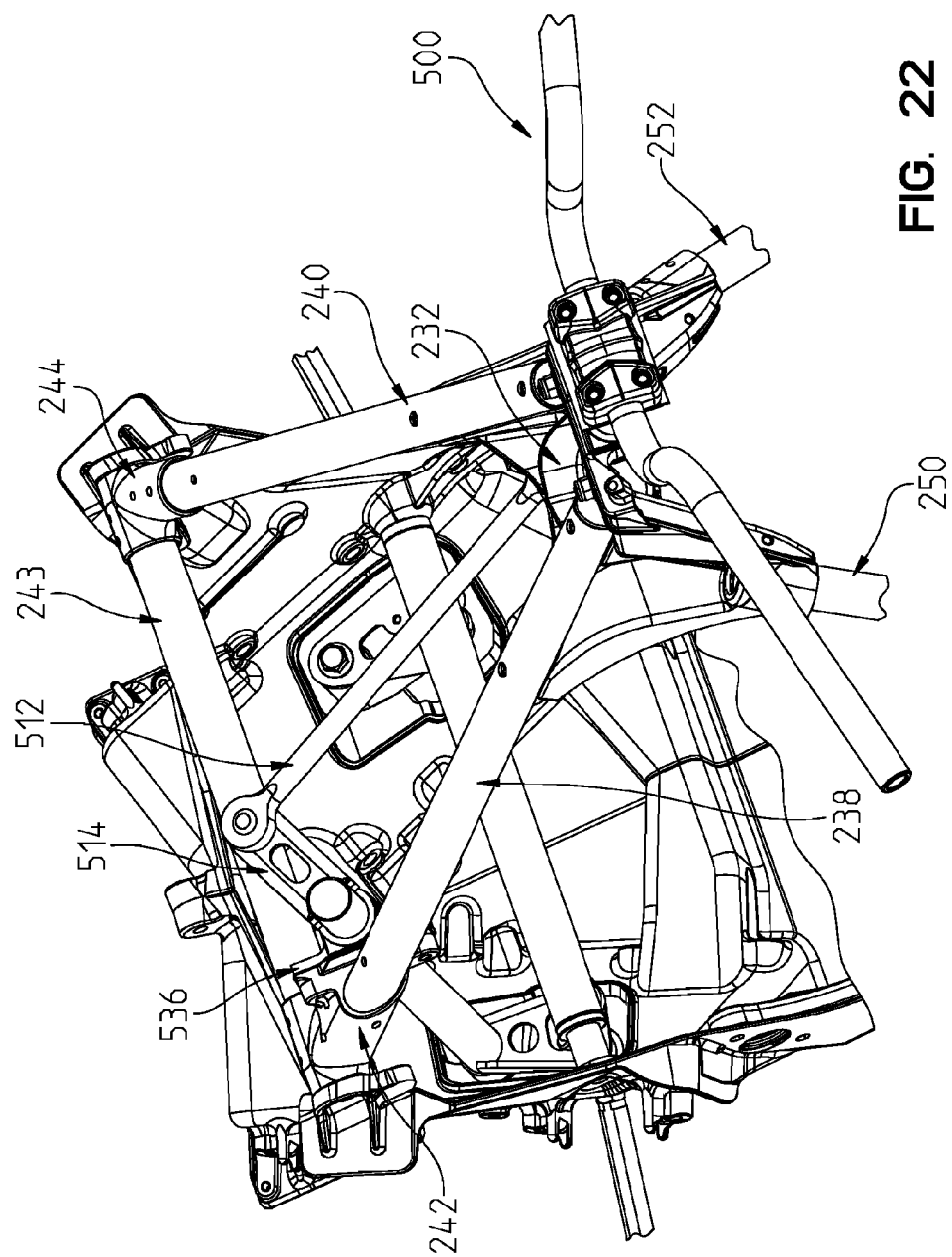
FIG. 22 illustrates a top perspective view of the steering assembly of FIG. 21 assembled to the frame of the exemplary snowmobile of FIG. 1.

Referring to FIG. 26, left side cast clip member 200 includes a mounting portion 528 having an aperture to receive a post 530 extending from the lower end of lower steering post 516. In a similar fashion, right side cast clip member 202 includes a mounting portion 532 having an aperture to receive a post 534 on the bottom of bracket 524. As such, a lower end of steering post 516 is rotatably coupled to the left side cast clip member 200. An upper portion of lower steering post 516 is coupled through a bracket 536 coupled to mounting lug 242 of over structure 230, as shown in FIG. 22.

Figure 13:
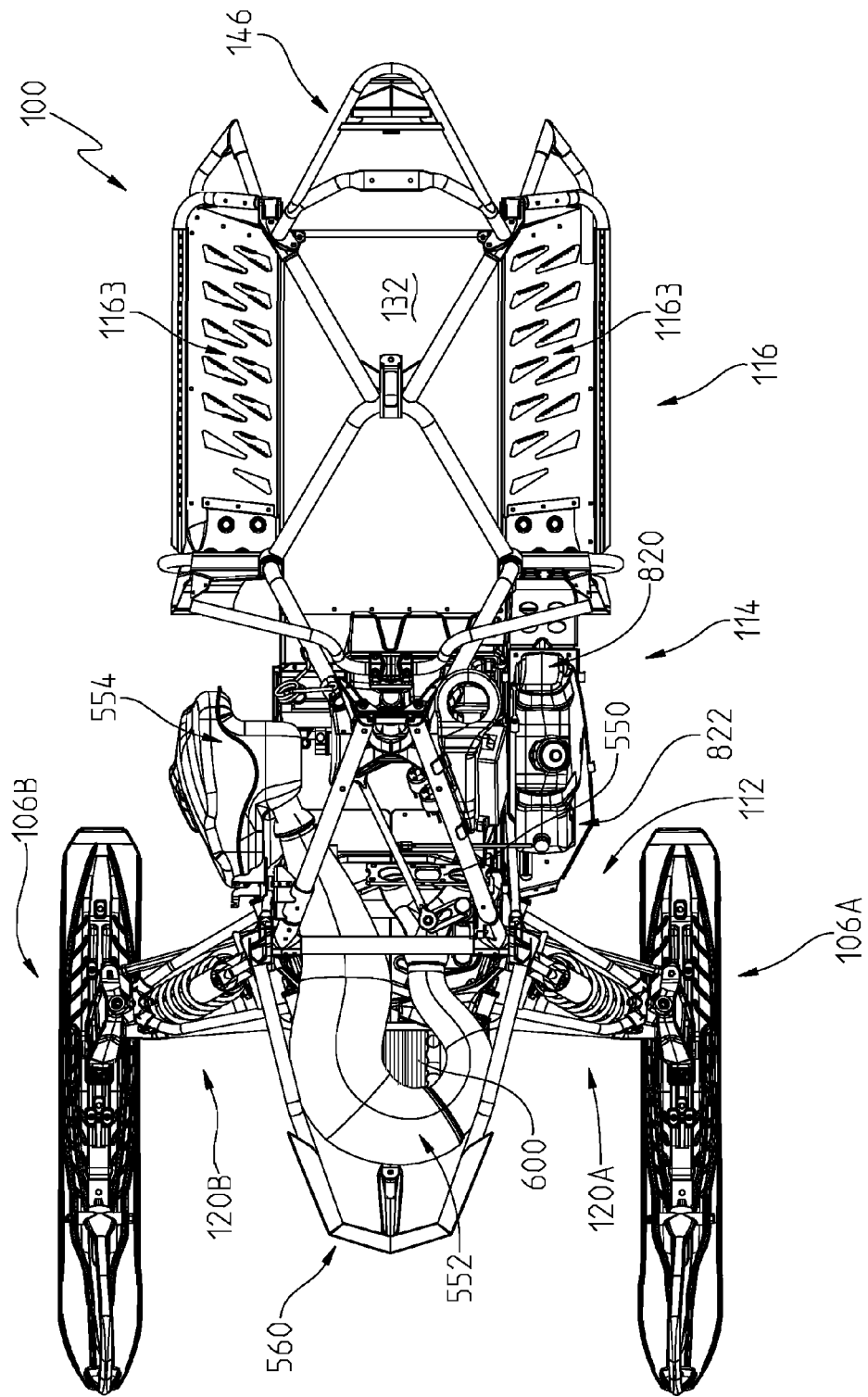
FIG. 13 illustrates a top view of the assembly of FIG. 10.
Figure 28:
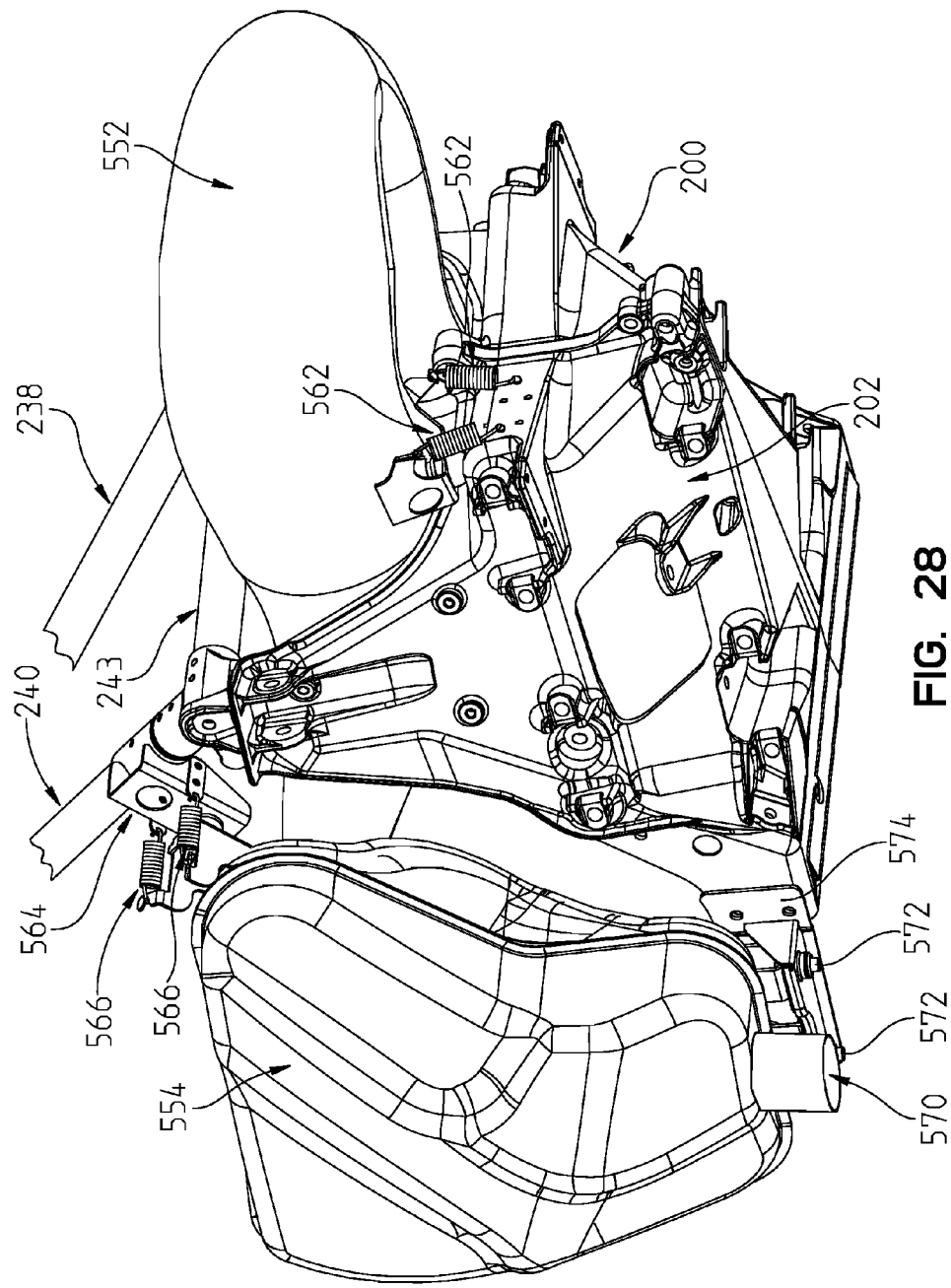
FIG. 28 illustrates a perspective view of the positioning of a portion of an exhaust system relative to the front clip of the exemplary snowmobile of FIG. 1.

Referring to FIG. 13, an exhaust system of vehicle 100 is shown. The exhaust system includes an exhaust intake 550 which is coupled to the engine (not shown) to receive exhaust gases from the engine. The exhaust intake 550 is coupled to exhaust conduit 552 which extends forward from the engine and wraps around and is in fluid communication with a resonator unit 554. As shown in FIG. 28, exhaust conduit 552 is positioned below tubular member 243 and between left side cast clip member 200 and right side cast clip member 202. Further, exhaust conduit 552 extends beyond the front edge of left side cast clip member 200 and right side cast clip member 202 into a region bounded by front bumper 560 as shown in FIG. 13.

Returning to FIG. 28, exhaust conduit 552 is coupled to right side cast clip member 202 through compliant members 562. In one embodiment, compliant members 562 are springs. In a similar fashion, an upper portion of resonator unit 554 is coupled to a bracket 564 through compliant members 566. Compliant members 566, in one embodiment, are springs. Bracket 564 is coupled to tubular portion 240 of the overstructure 230. The exhaust gases communicated to resonator unit 554 exit resonator unit through fluid port 570.

Figure 29:
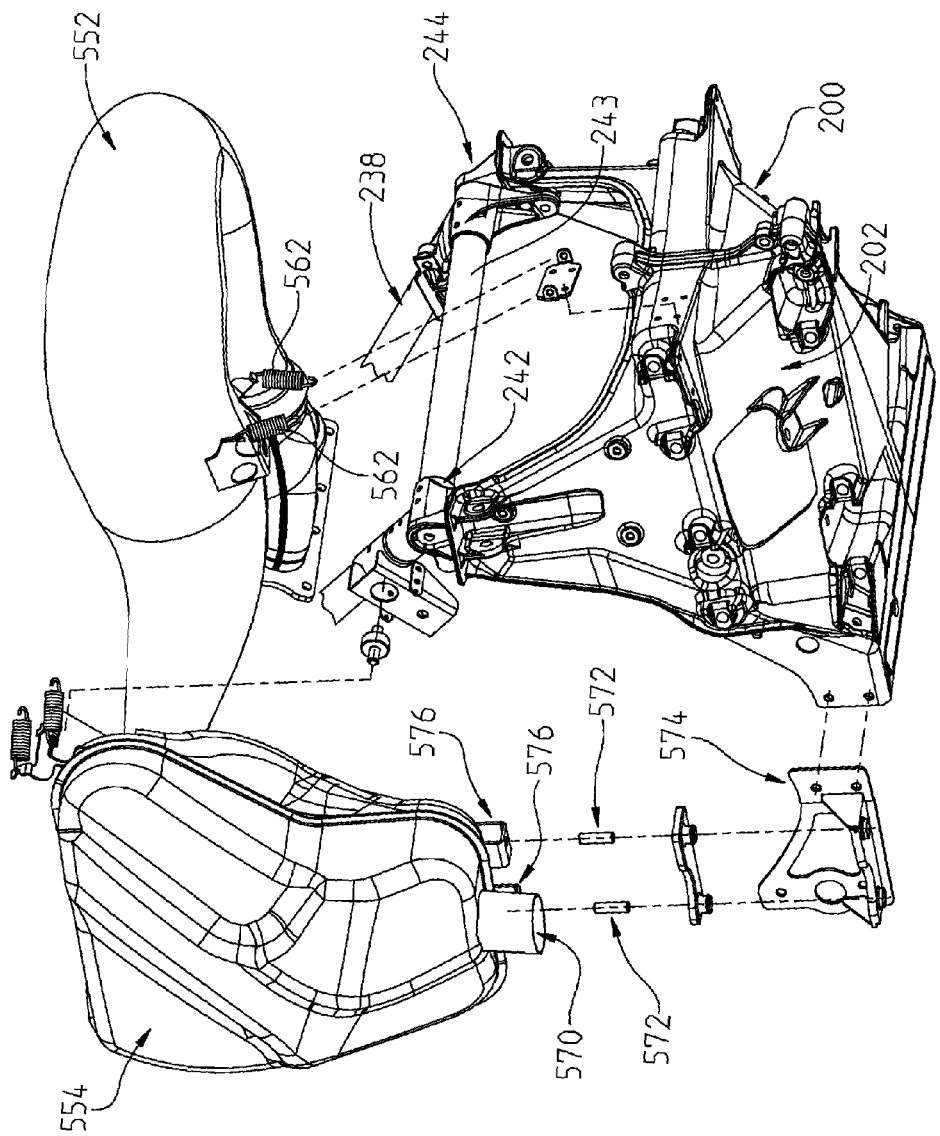
FIG. 29 illustrates an exploded view of a portion of the assembly of FIG. 28.

Referring to FIG. 29, a lower portion of resonator unit 554 is located with a set of pins 572 which are coupled to a bracket 574 which is mounted to right side cast clip member 202. A bracket 576 in the lower portion of resonator unit 554 includes openings to receive pins 572. As such, resonator unit 554 is able to float up and down but is restricted forward and aft and side to side due to pins 572.

Figure 30:
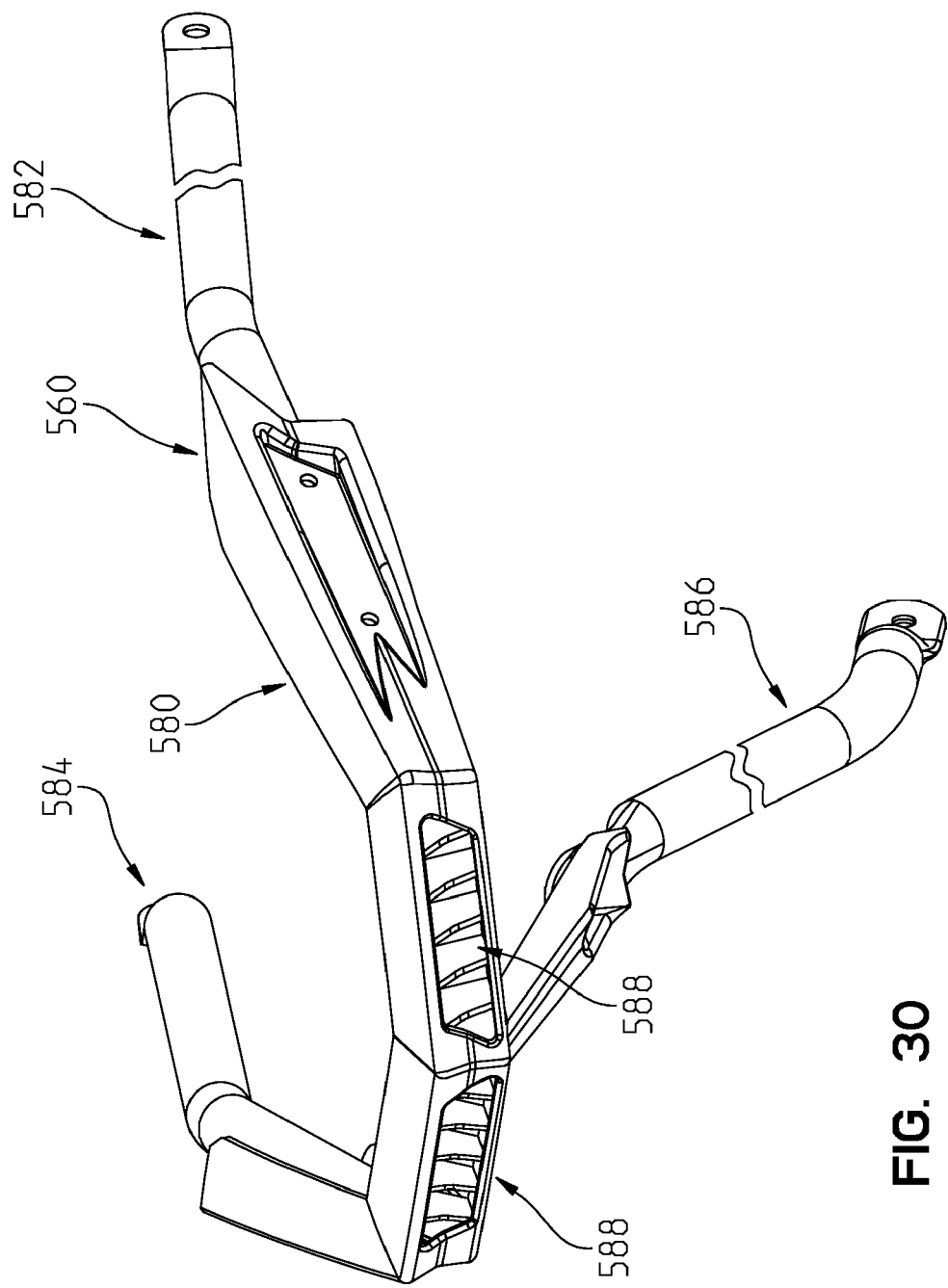
FIG. 30 illustrates a front bumper of the exemplary snowmobile of FIG. 1.

Referring to FIG. 30, an exemplary front bumper 560 which encloses fluid conduit 552 is shown. Front bumper 560 includes a front component 580, a pair of side components 582 and 584, and a lower component 586. Each of side components 582 and 584 and lower components 586 are coupled to one of left cast clip member 200 and right side cast clip member 202 and are coupled to front component 580. Front component 580 includes openings 588 which permit air to enter a portion of the interior of vehicle 100. Referring to FIG. 1 air passes through openings 588 in front bumper 560 and on through to openings 590 in body panel 592 and into the interior of vehicle 100.

Figure 31:
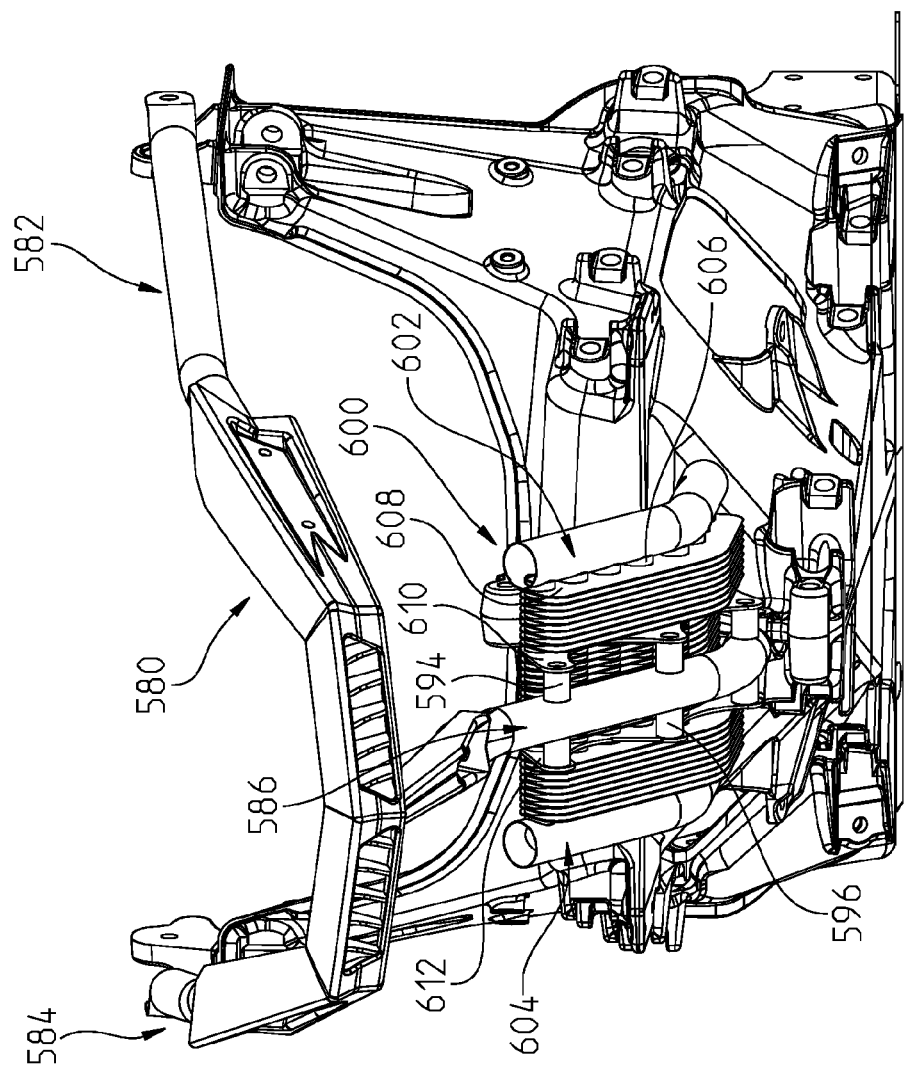
FIG. 31 illustrates the front bumper of FIG. 30 coupled to the front clip of the exemplary snowmobile of FIG. 1.

Referring to FIG. 31 lower member 586 of front bumper 560 includes two attachment members 594 and 596. A radiator 600 is attached to lower portion 586 through attachment members 594 and 596.

Radiator 600 includes a fluid inlet tube 602 and a fluid outlet tube 604 which are in communication through a plurality of cross-tubes 606. One end of each of fluid inlet tube 602 and fluid outlet tube 604 is capped and the other end is in fluid communication with a fluid conduit connecting the respective fluid inlet tube 602 and the fluid outlet tube 604 to various components of cooling system 630.

Pressed onto the plurality of cross tubes 606 are a plurality of fin members 608 which are spaced apart to allow air flow there between. The fin members 608 act to cool the fluid passing through cross members 606 as it travels from fluid conduit 602 to fluid conduit 604. Two of the thin members illustratively 610 and 612 include extensions having openings therein. These extensions are coupled to attachment members 594 and 596 through mechanical couplers, such as bolts. Referring to FIG. 13 the location of radiator 600 is forward of front suspension 120a and 120b. Further, radiator 600 is forward of cast clip members 200 and 202.

Figure 55:
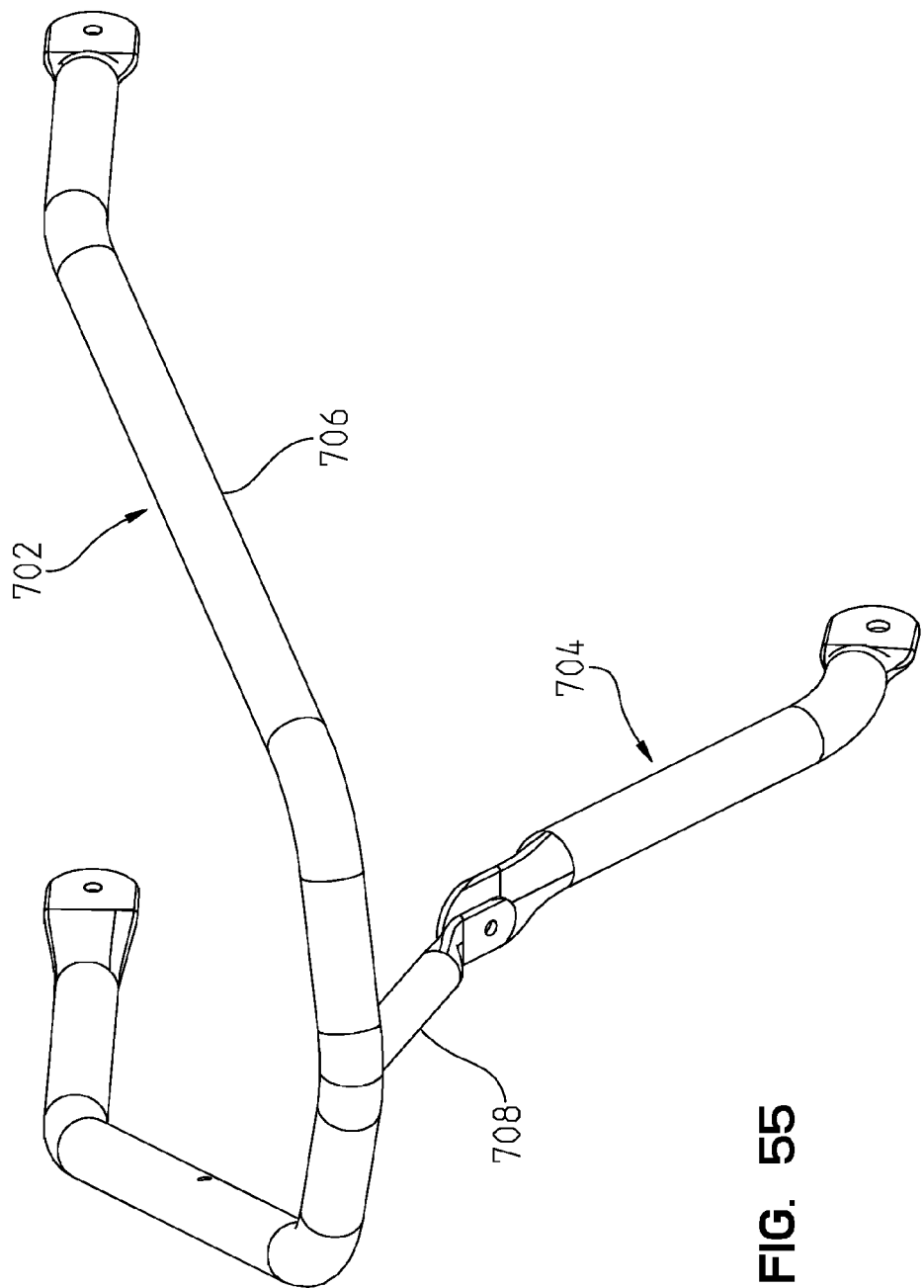
FIG. 55 illustrates an exemplary metal front bumper.
Figure 56:
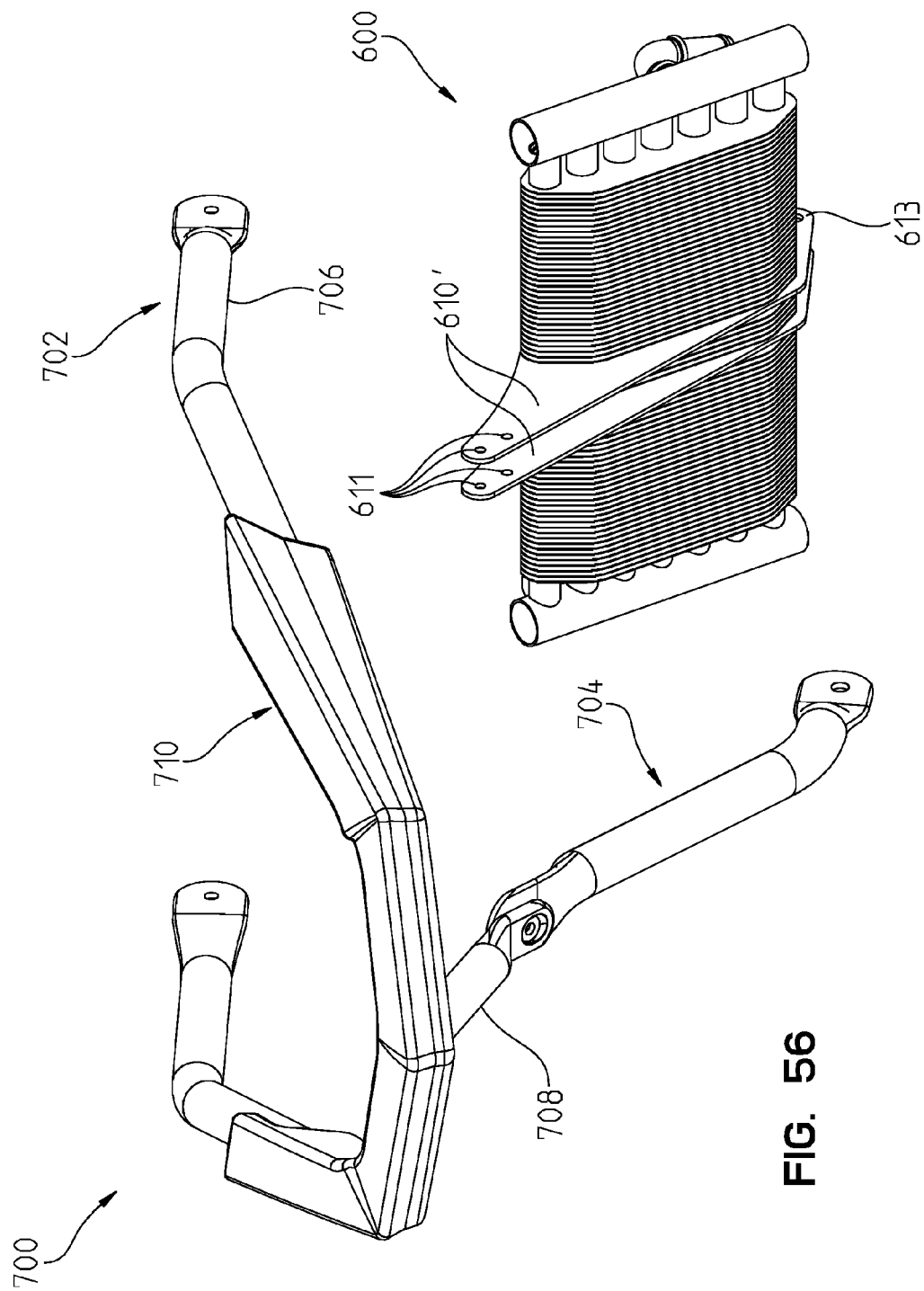
FIG. 56 illustrates the metal front bumper of FIG. 55 having a overmolded component coupled thereto.

Referring to FIGS. 55 and 56, an alternate front bumper 700 is shown. Referring to FIG. 55 front bumper 700 includes an upper structural piece 702 and a lower structural piece 704. Upper structural piece 702 and lower structural piece 704 are joined together through a coupler. In one embodiment, the coupler is a bolt and nut. Other couplers includes welds and other means of fastening upper structural component 702 to lower structural component 704. In one embodiment, upper structural component 702 is formed of a first tubular metal portion 706 and a second tubular metal portion 708 which is coupled to the first tubular metal portion 706.

Referring to FIG. 56, upper structural component 702 is overmolded an overmold component 710. In one embodiment, the overmolded component 710 is made of a soft rubber material. The use of a soft rubber material overmolded on a metal substrate provides an improved durability over a plastic bumper. In addition, it provides the ability to give a stylized appearance to the bumper 700 while maintaining the structural rigidity of the underlying metal support.

Also, shown in FIG. 56 is an alternative configuration of front radiator 600. The embodiment shown in FIG. 56 is the same as the radiator shown in FIG. 30 with the exception of fins 610' include upper mounting locations 611 which cooperates with mounting members similar to mounting members 594 shown in FIG. 31. Fins 610' further include lower mounting locations 613 which also cooperates with mounting members similar to mounting members 594 to secure radiator 600 to lower structural member 704.

Figure 34:
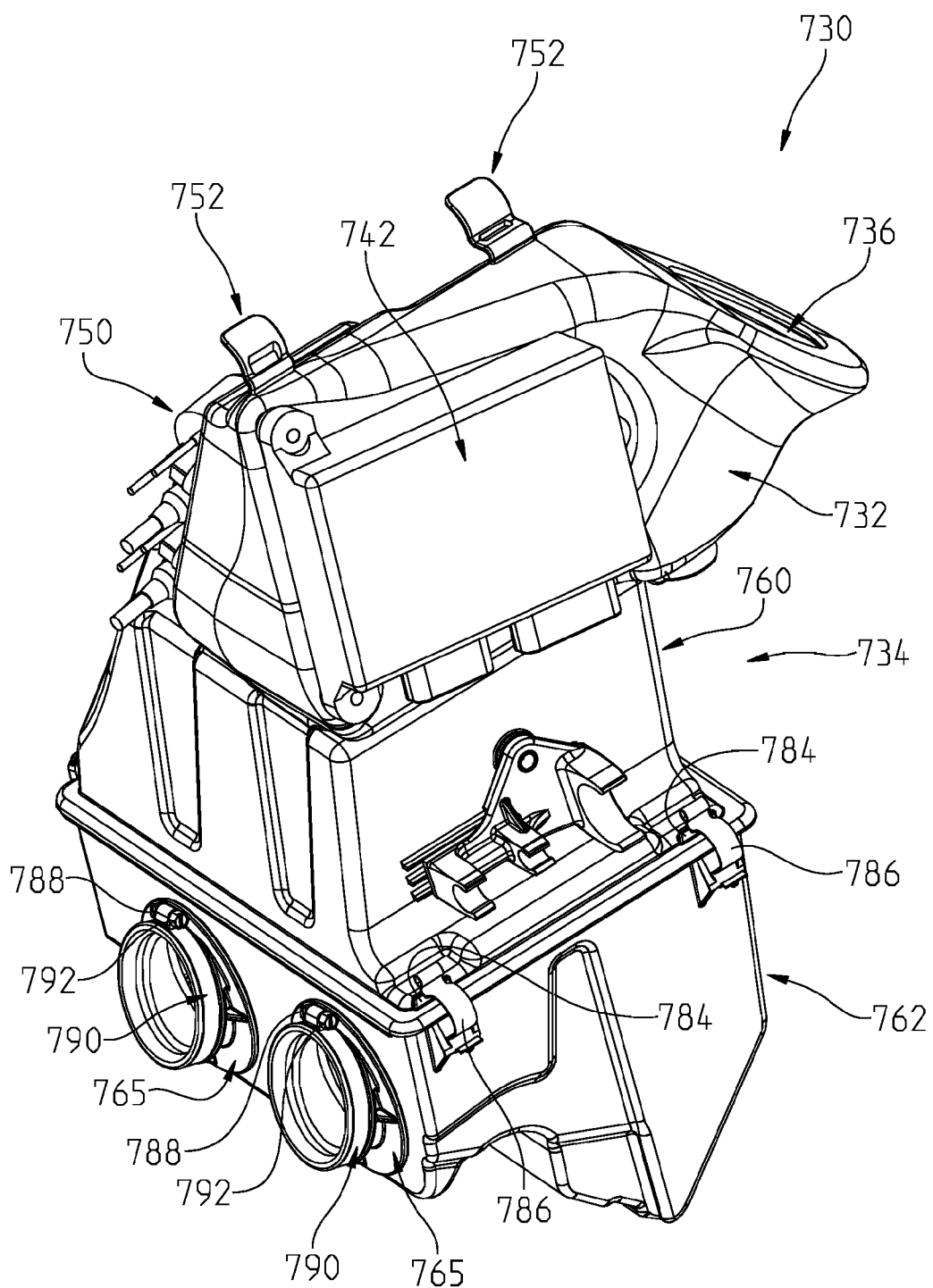
FIG. 34 illustrates an air intake system and a control unit of the exemplary snowmobile of FIG. 1.

Referring to FIGS. 34-37, an air intake system 730 is shown. Referring to FIG. 34, air intake system 730 includes an intake member 732 and an air box 734. Intake number 732 includes an opening 736 through which air is received into an interior 738 (See FIG. 37) from an opening 740 (See FIG. 3) in the body panels of vehicle 100.

Figure 35:
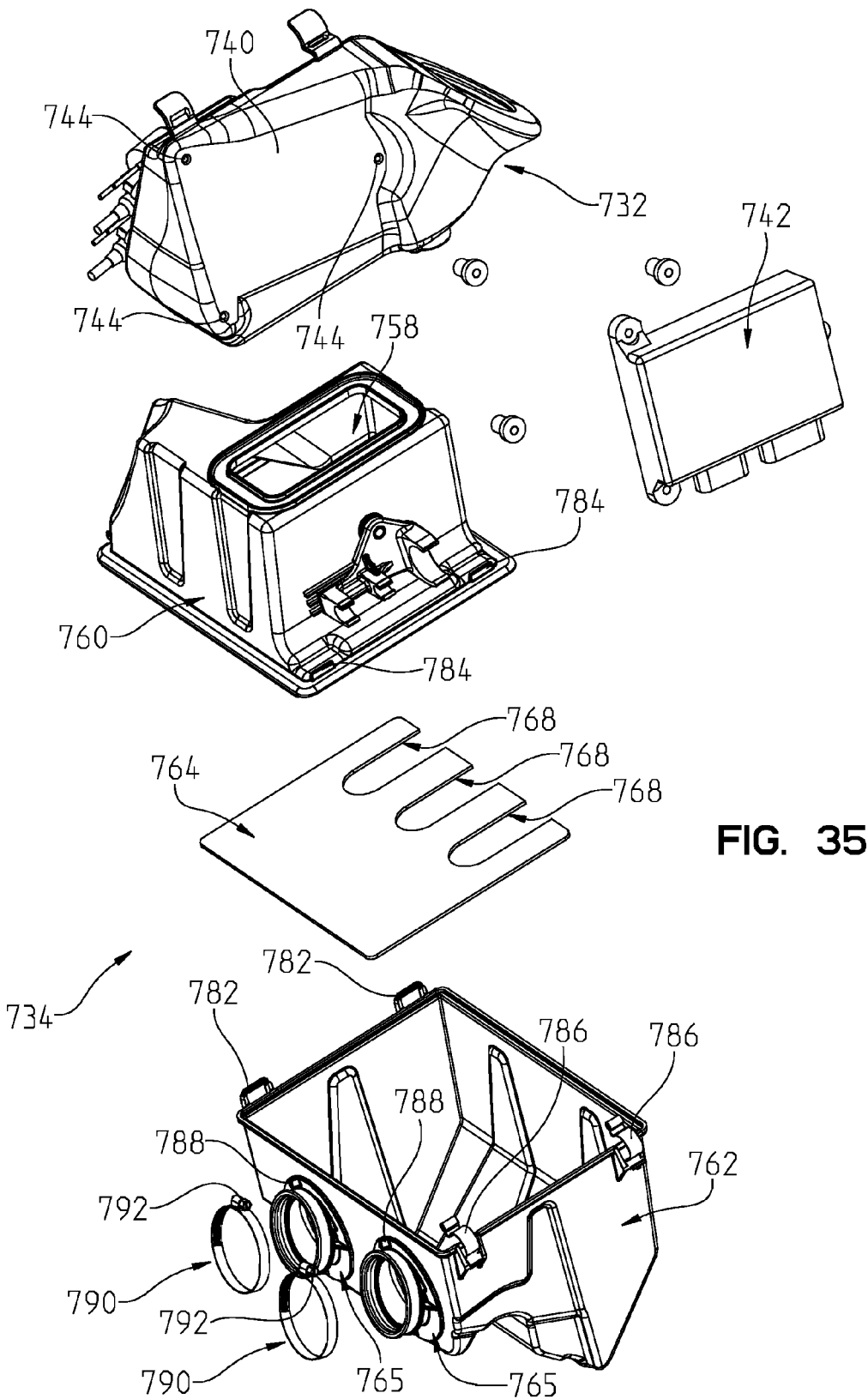
FIG. 35 illustrates the assembly of FIG. 34 exploded.
Figure 37:
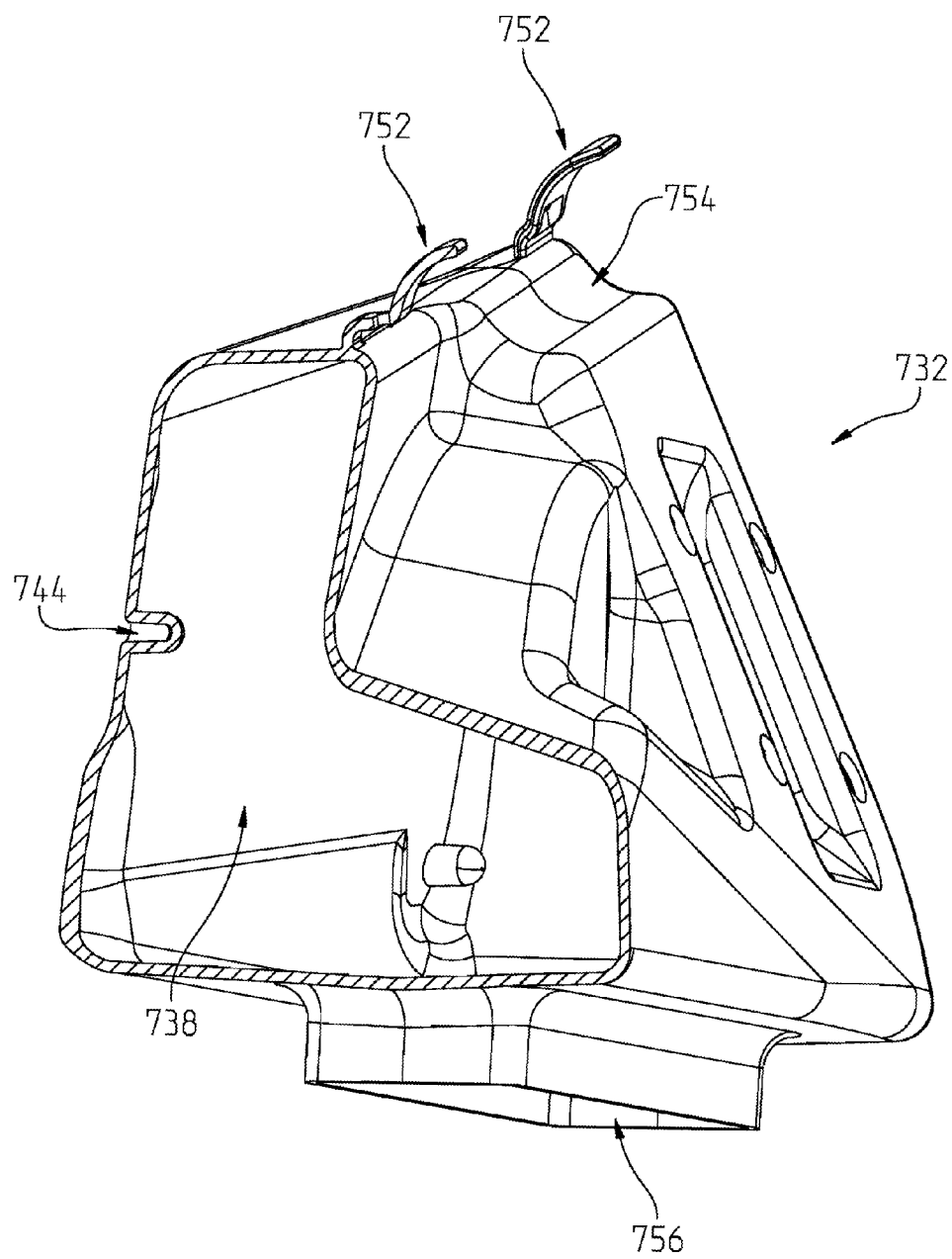
FIG. 37 illustrates a partial view of the air box tower of the air intake system of FIG. 34.

Referring to FIG. 35, intake member 732 includes a generally flat surface 740 onto which an engine control unit 742 is mounted. As is known in the art, engine control unit includes a computing device and software for controlling the operation of engine 108 and other functions of vehicle 100. By placing the engine control unit 742 on intake member 732 the air passing through intake member 732 acts to cool the engine control unit 742. Intake member 732 includes recesses 744 which receive couplers for securing engine control unit 742 to intake member 732. Referring to FIG. 37, in one embodiment, recesses 744 are blow molded features which are sized to receive self tapping screws. Similar pockets are used for mounting coils 750 to intake member 732.

Referring to FIG. 37, air intake member 732 includes extension members 752 which rest against tubular member 238 of overstructure 230 as shown in FIG. 10. Tubular member 238 is located in recess 754 of intake member 732 shown in FIG. 37. Air exits intake member 732 through opening 756

(see FIG. 37) and enters into air box 734 through opening 758 (see FIG. 35). Referring to FIG. 35 air box 734 includes an upper air box housing 760, a lower air box housing 762 and divider 764. As indicated in FIG. 36, an air filter 766 is positioned within an interior of upper air box member 760.

Referring to FIG. 36, air passes through filter 766 positioned in upper air box member 760 through one or more openings 768 and 770 of divider plate 764 and into an interior 772 of lower air box member 762. The air exits lower air box member 762 through openings provided in a pair of boots 765. The air then travels through conduits (not shown) which provide the air ultimately to engine 108.

Divider plate 764 cooperates with upper air box member 762 and hold filter 766 in place. Openings 768 in divider plate 764 are generally u-shaped. Opening 770 is defined by a side of divider plate 764 and a perimeter of lower air box housing 762. Divider plate 764 rests in the groove 778 of lower air box housing 762. Divider plate 764 may be removed as needed.

To assemble air box unit 734 tabs 780 on upper air box housing 760 are inserted into holders 782 (see FIG. 35) on lower air box housing 762. Referring to FIG. 35, upper air box housing includes holders 784 which receive an end of clips 786 which are assembled to lower air box housing 762. In the illustrated embodiment, clips 786 are spring clips.

Referring to FIG. 35, boots 765 include a stop member 788. Stop member 788 prevents the rotation of band clamps 790 and as the band clamps are being tightened. In one embodiment, stop member 788 include a recess to receive a portion of screw 792 of the respective band clamp 790. In this manner, band clamp 790 is coupled to stop member 788. As is known in the art, boots 765 are used to couple to air hoses which provide air from air box 734 to the engine 108.

Figure 38:
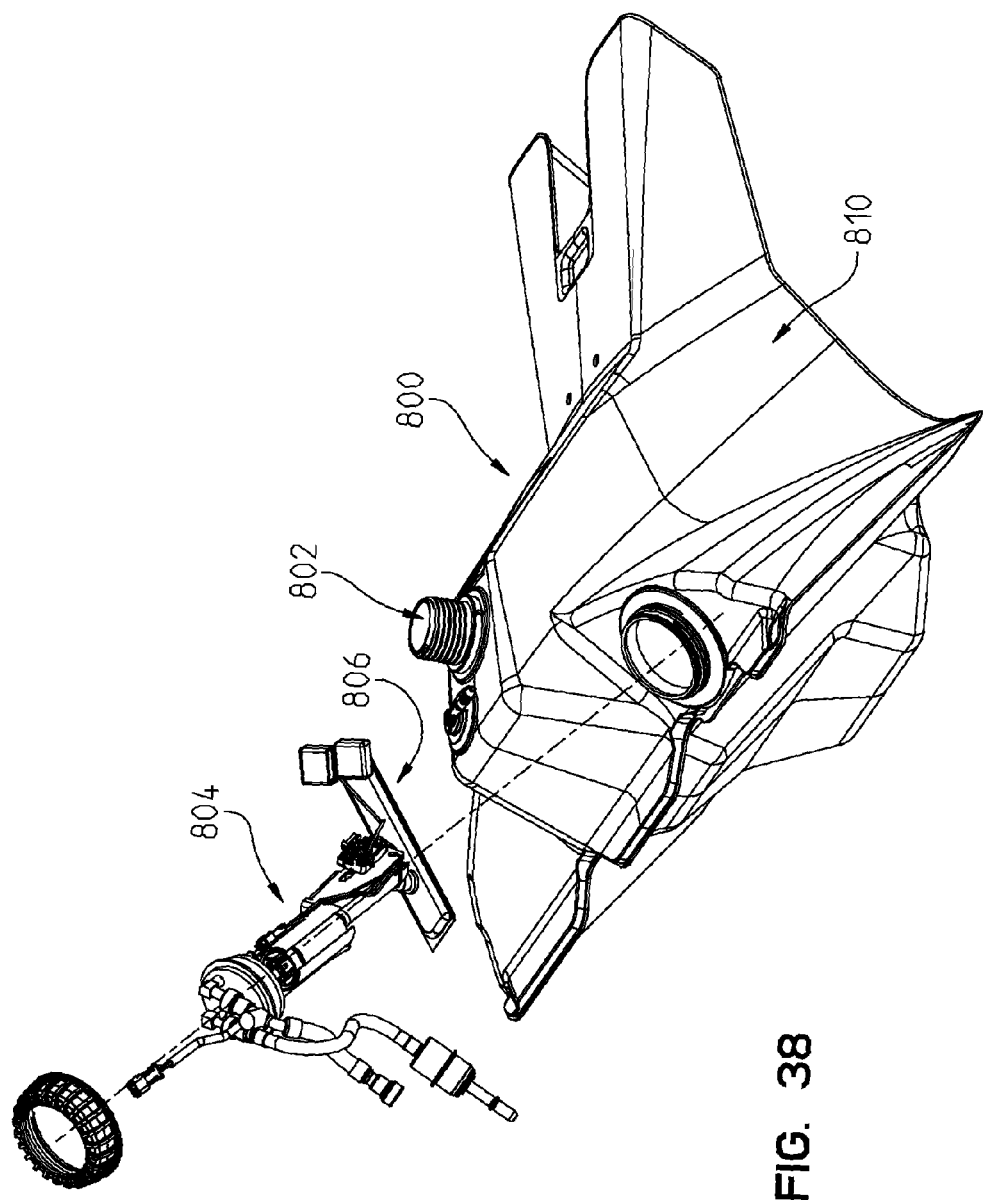
FIG. 38 illustrates a fuel intake assembly of the exemplary snowmobile of FIG. 1.

Referring to FIG. 38 a fuel tank 800 is shown. Fuel tank 800 includes a fill port 802 through which fuel is provided to an interior fuel tank 800. Disposed within the interior of fuel tank 800 is a fuel pump 804 which pumps fuels from fuel tank 800 and provides it to the engine 108. Fuel pump 804 is coupled to a single sock 806 which is in fluid communication with the fuel in fuel tank 800. Sock 806 provides the fuel to fuel pump 804. Exterior surface 810 of fuel tank 800 provides a portion of the exterior surface for vehicle 100 as shown in FIG. 3.

In one embodiment, the engine 108 is a two cycle engine and requires a supply of oil to be mixed with the fuel for combustion. In one embodiment, the supply of oil is provided in a oil container separate from fuel tank 800. A first exemplary oil container 820 is shown.

Referring to FIGS. 10 and 14, oil bottle 820 is supported by a clutch guard 822. Clutch guard 822 is positioned generally above a continuously variable transmission ("CVT") 824. CVT 824 couples the engine 108 to a drive shaft 826 (see FIG. 50). As is known, a CVT includes a drive clutch which is operatively coupled to the engine 108 and a driven clutch 828 (see FIG. 50) which is coupled to drive shaft 826. Driven clutch 828 is coupled to the drive clutch through a drive belt. Clutch guard 822 is positioned to protect CVT unit 824. Referring to FIG. 13, oil bottle 820 is positioned on the opposite side of vehicle 100 from where exhaust conduit 552 enters resonator unit 554.

Figure 39:
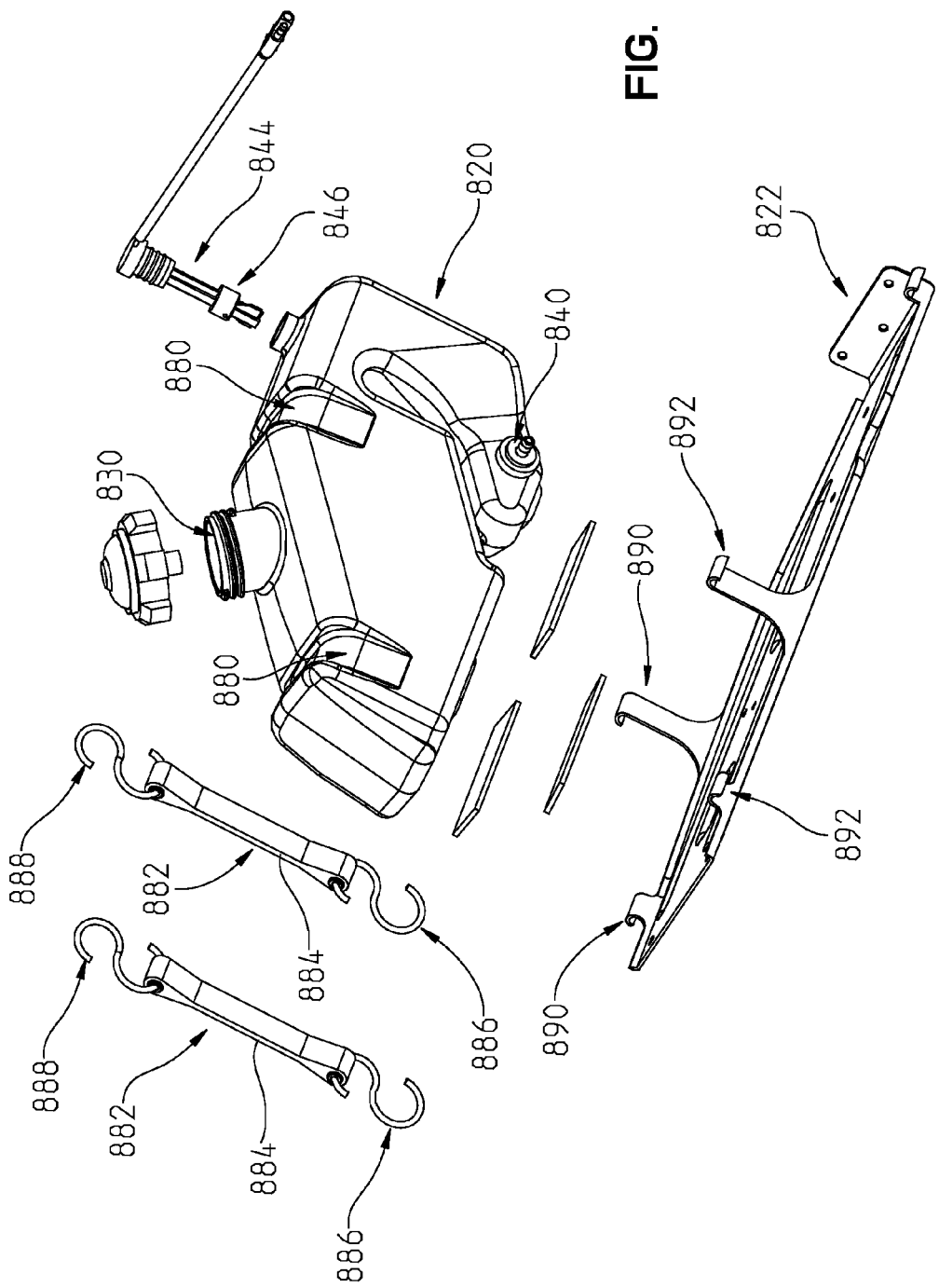
FIG. 39 illustrates an exemplary oil container and clutch guard of the exemplary snowmobile of FIG. 1.
Figure 41:
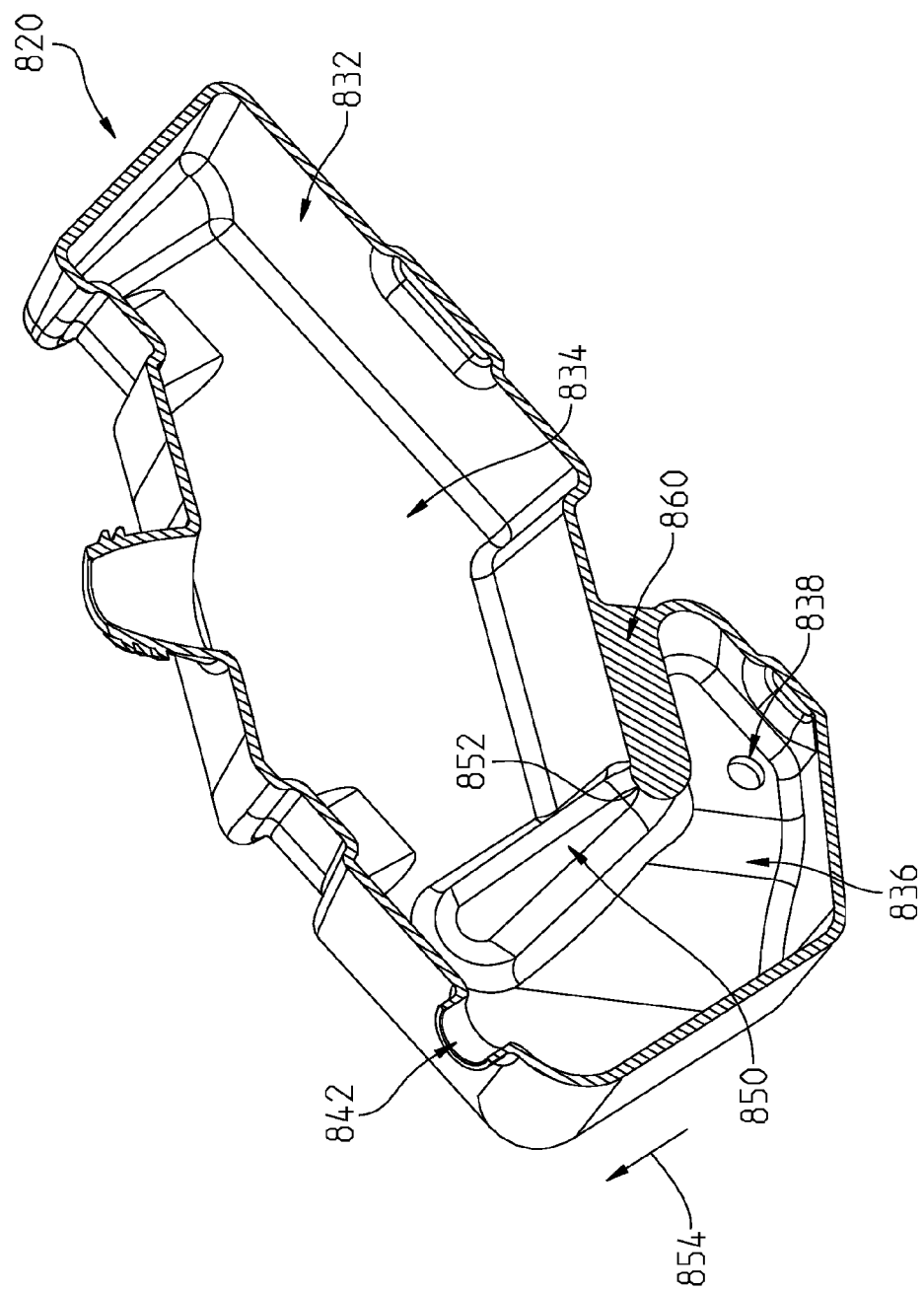
FIG. 41 illustrates a partial view of the oil container of FIG. 39 through a center place of the oil container.

Returning to FIG. 39, oil bottle 820 includes a fill port 830 through which oil is provided to an interior 832 (see FIG. 41) of oil bottle 820. Referring to FIG. 41, the interior of 832 of oil bottle 820 includes a main reservoir portion 834 and a sump portion 836. Within sump portion 836 is an outlet 838 through which oil is communicated to a fluid conduit connected to the engine 108 or a component for mixing the oil with the fuel. As shown in FIG. 39, a fitting 840 is provided in opening 838.

The oil line is connected to fitting 840. A second opening 842 is provided in oil container 820. Opening 842 is sized to receive an oil sender 844 which includes a float 846. Float 846 is positioned in sump area 836 of oil container 820. The relative position of float 846 provides an indication of the oil level in oil container 820. Based on the location of float 846, the engine control unit 742 provides to a display, such as the display shown in FIG. 57, a low oil indicator light to an operator of vehicle 100. In one embodiment, the ECU 742 provides a low oil indicator light to the operator when the oil level in oil container 820 falls below 1.2 quarts.

Figure 42:
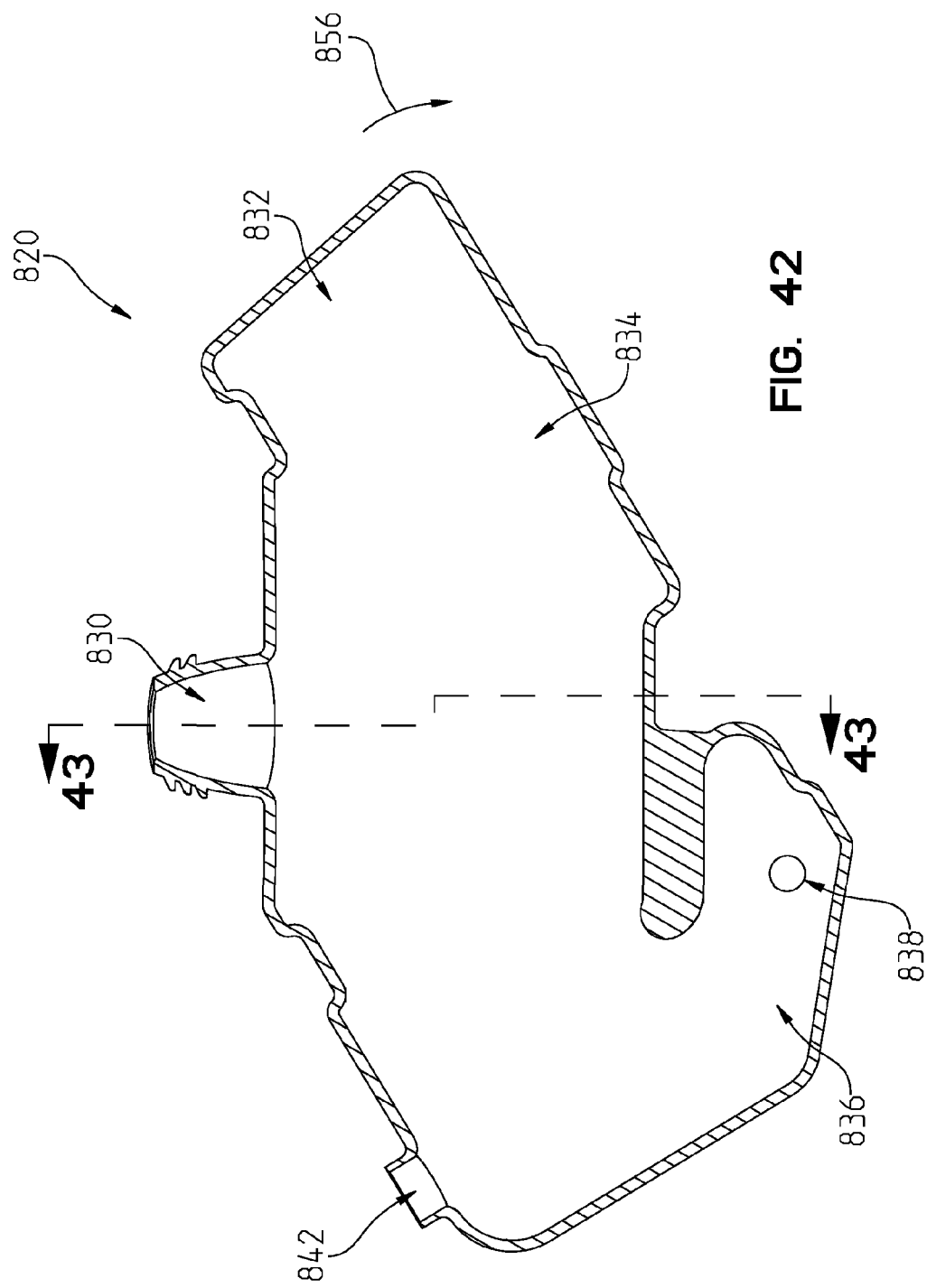
FIG. 42 illustrates a side view of the view of FIG. 41.

Referring to FIG. 42 sump region 836 of interior 382 is positioned generally below main reservoir region 834 of interior 832 when oil container 820 is positioned on clutch guard 822 as shown in FIG. 14. In one embodiment, the sump region 836 is sized to hold about 6.2 ounces of oil.

Figure 43:
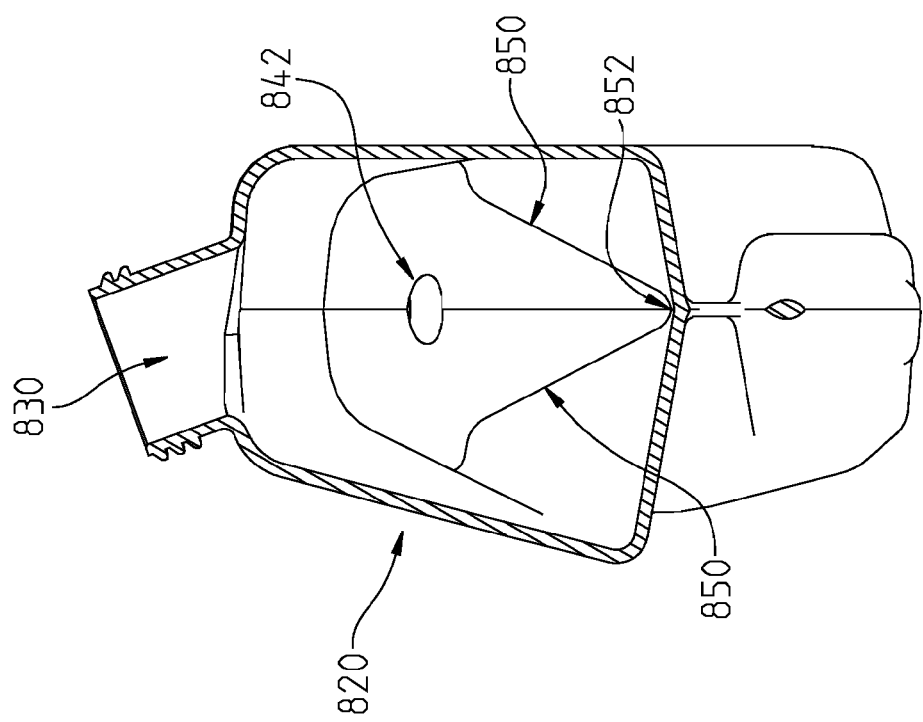
FIG. 43 illustrates a section view of the oil container of FIG. 39 along line 43-43 in FIG. 42.

Referring to FIG. 41 the sump region 836 is separated from the main reservoir region 834 through a divider 850. Divider 850 provides a generally v-shaped opening starting at point 852 and increasing in width and direction 854. The variable width opening of divider 850 limits the rate at which fluid leaves sump region 836 to flow into main reservoir region 834 when the orientation of oil bottle 820 is changed (see FIG. 43).

Changes in the orientation of oil container 820 occur when vehicle 100 is climbing hills and/or carving in left to right turns through deep snow. In one embodiment, the flow rate of oil from sump region 836 back into main reservoir region 834 is controlled such that at least 4.8 ounces of oil remain in sump region 836 as oil container 820 is tilted in direction 856 about 50 degrees for approximately four minutes. This allows an operator of vehicle 100 to climb a 50 degree hill for approximately 4 minutes time without running out of oil in sump region 836. In one embodiment, the flow rate of oil from sump region 836 to main reservoir region 834 is controlled to permit up to two minutes of hill climb on a 50 degree hill. In this example, approximately 2.4 ounces of oil are needed in sump region 836. In one embodiment, 6.7 ounces of oil are required in sump region 836 for a 60 degree right-hand carve. In one embodiment, about 8.7 ounces of oil are needed in sump region 836 for a 60 degree left-hand carve.

In one embodiment, oil container 820 is molded as a single molded component. In one example oil bottle 820 is blow molded. In one example, the wall thickness of oil bottle 820 is 0.15 inches and the interior 832 of oil bottle 820 is about 3.8 quarts. In another embodiment, the wall thickness of oil container 820 is about 0.15 inches and the volume of interior 832 of oil bottle 820 is about 4 quarts.

In one embodiment, sump region 836 has a volume of at least about 2.4 fluid ounces (fl oz) to about 6.2 fl oz and the volume of main reservoir region 834 and the sump region 836 combined is from about 3.5 quarts (about 112 fl oz) to about 4 quarts (about 128 ozs).

Referring to FIG. 41, the blow molded oil container 820 includes a pinch off region 860. Pinch off region 860 separates a portion of sump region 836 from main reservoir region 834. Further, pinch off region 860 provides the starting location 852 of divider 850. In one embodiment, one or more apertures may be provided in pinch off 860 to accommodate couplers to couple oil container 820 to clutch guard 824.

Figure 40:
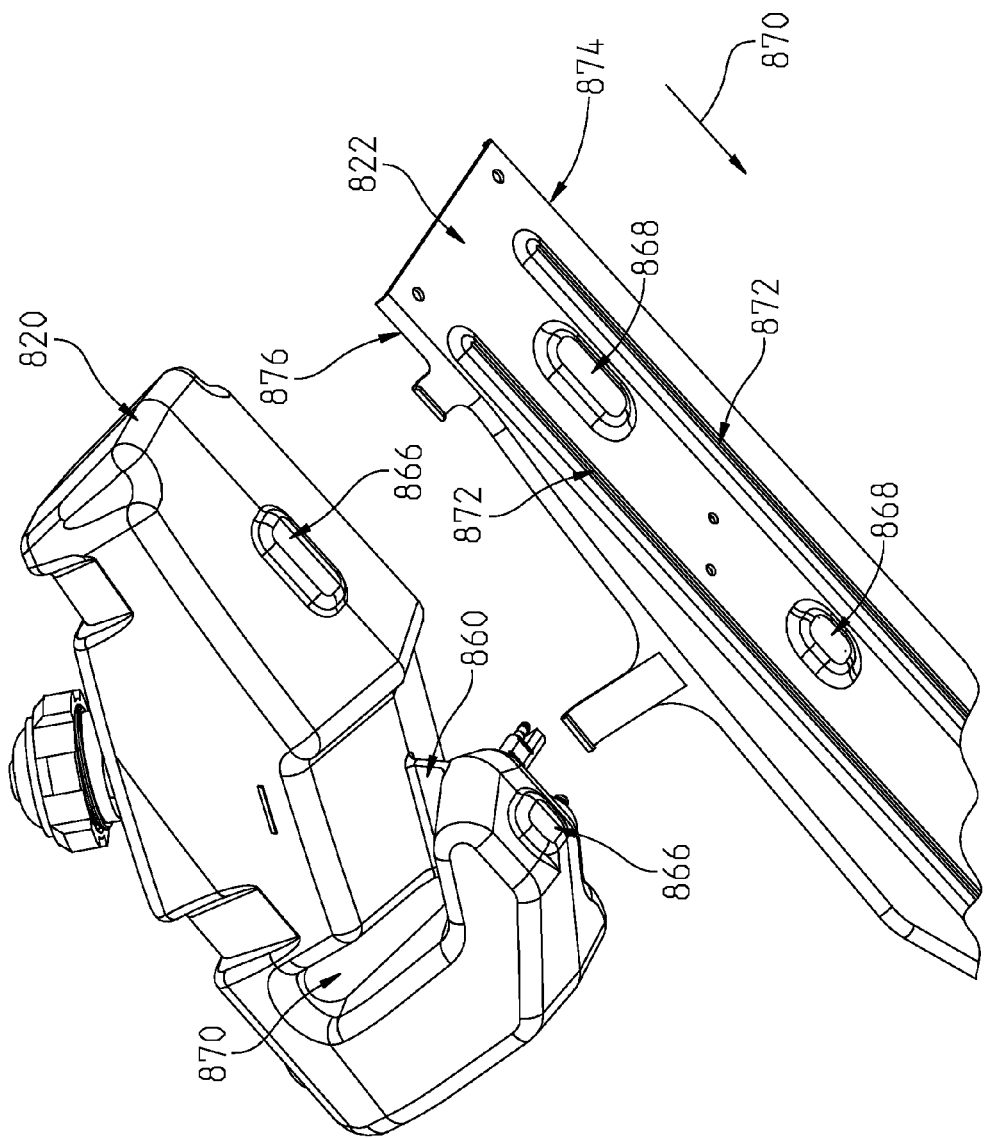
FIG. 40 illustrates exemplary locators of the oil container and the clutch guard of FIG. 39.

Referring to FIG. 40, oil bottle 820 includes locators 866 which cooperate with locators 868 of clutch guard 824. Locators 866 and 868 position oil bottle 820 relative to clutch guard 824 and reduce the likelihood that oil container 820 will slide in direction 870 relative to clutch guard 824. In the illustrated embodiment, locators 866 are bumps on the lower side of oil bottle 820 and locators 868 are recesses in clutch guard 824. In one embodiment, oil container 820 includes recesses and clutch guard 824 includes bumps to locate oil bottle 820 relative to clutch guard 824. Alternative locators may be used to position oil bottle 820 relative to clutch guard 824.

As shown in FIG. 40 clutch guard 824 includes recesses 872. Recesses 872 extend along a first side 874 and a second side 876 respectively of clutch guard 824. Recesses 872 serve to channel in the oil which is spilled during the filling of the oil container 820 away from CVT 824. Instead the spilled oil flows down in direction 870 in recesses 872.

Referring to FIG. 39, oil container 820 includes a pair of recesses 880 which extend from a first side of oil container 820 across a top of oil container 820 and down a second side of oil container 820. Recesses 880 are provided to retain a coupler 822. In the illustrated embodiment, coupler 882 is a compliant strap 884 having a first clip member 886 and a second clip member 888. Clip members 886 and 888 are received by corresponding clips 890 and 892, respectively on clutch guard 822. Clip members 890 and 892 on clutch guard 822 are positioned to take into account differences in the height of oil container 820 at the two recesses 880. This permits identical couplers 882 to be used with both the first recess 880 and the second recess 880 of the oil bottle 820.

Figure 44:
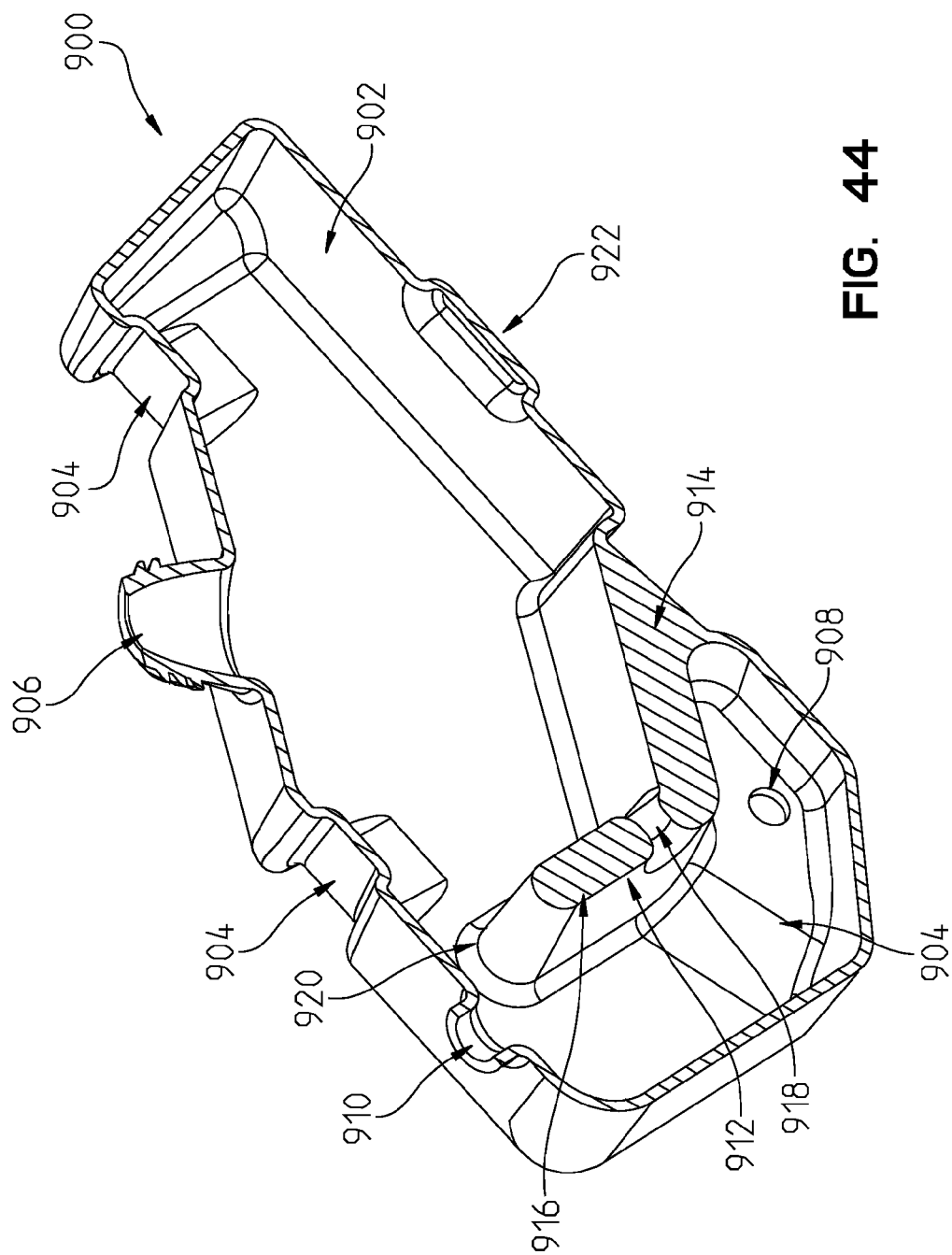
FIG. 44 illustrates a partial view of another exemplary oil container through a center plane of the oil container.

Referring to FIG. 44, another exemplary oil container 900 is shown. Oil container 900, like oil container 820, is made from a blow-molded plastic material. Oil container 900 includes a main reservoir region 902 and a sump region 904. Oil enters oil container 900 through fill port 906. Sump region 904 includes a fluid outlet 908 which receives a fitting, such as fitting 840 shown in FIG. 39. Further, oil container 900 includes an opening 910 for receiving an oil sender. The volumes of main reservoir 902 and sump reservoir 904 generally correspond to the volumes of main reservoir 834 and sump reservoir 836.

Oil container 900 includes a divider 912. Divider 912 includes a first shut off region corresponding to a pinch off 914 and a second shut off region corresponding to a pinch off 916. Pinch off regions 914 and 916 are separated by fluid conduit 918 which is in fluid communication with both main reservoir region 902 and sub-region 904. Oil in main reservoir region 902 passes into sump region 904 either through fluid conduit 918 or in the region 920 above divider 912.

Figure 45:
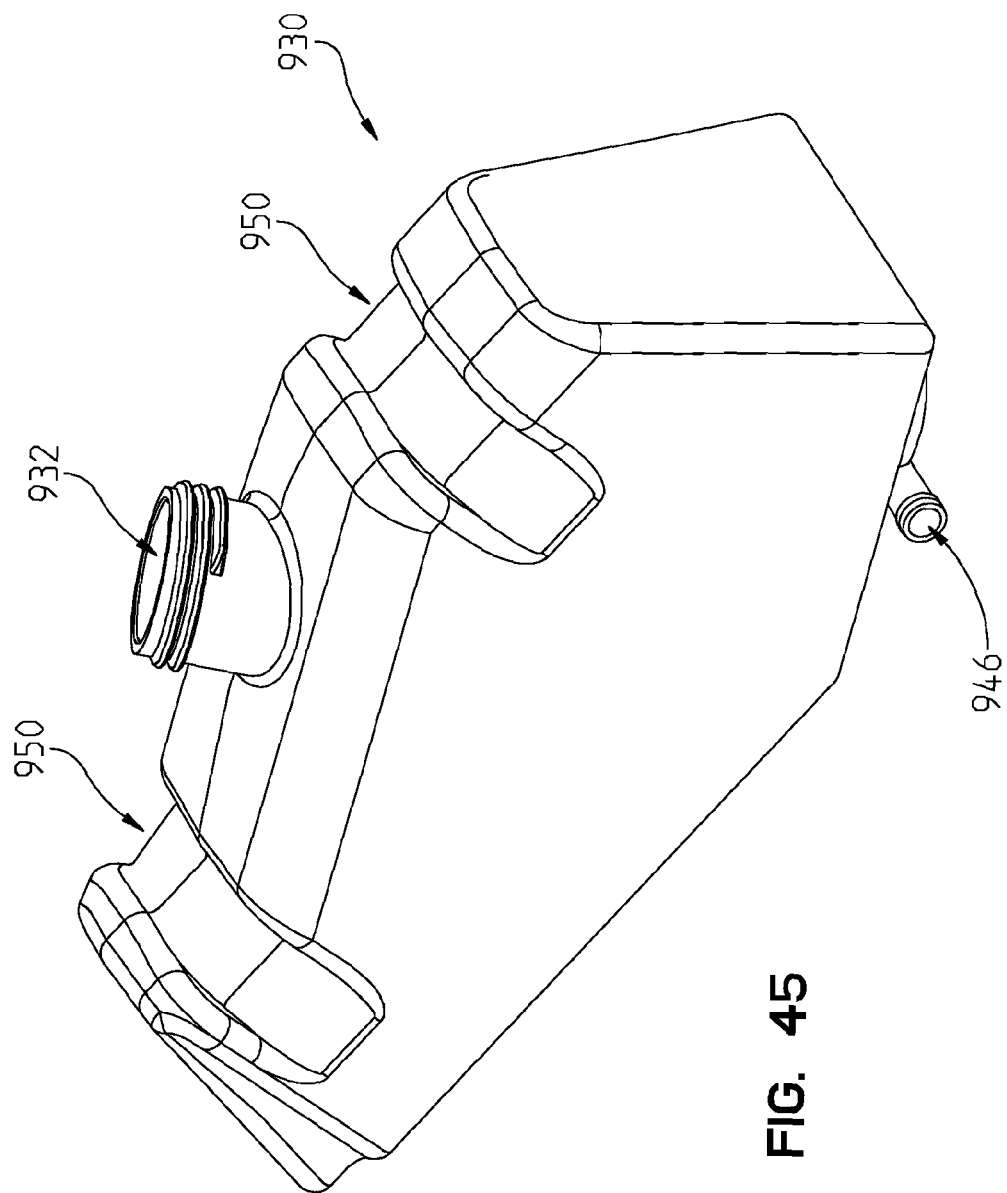
FIG. 45 illustrates a perspective view of a further exemplary oil container.
Figure 46:
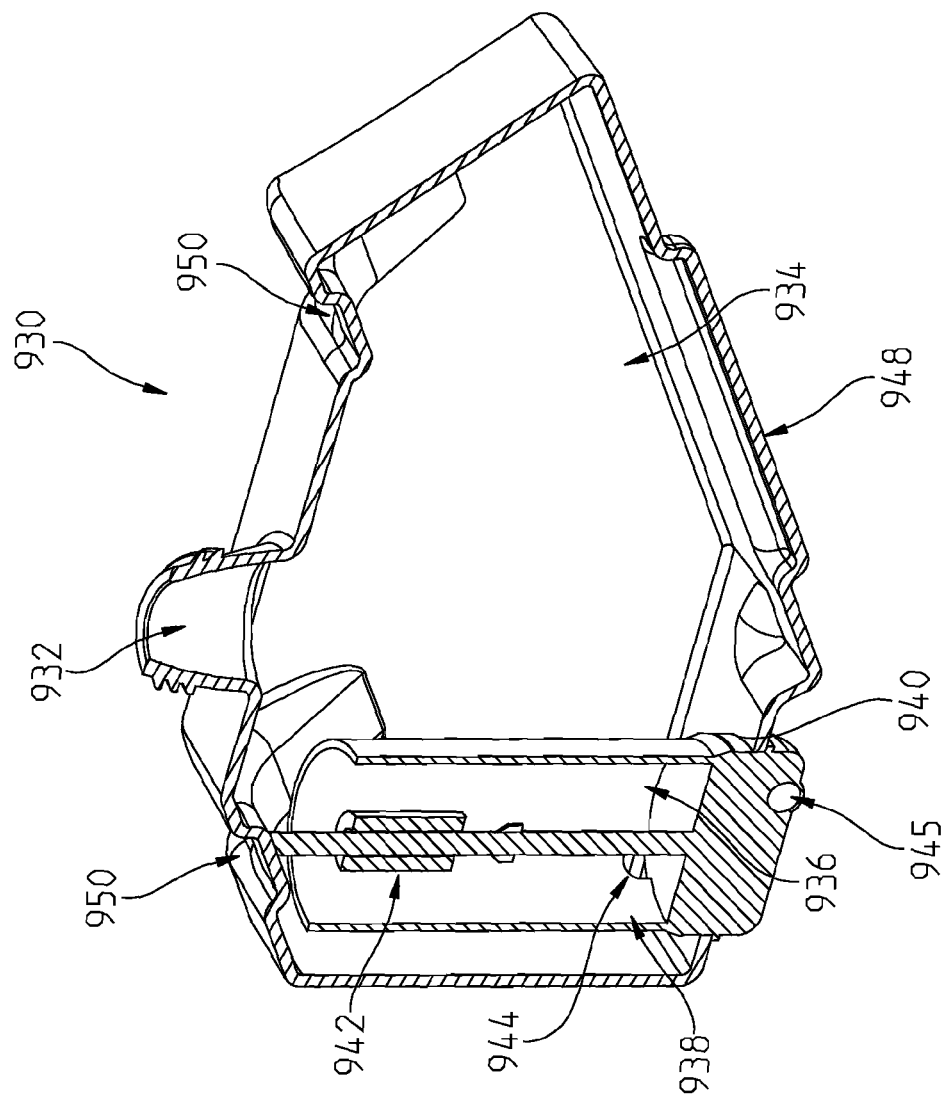
FIG. 46 illustrates a right, partial, perspective view of the oil container of FIG. 45 through a center plane of the oil container.
Figure 47:
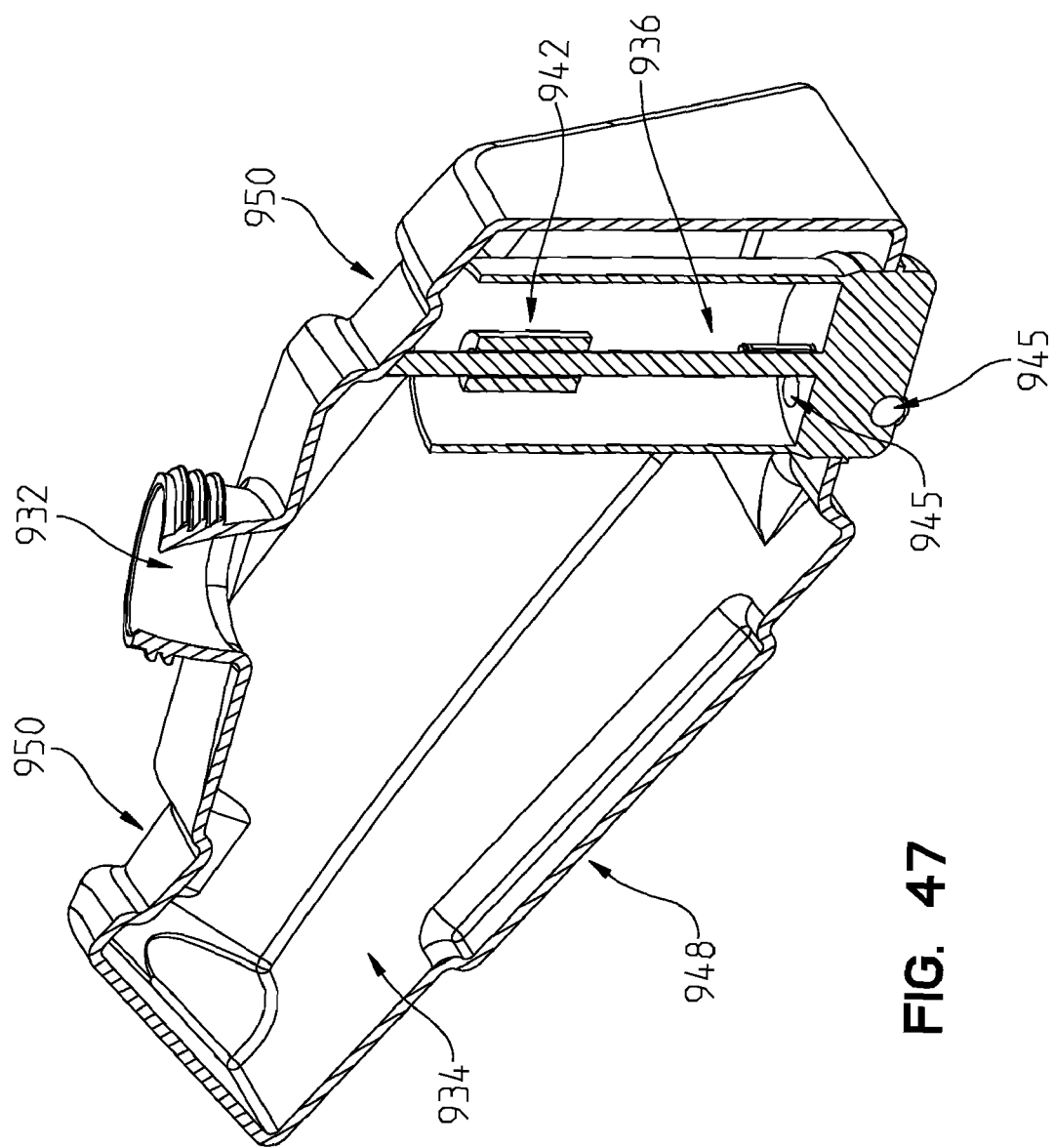
FIG. 47 illustrates a left, partial, perspective view of the oil container of FIG. 45 through a center plane of the oil container.

Oil container 900 includes a locator 922 which cooperates with locator 868 on clutch guard 822 to position oil container 900 relative to clutch guard 822. Oil container 900 also includes recesses 904 which are used to retain couplers 882 described above in connection with oil container 820. Another exemplary oil container 930 is shown in FIGS. 45-47. Oil container 930 as shown is formed from a blow molded piece of material. Referring to FIG. 46, oil container 930 includes a fill port 932 through which oil is introduced into a main reservoir 934. A sump reservoir 936 is provided within a housing 938. Housing 938 is received in an opening 940 in the bottom of oil container 930. Housing 938 includes an integrated oil sender 942, a fluid inlet port 944, and a fluid outlet port 946 (see FIG. 45). Fluid inlet port 944 and fluid outlet port 946 are connected by fluid conduit 945. Oil from main reservoir 934 enters sump reservoir 936 through fluid port 944 and is communicated to the engine 108 through fluid outlet port 946.

Oil container 930 also includes a locator 948 which cooperates with a similarly-sized locator provided on clutch guard 822. Further oil container 930 includes recesses 950 which retain couplers 882 to oil container 930 relative to clutch guard 822.

Figure 48:
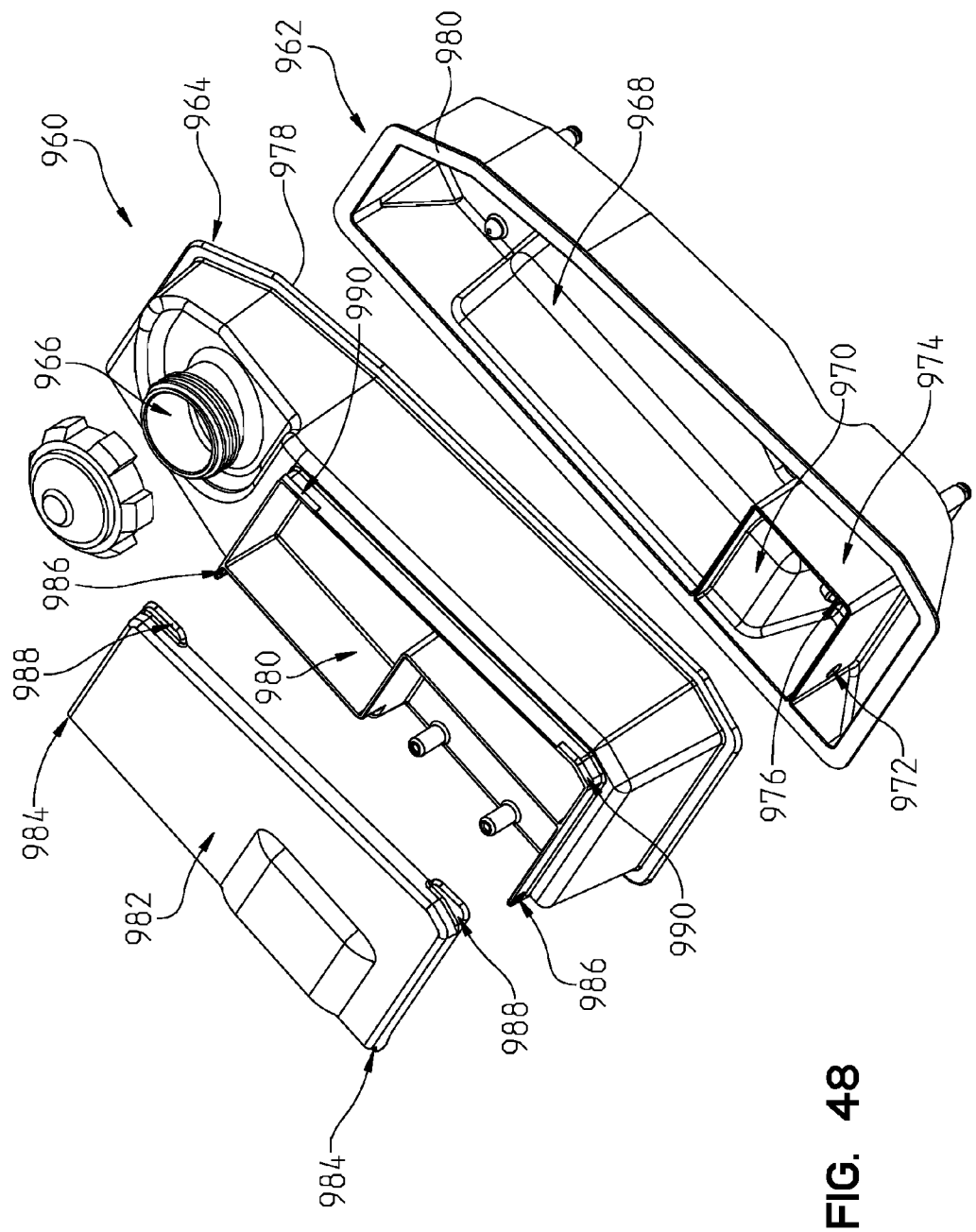
FIG. 48 illustrates an exploded, assembly view of still another exemplary oil container.

Referring to FIG. 48 a further exemplary oil bottle 960 is shown. Oil bottle 960 is made from a lower housing 962 and a upper housing 964. Upper housing 964 includes a oil fill port 966 which communicates oil to a main reservoir portion 968. A sump reservoir portion 970 is provided in oil container 960. Sump region 970 is in fluid communication with main reservoir region 968 through a fluid inlet port 972 provided in a divider 974. Oil leaves sump region 970 through a fluid outlet port 976 which is coupled to an oil line connected to an engine 108. A lower flange 978 of upper housing 964 is positioned adjacent an upper flange 980 of lower housing 962 to form main reservoir 968 and sump reservoir 970. In one embodiment, a seal is provided between lower housing 962 and upper housing 964 to prevent oil from leaking from oil container 960. Upper housing 964 includes a storage compartment 980. A tool kit or other items may be stored in storage compartment 980. A cover 982 is provided which may be coupled to upper housing member 964. In one embodiment, pins 984 on cover 982 are received in opening 986 of upper housing member 964 to rotatably couple cover 982 to upper housing 964. Cover 982 includes handles 988 which are used to open cover 982. Upper housing portion 964 includes détente members 990 which cooperate with corresponding members on cover 982 to secure cover 982 in a closed position.

Figure 49:
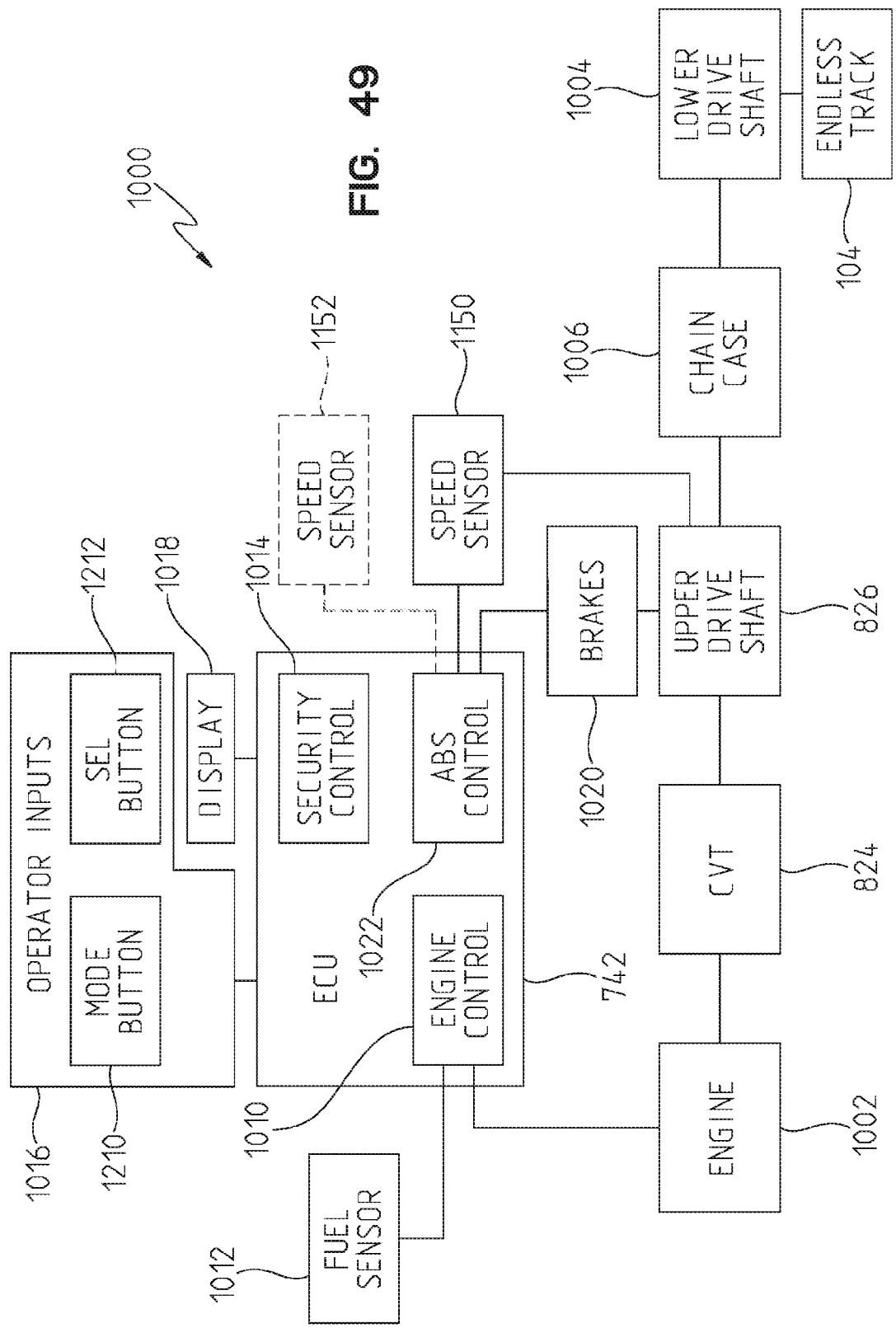
FIG. 49 illustrates a representation of the power train of the exemplary snowmobile of FIG. 1.

Referring to FIG. 49 a representation of the power train system 1000 of vehicle 100 is shown. Power train system 1000 includes engine 108 which is operatively coupled to CVT 824. CVT 824 is operatively coupled to an upper driveshaft 826. Upper driveshaft 826 is operatively coupled to a lower driveshaft 1004 through a chain case 1006. As stated herein lower driveshaft 1004 is operatively coupled to endless track assembly 104 through drive members 126.

Engine 108 is operatively coupled to ECU 742. ECU 742 includes a engine control portion 1010 which controls the operation of engine 108. In one embodiment, a fuel sensor 1012 is provided to determine a type of fuel which is being used by engine 108 including various blends of ethanol and gasoline. Fuel sensor 1012 provides an indication of the fuel type to engine control unit 1010 which in turn controls the operation of engine 108. Exemplary fuel sensors are described in U.S. patent application Ser. No. 11/445,731, filed Jun. 2, 2006, the disclosure of which is expressly incorporated by reference herein.

Further, the operation of engine 108 may be adjusted and based on the output of a security control module 1014 contained within the ECU 742. As explained herein, in one embodiment security control module 1014 alters the operation of vehicle 100 based upon whether or not the correct security code or indicator has been provided to vehicle 100. In one embodiment, as explained herein security modes and inputs are provided to ECU 742 through operator inputs 1016 and indications are provided back to the operator through a display 1018.

Further, as explained herein a braking unit 1020 is operatively coupled to upper drive shaft 826. In one embodiment, ECU 742 includes ABS control 1022 which controls the operation of braking unit 1020 as explained herein. In one embodiment, one or more of security control 1014 and ABS control 1022 are separate modules not included in ECU 742.

Referring to FIG. 50, an exemplary braking unit 1020 is shown. Braking unit 1020 includes a brake disc 1026 coupled to a spline section 1028 of upper drive shaft 826 and a brake caliper 1030 which is coupled to frame 110 through a housing 1110 of chain case 1006. Brake caliper 1030 interacts with brake disc 1026 to slow or stop the rotation of drive shaft 826.

In one embodiment, the pressure applied by brake caliper 1030 on brake disc 1026 is controlled by ABS control 1022. ABS control 1022 controls a pump motor 1032 which varies the hydraulic pressure applied to brake caliper 1030 which in turn varies the amount of force applied by brake caliper 1030 on brake disc 1026.

During a braking event on a conventional brake equipped snowmobile when the operator quickly and firmly applies and holds the brake lever on the handlebar the endless track 130 will typically lock. The snowmobile will transfer weight to the front skis and the endless track will slide causing the snowmobile to over-steer and skid which will hinder the operator's ability to control the snowmobile. On an embodiment of vehicle 100 including ABS when the operator quickly and firmly applies and holds the brake lever, ABS control 1022 will intervene and cause brake caliper 1030 to release brake disc 1026 before endless track assembly 104 lockup occurs minimizing the possibility of an over-steer condition.

ABS control 1022 looks at the percent slip between the endless track velocity and the snowmobile velocity. Percent slip as $$\text{Percent Slip} = 100 * \left(1 - \frac{\text{Endless Track Velocity}}{\text{Snowmobile Velocity}}\right)$$

wherein Endless Track Velocity is the measured speed of the track through a speed sensor 1150 and Snowmobile Velocity is one of an estimated speed of the snowmobile or a measured speed through a speed sensor 1152. In one embodiment, speed sensor 1150 measures the rotational speed of drive shaft 826. Exemplary speed sensors to measure the rotational speed of drive shaft 826 include hall effect sensors.

In one embodiment, Snowmobile Velocity is measured with speed sensor 1152. Exemplary speed sensors include GPS sensors, Doppler sensors, and accelerometers. In one embodiment, Snowmobile Velocity is estimated based on the Endless Track Velocity. It is assumed that prior to applying the brakes the Snowmobile Velocity is generally equal to the Endless Track Velocity. Then the Snowmobile Velocity is allowed to decay based on a deceleration curve to arrive at an estimated Snowmobile Velocity. Once the brake lever is released, or in the case of ABS the brake caliper is released to prevent lock, the Endless Track Velocity may again be sampled with speed sensor 1150 and the Snowmobile Velocity set equal to the sensed speed.

In one embodiment, when the operator applies the brake lever normal braking is permitted until the percent slip is at least about 33 percent, then the ABS module 1022 starts to cycle the brakes (applying pressure with caliper and then releasing in a repeated fashion) until the percent slip rises to about 70 percent, at which point ABS module 1022 releases the brake to prevent lockup. Of course, when the brake is released the estimated Snowmobile Velocity again returns to the sensed Endless Track Velocity and the progression begins again. In one example, the brake caliper is cycled at about 30 Hertz when the percent slip is between about 33 percent and about 70 percent. In one embodiment, the range corresponding to the cycling of the brake caliper is from about 50 percent to about 60 percent.

By using an estimate for the Snowmobile Velocity, ABS module is able to permit an operator to tap the brakes during a jump to assist in flattening out the vehicle while it is in the air. Further, in one embodiment, ABS module 1022 includes logic to take into account vehicle 100 moving on an icy surface. In this scenario, the Endless Track Velocity may be 80 miles per hour (mph), but the true Snowmobile Velocity is only 20 mph. when the brakes are first applied and the slip reaches the ABS threshold for cycling (such as about 50 percent slip) then ABS module 1022 initially assumes the Snowmobile Velocity is also 80 mph. Then when the module releases at the lock threshold (such as about 60 percent slip) due to the deceleration curve for 80 mph, the next Endless Track Velocity is about 20 mph. ABS control assumes that vehicle 100 is on an icy surface and sets the next estimated Snowmobile Velocity to about 20 mph.

Figure 51:
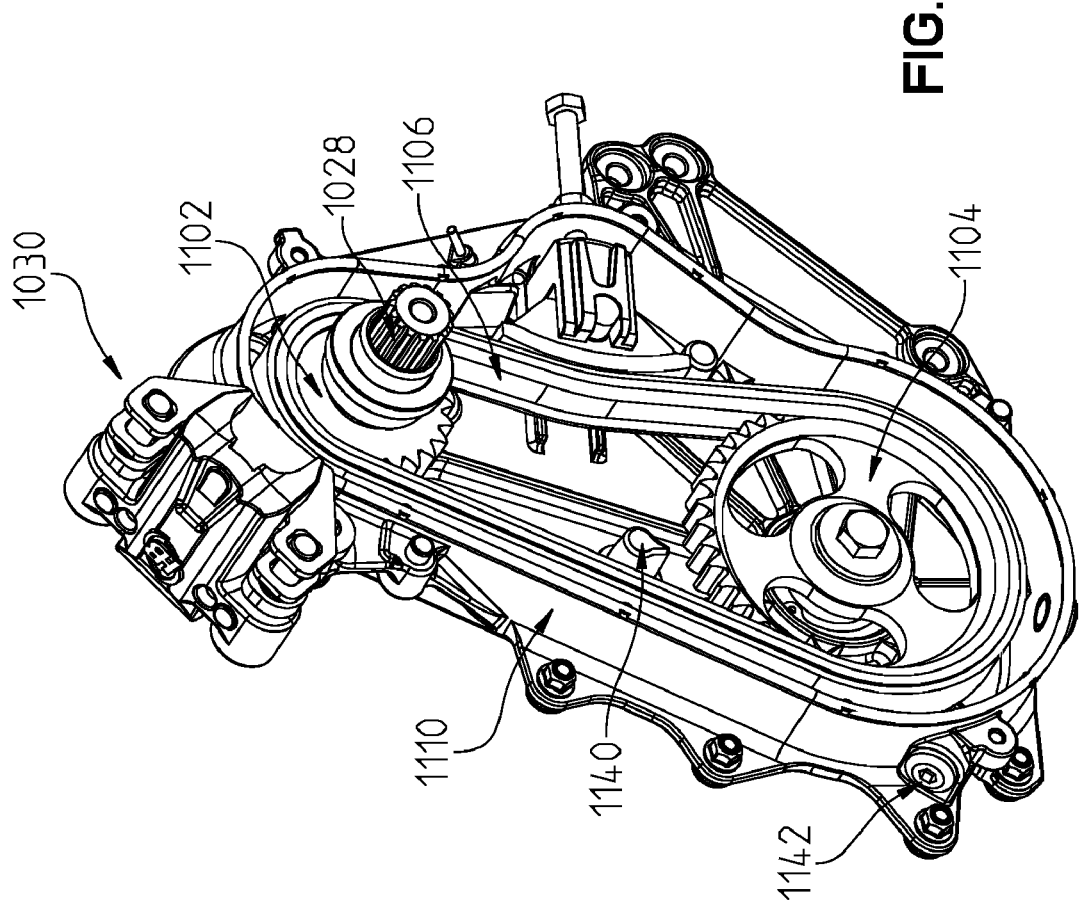
FIG. 51 illustrates a chain case of the assembly of FIG. 50 having a cover removed.

Referring to FIG. 50, drive shaft 826 is shown. Drive shaft 826 is coupled to driven clutch 828 of CVT 824 on a first end and a chain case 1006 on a second end. Driven clutch 828 causes a rotation of drive shaft 826, which in turn, causes a rotation of a first gear 1102 (see FIG. 51) positioned within chain case 1006. Referring to FIG. 51, first gear 1102 is coupled to a second gear 1104 through a chain 1106, both being positioned within chain case 1006. The second gear 1104 is coupled to drive shaft 124 which in turn is coupled to endless track assembly 104 through pair of drive sprockets 126.

Figure 53:
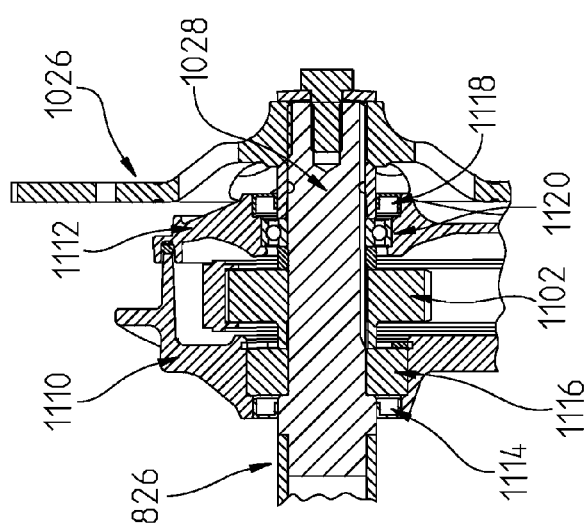
FIG. 53 illustrates a sectional view of an upper drive shaft along lines 53-53 in FIG. 52.

Referring to FIG. 53, drive shaft 826 includes spline section 1028. Spline section 1028 extends through an opening in a chain case housing 1110 and an opening in a chain case cover 1112. A first seal 1114 is positioned between spline section 1028 and chain case housing 1110 along with a first bearing 1116. An exemplary bearing is a roller bearing. A second seal 1118 is positioned between spline section 1028 and chain case cover 1112 along with a second bearing 1120. An exemplary bearing is a roller bearing. First gear 1102 is mounted to spline section 1028 between first bearing 1116 and second bearing 1120. Brake disc 1026 is mounted to spline section 1028 outward of chain case cover 1112. By having bearings positioned on both sides of first gear 1102, the amount of knock-back experienced while riding vehicle 100 is reduced.

Figure 52:
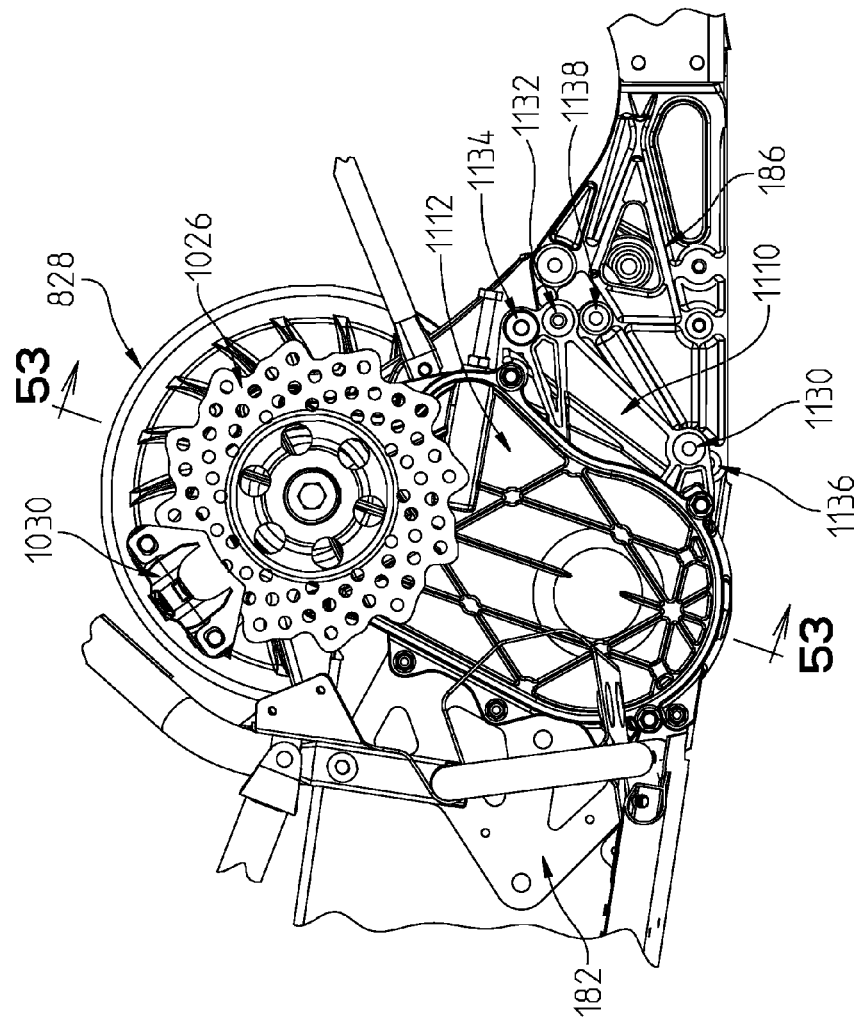
FIG. 52 illustrates a side view of the assembly of FIG. 50 positioned relative to the frame of the exemplary snowmobile of FIG. 1.

Chain case 1006 includes various mounting locations which permit vehicle 100 to be setup for various configurations. Referring to FIG. 52, chain case housing 1110 includes a first mounting location 1130, a second mounting location 1132, and a third mounting location 1134. As illustrated, first mounting location 1130 and second mounting location 1132 are aligned with mounting locations (not shown) on right side bulkhead member 186. Right side bulkhead member 186 also includes additional mounting locations 1136 and 1138. During assembly of vehicle 100, first mounting location 1130 is aligned with either the mounting location it is currently obscuring in FIG. 52 or additional mounting location 1136 and is coupled thereto with a coupler, such as a bolt. Then, one of second mounting location 1132 and third mounting location 1134 is aligned with either the mounting location obscured by second mounting location 1132 in FIG. 52 or additional mounting location 1138. In this manner, the position of drive shaft 826 may be altered during assembly by the placement of chain case housing 1100.

Referring to FIG. 51, the inside of chain case housing 1110 includes features 1140 which direct the flow of oil in chain case 1006 onto second gear 1104. Feature 1140 is generally teardrop shaped to direct drops of oil onto second gear 1104. Oil is added to chain case 1006 through the opening left by removing a plug 1142.

Figure 54:
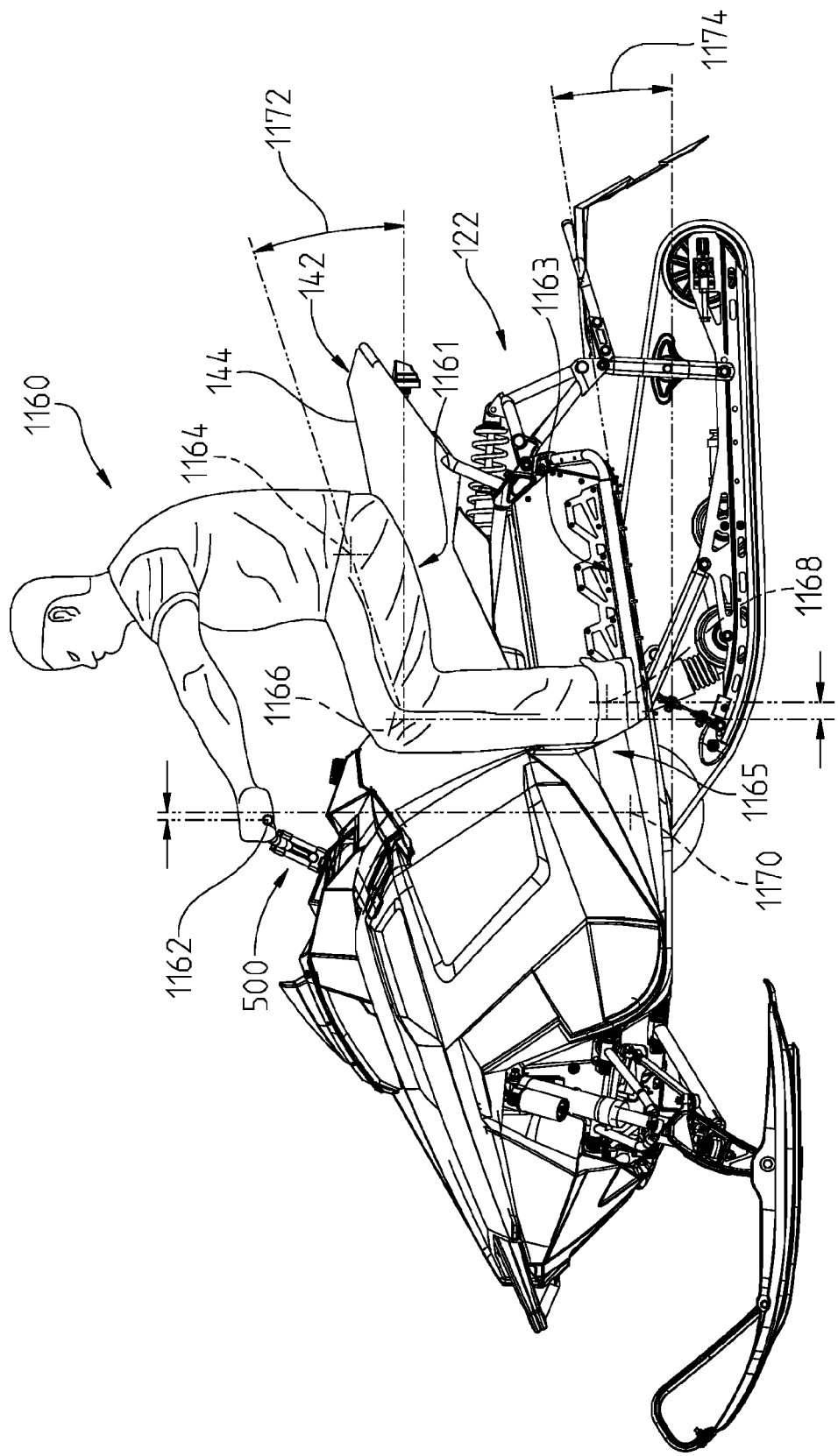
FIG. 54 illustrates an operator positioned on the vehicle of FIG. 1.

Referring to FIG. 54, an operator 1160 is shown positioned on vehicle 100. Operator 1160 is positioned at a first seating position region 1161 of seat 1142. Hands 1162 of operator 1160 are gripping handlebars 500. Feet of operator 1160 are positioned on running boards 1163 of vehicle 100. In particular, the front portions of the feet of the operator are positioned in a foot rest region 1165 (see FIG. 14) which is angled upward relative to the remainder of running boards 1163. In the illustrated embodiment, a foot supporting surface of foot rest region 1165 is angled upward relative to a foot supporting surface of the remainder of running boards by about 9 degrees, as indicated by angle 1174. The foot rest region 1165 has a foot containment member, illustratively a toe hook 1167, which extends over foot rest region 1165 to assist in keeping the foot of the operator positioned in foot rest region 1165.

As shown in FIG. 54, the hands 1162 of operator 1160 grip handlebar 500 forward of an axis 1170 of drive shaft 124. The position of the hips 1164, knees 1166, and ankles 1168 of operator 1160 are also shown. When seated in first seating position 1161, the knees 1166 of operator 1160 are forward of ankles 1168 and hips 1164 are elevated relative to knees 1166. By elevating hips 1164 relative to knees 1166, it is easier for operator 1160 to transition from a seated position as shown in FIG. 54 to a standing position or at least to a crouched position wherein the operator is spaced apart from seating surface 144 of seat 142.

In the illustrated embodiment, a line connecting the hips and knees (while the operator is seated on seat 142) is about 18 degrees above horizontal, as indicated by angle 1172. In one embodiment, the line connecting the hips and knees (while the operator is seated on seat 142) is at least about −2 degrees below horizontal to angles above horizontal. In one embodiment, the line connecting the hips and knees (while the operator is seated on seat 142) is up to about 25 degrees above horizontal. In one embodiment, the line connecting the hips and knees (while the operator is seated on seat 142) is above horizontal and is up to about 25 degrees above horizontal. In one embodiment, the line connecting the hips and knees (while the operator is seated on seat 142) is between about −2 degrees below horizontal and about 25 degrees above horizontal. In one example, the operator is an average size adult human.

As mentioned herein, in one embodiment, security control module 1014 alters the operation of vehicle 100 based upon whether or not a correct security code has been provided to vehicle 100. In one embodiment, a security code and other inputs are provided to ECU 742 through operator inputs 1016 and indications are provided back to the operator through a display 1018.

Figure 57:
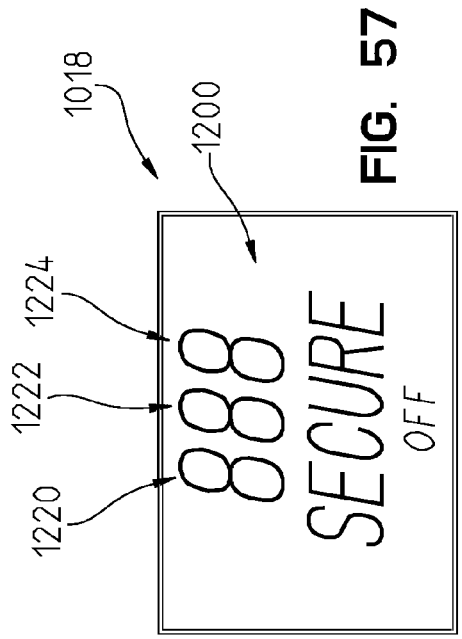
FIG. 57 illustrates a first exemplary display screen of a vehicle display.
Figure 58:
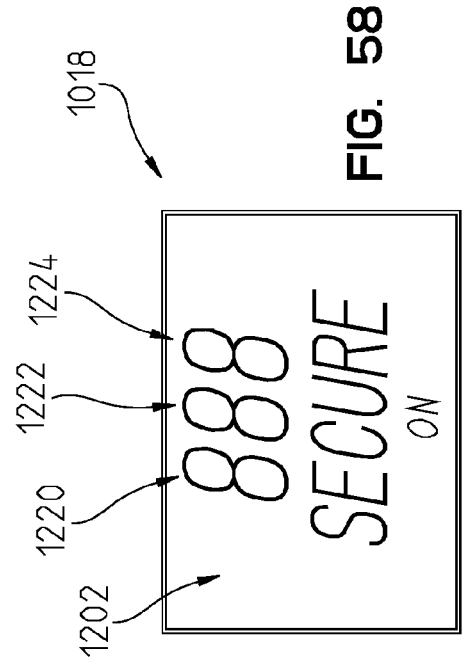
FIG. 58 illustrates a second exemplary display screen of a vehicle display.

Referring to FIG. 57, an exemplary screen 1200 presented on display 1018 is shown. Screen 1200 is displayed when vehicle 100 is started and a secure mode is not active for vehicle 100. In a non-secure mode, vehicle 100 operates normally. In a secure mode, the engine rpm is limited to a level below an engagement rpm for CVT 824. The engine rpm may be limited by at least one of restricting the provision of fuel to engine 108 and interrupting the spark of the igniters of engine 108. The engine remains limited until a correct security code is provided. Referring to FIG. 58, a screen 1202 corresponding to when vehicle 100 is started in a secure mode is shown. In one embodiment, a timer also shuts off engine 108 after a predetermined time period if a valid security code has not been presented to security control module 1014. Exemplary security codes include manually entered numeric codes, manually entered alpha-numeric codes, biometric information provided to a reader, electromagnetic signals including security code information provided to a receiver, and other suitable methods of presenting a security code.

Figure 59:
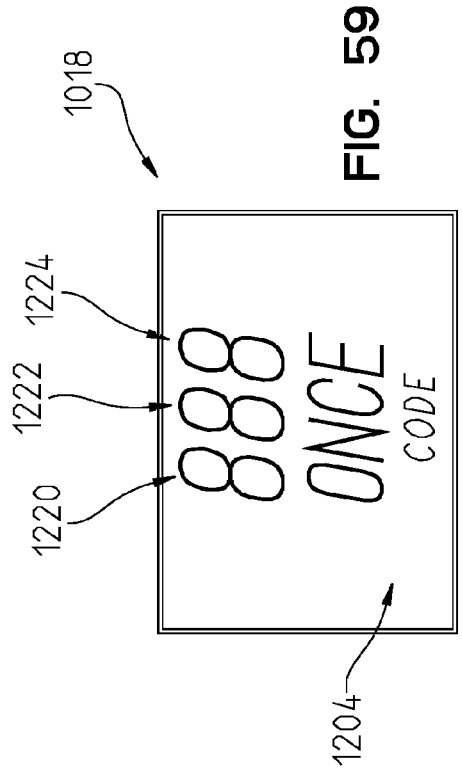
FIG. 59 illustrates a third exemplary display screen of a vehicle display.

In one embodiment, the operator may select to have vehicle 100 start in a secure mode only at the next start and thereafter start in a non-secure mode. This situation is ideal for when the operator is parking their vehicle is a public or unfamiliar location, such as stopping for lunch on a trail. Referring to FIG. 59, a screen 1204 corresponding to when a secure once (the next start) mode has been selected for vehicle 100 is shown.

Figure 60:
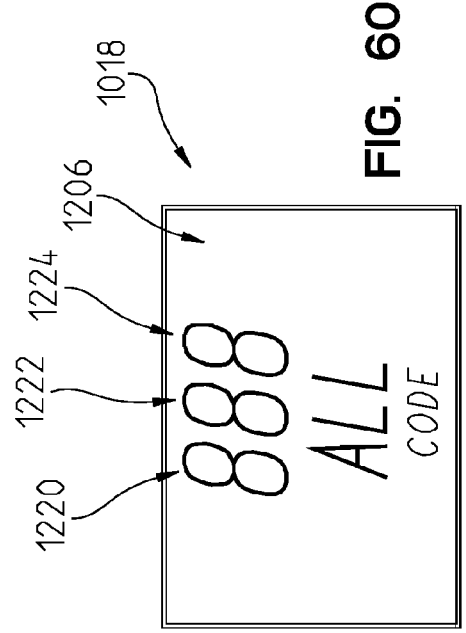
FIG. 60 illustrates a fourth exemplary display screen of a vehicle display.

In one embodiment, the operator may select to have vehicle 100 start in a secure mode at every start. Referring to FIG. 60, a screen 1206 corresponding to when a secure all (every start) mode has been selected for vehicle 100 is shown.

An exemplary operation of security control module 1014 is represented. The operation of security control module 1014 is presented wherein the operator provides inputs through a Mode button 1210 and a Sel button 1212 of operator inputs 1016 and provides information to the operator through display 1018. However, the methods of operator input and feedback may be accomplished in different manners.

In one embodiment, the security code is entered with mode button 1210 and sel button 1212, as follows. To enable one of the secure modes, the operator 1160 will press and hold the mode button 1210 and sel button 1212 on the display 1018 for a predetermined time, such as 3 seconds while the brake is in a parking brake locked position. In one example, the vehicle 100 must be running with an engine RPM of 3500 or less, and a ground speed of 0 to set or change security modes.

When the operator presses and holds mode button 1210 and sel button 1212 for the predetermined time, the display 1018 will change from normal display mode wherein a tachometer reading and a speed reading are displayed to a security set mode. In the security set mode, the left most digit 1220 of display 1018 becomes active and displays a "0" which blinks at a rate of 2 HZ. The operator releases mode button 1210 and sel button 1212. Subsequent pressing and releasing of sel button 1212 increments the active digit by 1 for each press and release cycle. Pressing mode button 1210 accepts the value for the left digit and moves the cursor to the middle digit. The left digit will no longer blink, but the middle digit will now blink. Subsequent pressing and releasing of sel button 1212 increments the active digit by 1 for each press and release cycle. Pressing mode button 1210 accepts the value for the middle digit and moves the cursor to the right digit. The left digit and the middle digit will no longer blink, but the right digit will now blink. Subsequent pressing and releasing of sel button 1212 increments the active digit by 1 for each press and release cycle. Pressing mode button 1210 accepts the value for the right digit and moves the cursor to the right digit. The left digit and the middle digit will no longer blink, but the right digit will now blink. At anytime in the process, if no buttons are pressed for 5 seconds, the display 1018 exit the security mode and return to normal display mode and no security code will be set.

Pressing mode button 1210 again will set cursor back on left most digit, holding mode button 1210 for a predetermined time period, such as 3 seconds, will bring up the "ONCE" or "ALL" selection. The display 1018 will first now "ONCE". Pressing and holding mode button 1210 for a predetermined time, such as 3 seconds will select the ONCE security mode wherein the security code is required only for the next start. Pressing the sel button 1212 will toggle the lower display to show "ALL". Pressing and holding mode button 1210 for a predetermined time, such as 3 seconds will select the ALL security mode wherein the security code is required for each subsequent start. Once one of the ONCE security mode and the ALL security mode has been selected, the entered code is displayed on the top segment line of display 1018, "ONCE" or "ALL" on the middle segments line, and "CODE" on the bottom. The code will flash for a predetermined time period, such as 3 seconds. The code and security mode will then be written to the ECU 742 and display 1018 will return to normal function. At anytime in the process, if no buttons are pressed for 5 seconds, the display 1018 exit the security mode and return to normal display mode and no security code will be set.

Figure 61:
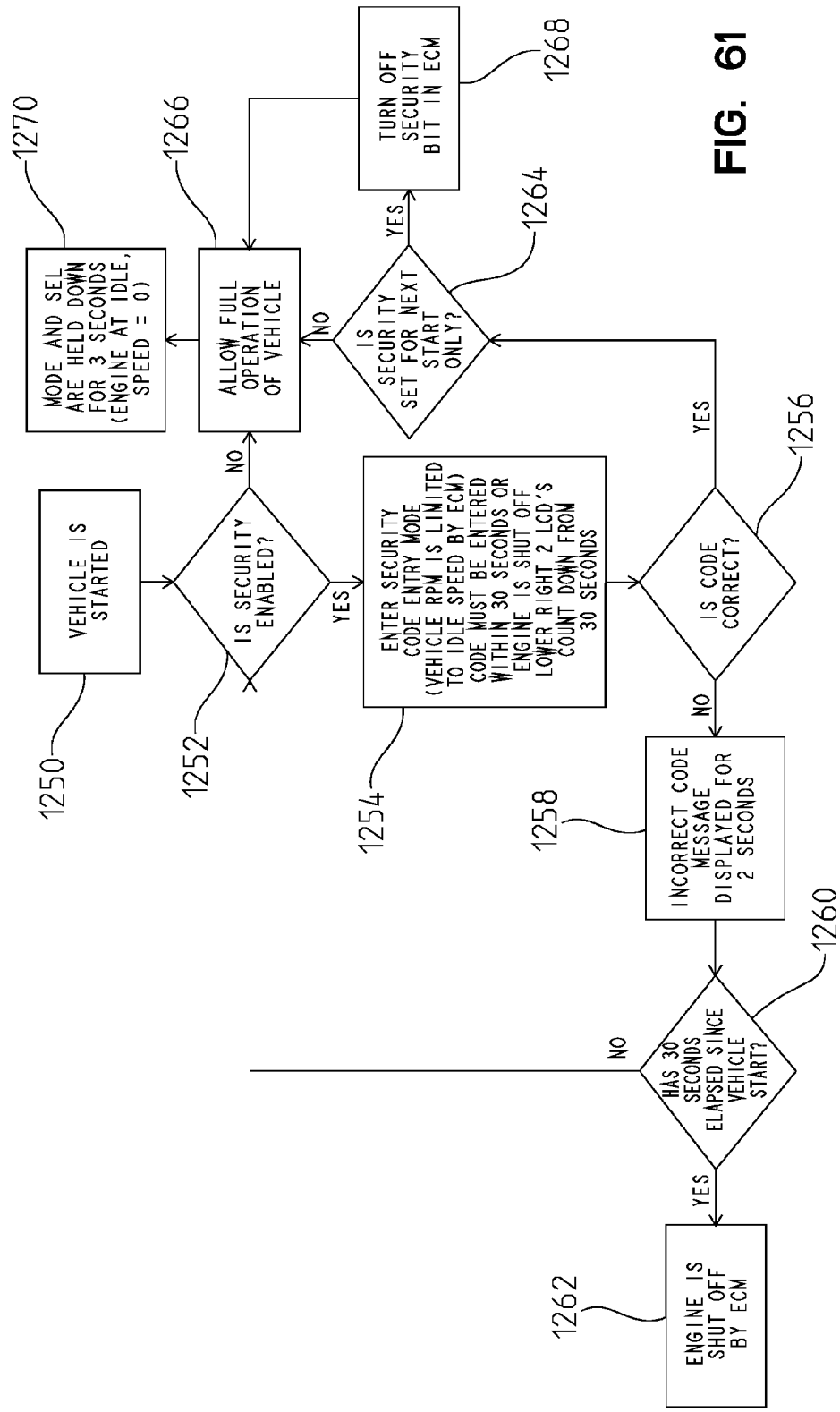
FIGS. 61 and 62 illustrate an exemplary flow chart for a vehicle security system of the vehicle of FIG. 1.
Figure 62:
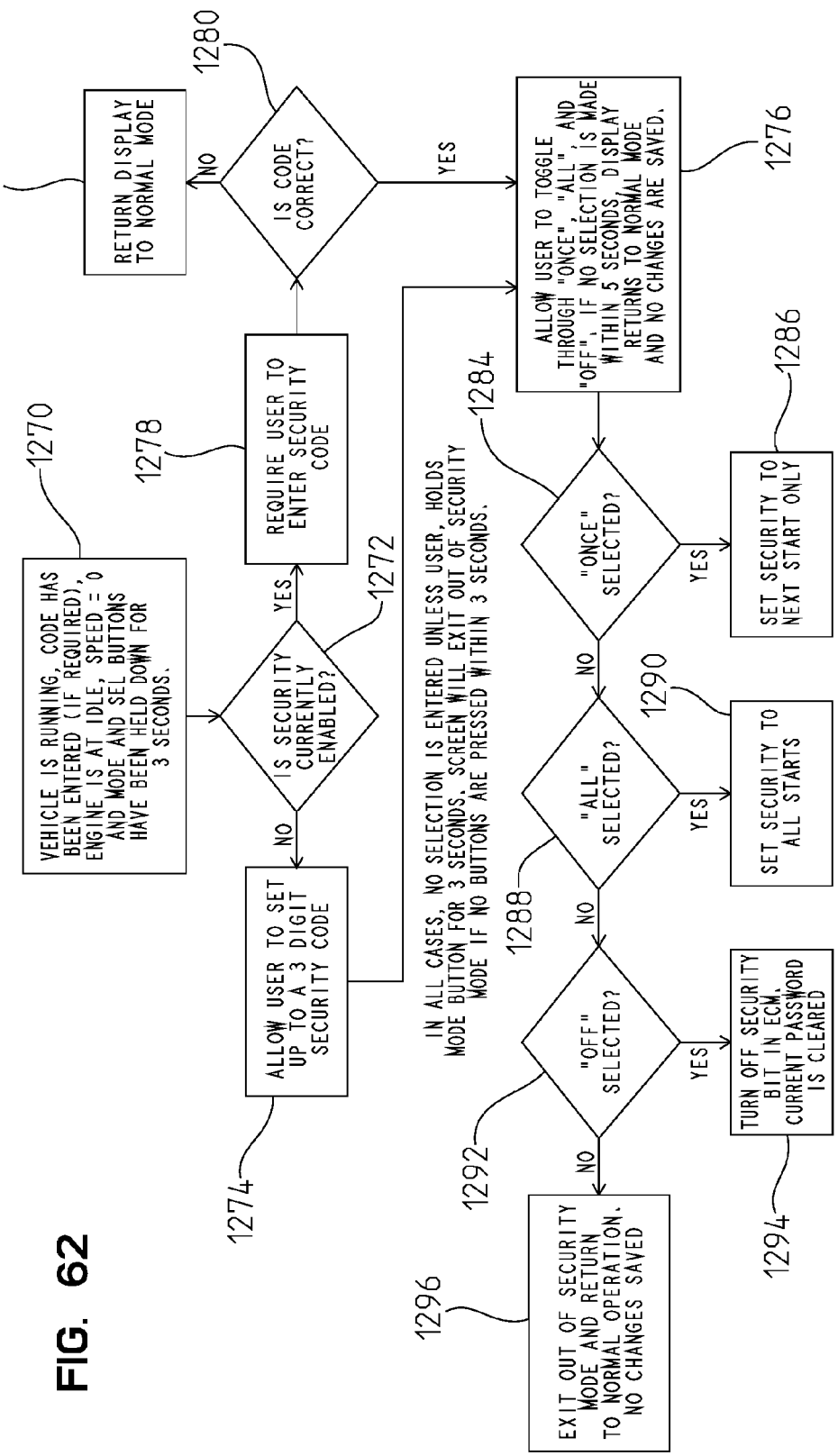

Referring to FIG. 61, vehicle 100 is started, as represented by block 1250. A check is made to see if a security mode is active or not, as represented by block 1252. If a security mode is not active, vehicle 100 is allowed full functionality, as represented by block 1266. If a security mode is active, the operator is prompted to enter the security code, as represented by block 1254. The operator is given a predetermined period of time, such as thirty seconds, to enter the security code before engine 108 is shut-off. With the vehicle running at idle and a ground speed of 0, the operator presses and holds the mode button 1210 and sel button 1212 for a predetermined time, such as 3 seconds. A check is made to determine if the code entered matches what is stored in the ECU 742, as represented by block 1256. If the entered code does not match the code stored in the ECU 742, the display will show "Secure" "Err", as represented by block 1258. A check is made to see if the thirty second window has expired, as represented by block 1260. If not, the operator is given another chance to enter a security code, as represented by block 1254. if the thirty second window has expired, vehicle 100 is shut off, as represented by block 1262.

If the entered code matches the code stored in ECU 742, a check is made to determine if the security mode was "ONCE" or "ALL", as represented by block 1264. If the security mode was set to "ALL" then vehicle 100 is allowed full functionality, as represented by block 1266. If the security mode was set to "ONCE" then the security mode is disabled, as represented by block 1268, and then vehicle 100 is allowed full functionality, as represented by block 1266. Further, the current security code is cleared when security is turned OFF. Display 1018 will toggle to show "Secure" "OFF".

At anytime the engine is at idle and the track speed is zero, an operator may enter a security setup, as represented by block 1270. A check is made to see if a security mode is currently active, as represented by block 1272. If a security mode is not currently active, an operator may enter a three digit security code as outlined herein, as represented by block 1274. Once the code has been entered, the operator is presented options for the security system, as represented by block 1276. Returning to block 1272, if a security mode is currently active, the operator is required to enter the security code, as represented by block 1278. A check is made to see if the entered code matches the stored code, as represented by block 1280. If the code does not match the stored code, display 1018 is returned to normal display, as represented by block 1282. If the code matches the stored code, then matches the operator is presented options for the security system, as represented by block 1276.

The operator is able to toggle through various options for the security system. A first option is to set the security mode to "ONCE", as represented by blocks 1284 and 1286. A second option is to set the security mode to "ALL", as represented by blocks 1288 and 1290. A third option is to turn the security mode to "OFF", as represented by blocks 1292 and 1294. If none of the three options are selected or a predetermined time period, such as five seconds, passes without further input the system will exit and no changes will be saved, as represented by block 1296.

In one embodiment, multiple security codes may be set. In the security codes may be used to operate vehicle 100 in various modes. For instance, a first code may be used for a novice mode wherein the acceleration and top speed of vehicle 100 is limited, a second code may be used for a cruise mode wherein acceleration is optimized for fuel economy, a third code is for an expert mode wherein the acceleration and top speed and other parameters, such as braking, are optimized for an expert rider, and a fourth code is for normal operation. In one example, any security code having a "1" as the right digit will cause vehicle 100 to operate in the novice mode, any security code having a "2" as the right digit will cause vehicle 100 to operate in the cruise mode, any security code having a "3" as the right digit will cause vehicle 100 to operate in the expert mode, and any security code having a "4"-"0" as the right digit will cause vehicle 100 to operate in the normal mode.

In one embodiment, ECU 742 stores vehicle speed and tachometer readings for a predetermined time period for potential playback to the operator. The operator when vehicle 100 is idling at zero speed may through operator inputs 1016 select to playback their stored speed and tachometer readings.

In one embodiment, ECU 742 will cause vehicle 100 to shutdown after a predetermined time period if the water temperature of cooling system 630 is above a set value. This allows an operator to start vehicle 100 and then be spaced apart from vehicle 100 as it warms up.

What is claimed is:

1. A vehicle comprising:
a frame including a tunnel;
a plurality of ground engaging members including a pair of front skis supporting a front portion of the frame and a rear endless track supporting a rear portion of the frame;
an engine supported by the frame and operatively coupled to the rear endless track;
a continuously variable transmission supported by the frame and operatively coupled to the engine and to the rear endless track;
a clutch guard supported by the frame and positioned generally above the continuously variable transmission; and
an oil container in fluid communication with the engine wherein the clutch guard is positioned forward of the tunnel and coupled to the front portion of the frame and in that the oil container is supported by the clutch guard.

2. The vehicle of claim 1, wherein the clutch guard includes at least one fluid recess to direct any spilled oil away from the continuously variable transmission.

3. The vehicle of claim 1, wherein the clutch guard includes at least one locator and the oil container includes at least one locator, the at least one locator of the clutch guard and the at least one locator of the oil container cooperating to locate the oil container relative to the clutch guard.

4. The vehicle of claim 1, wherein the at least one locator of the oil container extends from a lower surface of a housing of the oil container and the at least one locator of the clutch guard is at least one recess which receives the at least one locator of the oil container.

5. The vehicle of claim 1, further comprising at least one retainer, wherein the at least one retainer holds the oil container to the clutch guard.

6. The vehicle of claim 1, wherein a retainer is received in a recess in the oil container and is coupled to the clutch guard.

7. The vehicle of claim 1, wherein the oil container includes a sump in fluid communication with the engine and a main reservoir in fluid communication with the sump.

8. The vehicle of claim 7, wherein the sump of the oil container is sized to permit the vehicle to maintain a 50 degree hill climb for about 4 minutes.

9. The vehicle of claim 7, wherein the oil container is blow molded and the sump is spaced apart from the main reservoir by a pinch off region of a housing of the oil container.

10. An oil container for a two cycle engine comprising:
- a housing having an interior volume, a first portion of the interior volume corresponding to a main reservoir and a second portion of the interior volume corresponding to a sump; and
- a divider separating the main reservoir and the sump, the sump portion is generally lower than the main reservoir and in that the divider has a variable width opening permitting the fluid communication of oil from the main reservoir to the sump.

11. The oil container of claim 10, wherein the volume of the sump is at least about 1.8 percent of the interior volume of the housing.

12. The oil container of claim 10, wherein the volume of the sump is up to about 5.5 percent of the interior volume of the housing.

13. The oil container of claim 10, wherein the divider is a portion of the housing.

14. The oil container of claim 10, wherein the variable width opening increases in width generally linearly.

15. The oil container of claim 10, wherein the variable width opening in the divider is generally V-shaped.

16. An oil container for a two cycle engine, comprising:
- a housing having an interior volume, a first portion of the interior volume corresponding to a main reservoir and a second portion of the interior volume corresponding to a sump; and
- a divider separating the main reservoir and the sump, wherein the oil container is molded and has a pinched off portion at least partially defining the main and sump portions, and in that the divider is integral with the housing.

17. The oil container of claim 16, wherein the housing is a single blow molded component.

18. The oil container of claim 16, wherein the sump is spaced apart from the main reservoir due to the pinch off in the housing.

19. The oil container of claim 16, wherein the divider includes a fluid conduit connecting the main reservoir and the sump.

20. The oil container of claim 19, wherein the fluid conduit has a generally linear increasing width.

* * * * *